United States Patent
Kurokawa et al.

[11] Patent Number: 6,122,419
[45] Date of Patent: Sep. 19, 2000

[54] OPTICAL SIGNAL PROCESSING APPARATUS AND OPTICAL SIGNAL PROCESSING METHOD

[75] Inventors: Takashi Kurokawa; Hiroyuki Tsuda, both of Machida; Katsunari Okamoto, Mito; Kazunori Naganuma, Kokubunji; Tetsuyoshi Ishii; Hirokazu Takenouchi, both of Isehara, all of Japan

[73] Assignee: Nippon Telegraph & Telephone Corporation, Tokyo, Japan

[21] Appl. No.: 08/921,844

[22] Filed: Sep. 2, 1997

[30] Foreign Application Priority Data

| Feb. 22, 1979 | [JP] | Japan | 9-043921 |
| Sep. 2, 1996 | [JP] | Japan | 8-231673 |
| Oct. 29, 1996 | [JP] | Japan | 8-286955 |
| Mar. 13, 1997 | [JP] | Japan | 9-058877 |
| Jul. 4, 1997 | [JP] | Japan | 9-179469 |

[51] Int. Cl.$^7$ .................................................. G02B 6/26
[52] U.S. Cl. .............................. 385/31; 385/37; 385/46; 372/99; 372/77
[58] Field of Search .............................. 385/31, 37, 46, 385/15, 24, 27, 33, 38, 39, 42, 10; 372/6, 69, 99, 101, 102, 107, 700

[56] References Cited

U.S. PATENT DOCUMENTS

| 3,600,594 | 8/1971 | Moore . | |
| 4,296,319 | 10/1981 | Franks et al. . | |
| 5,373,526 | 12/1994 | Lam et al. | 372/69 |
| 5,448,417 | 9/1995 | Adams . | |
| 5,793,907 | 8/1998 | Jalali et al. | 385/24 |

FOREIGN PATENT DOCUMENTS

| 0 713 107 A2 | 11/1994 | European Pat. Off. . |
| 0 657 754 A1 | 6/1995 | European Pat. Off. . |

OTHER PUBLICATIONS

Takahashi H. and Toba H., Transmission Characteristics of Arrayed Waveguide N xN Wavelength Multiplexer, Journal of Lightwave Technology, vol. 13, No. 3, 447–455, Mar. 1995.

Weiner A.M. et al., Programmable Shaping of Femtosecond Optical Pulses by Use of 128–Element Liquid Crystal Phase Modulator, IEEE Journal of Quantum Electronics, vol. 28, No. 4, 908–920, Apr. 1992.

Weiner A.M. et al, Spectral Holography of Shaped Femtosecond Pulses, Optics Letters, vol. 17, No. 3, 224–226, Feb. 1992.

(List continued on next page.)

*Primary Examiner*—Phan T. H. Palmer
*Attorney, Agent, or Firm*—Workman, Nydegger & Seeley

[57] ABSTRACT

The present invention relates to an optical signal processing apparatus and optical signal processing method which enable generation, waveform shaping, waveform measurement, waveform recording, correlation processing, and the like of optical pulses of 1–10 ps. A basic construction of the optical signal processing apparatus includes an optical waveguide, a first structure for equally distributing output light of the optical waveguide, an optical waveguide comprising an aggregate of optical waveguides changing in optical length by a constant interval, a arrayed waveguide for dividing the output light, second structure for focusing optical output of the arrayed waveguide, and a mirror for receiving and reflecting incident light focused by the second structure. Or, the apparatus includes an optical waveguide, first structure for equally distributing output light of the optical waveguide, a arrayed waveguide comprising an aggregate of optical waveguides changing in optical length by a constant interval for dividing the output light, second structure for focusing optical output of the arrayed waveguide, and a spatial filter for receiving light focused by the second structure to distribute the incident light on a straight line and making desired amplitude or phase modulation of the light according to the position on the straight line and reflecting the light.

16 Claims, 82 Drawing Sheets

OTHER PUBLICATIONS

Dragone C. et al., Integrated Optics N×N Multiplexer on Silicon, IEEE Photonics Technology Letters, vol. 3, No. 10, 896–899, Oct. 1991.

Smit M.K., New Focusing and Dispersive Planar Component Based on an Optical Phased Array, Electronics Letters, vol. 24, No. 7, 385–386, Mar. 1988.

Weiner et al., Programmable Shaping of Femtosecond Optical Pulses by Use of 128–Element Liquid Crystal Phase Modulator, IEEE Journal of Quantum Electronics, No. 4, Apr. 1992.

Weiner et al., Shaping of Femtosecond Pulses Using Phase–Only Filters Designed by Simulated Annealing, Journal of the Optical Society of America, No. 5, May 1993.

Hajime I., Optical Pulse Compression Device, Patent Abstracts of Japan, Pub. No. 01065505, Mar. 1989.

Kazuhiro O., Optical Delay Equalizer, Patent Abstracts of Japan, Pub. No. 05346515, Dec. 1993.

Koichi T., Optical Dispersion Equalizing Circuit, Patent Abstracts of Japan, Pub. No. 07104137, Apr. 1995.

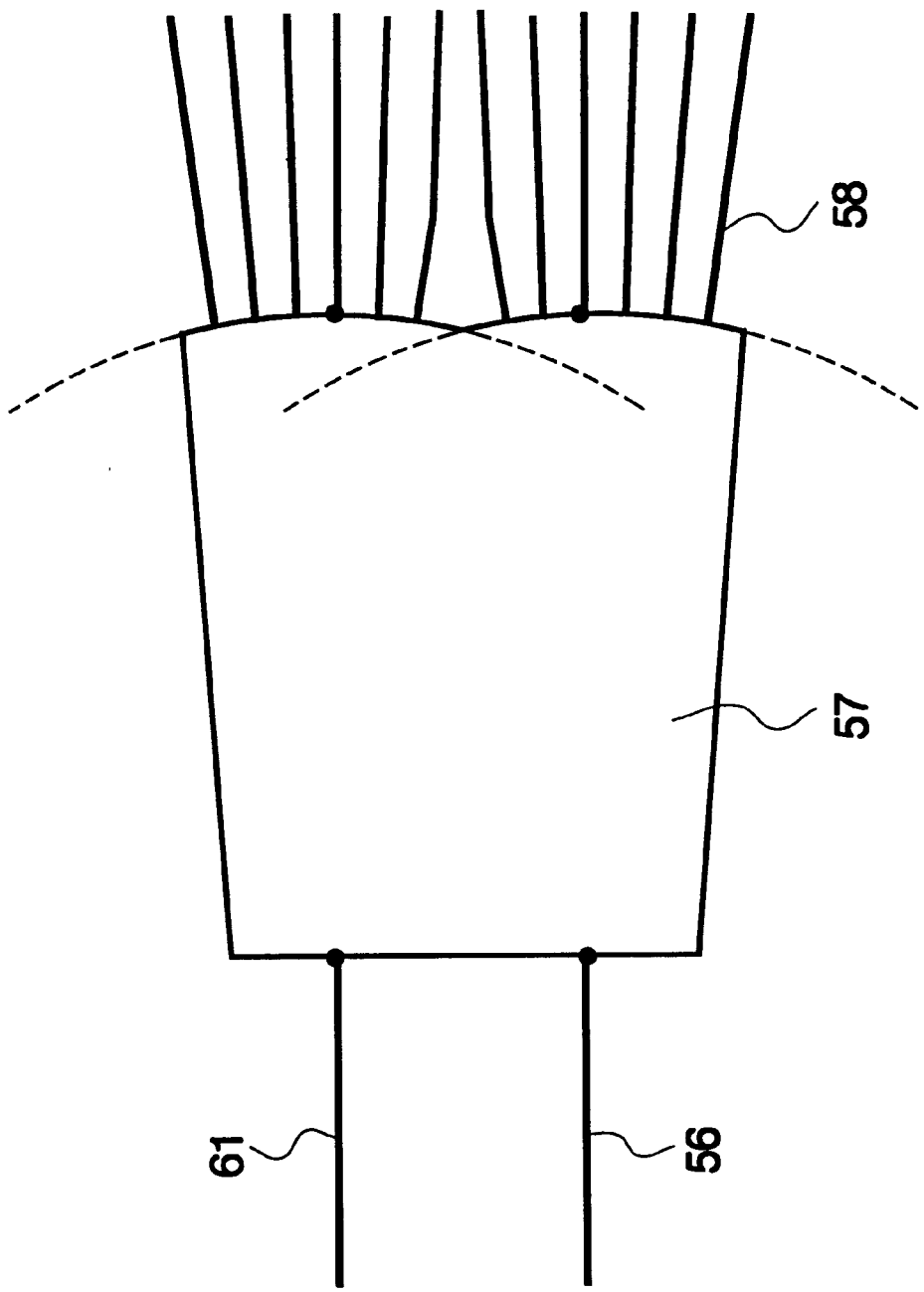

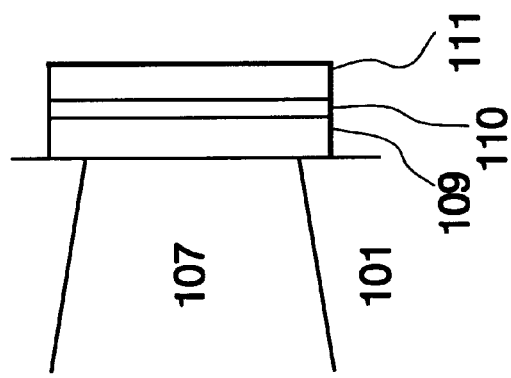
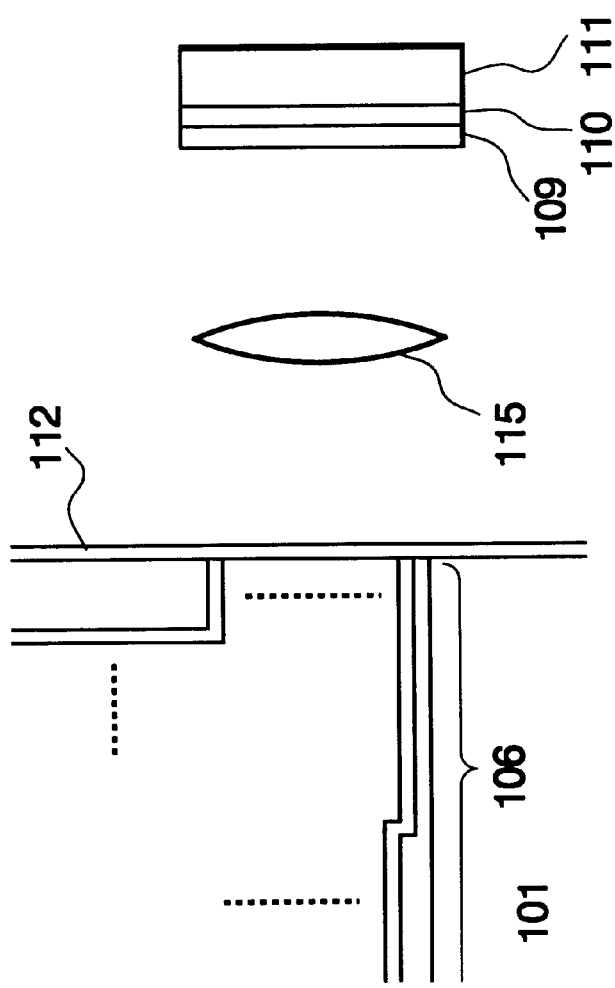
FIG.24E
FIG.24D

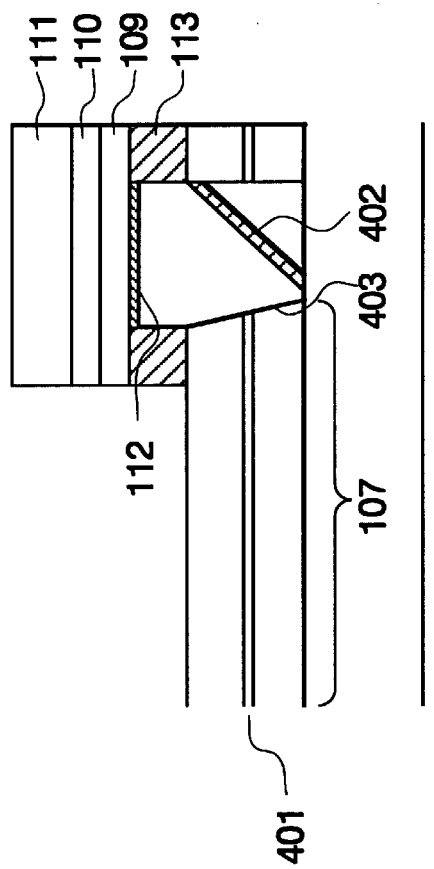
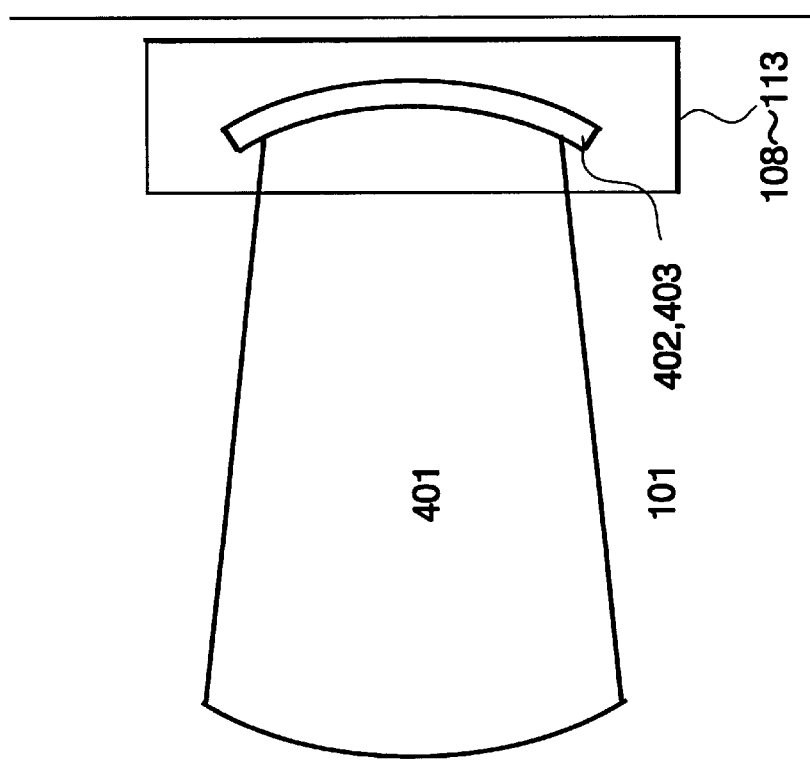
FIG.26B
FIG.26A

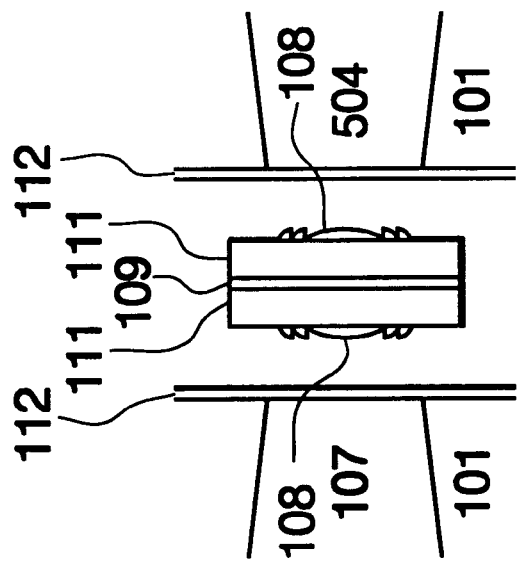
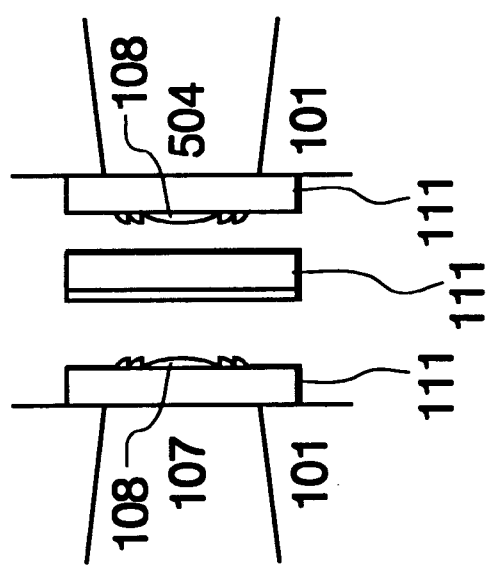
FIG.29B
FIG.29A

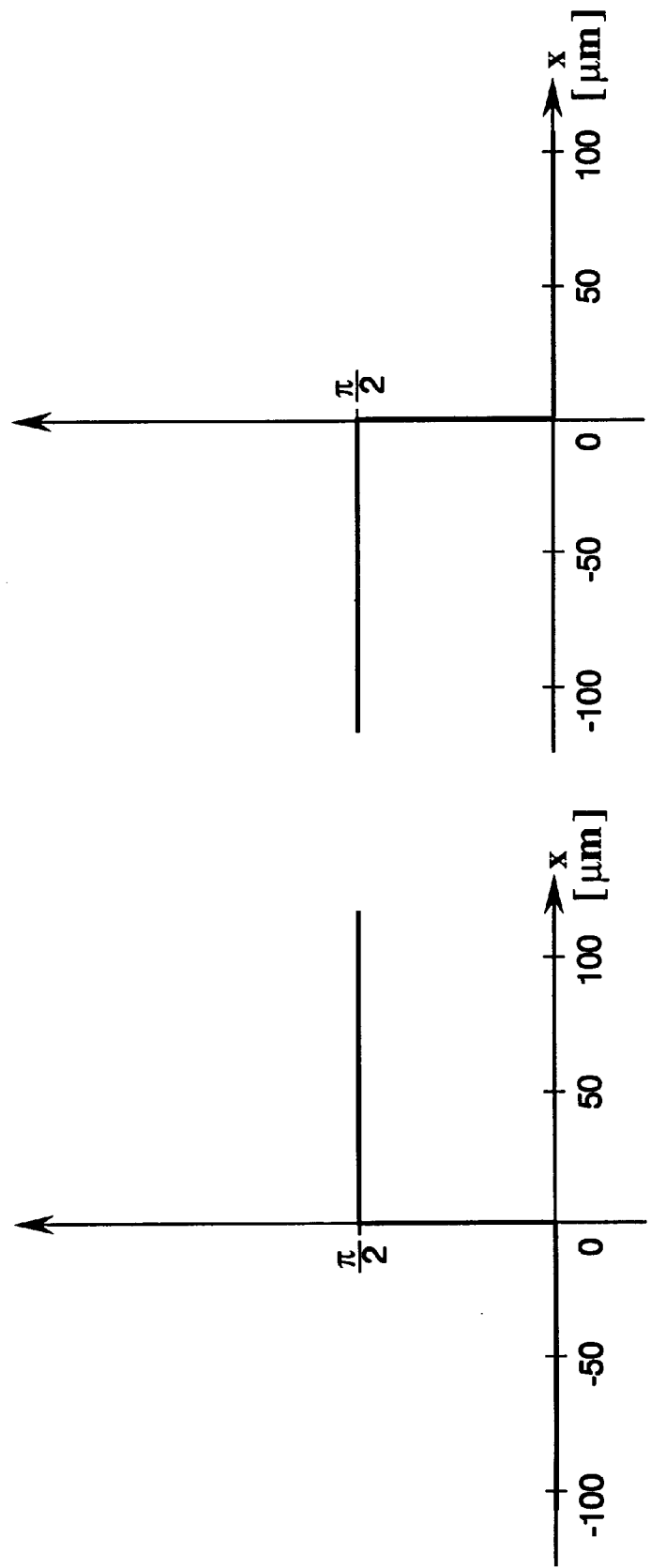

OPTICAL SIGNAL PROCESSING APPARATUS AND OPTICAL SIGNAL PROCESSING METHOD

BACKGROUND OF THE INVENTION

1. Field of the Invention

This invention relates to a method and an apparatus for processing, measuring or storing high-speed optical signals.

2. Description of the Prior Art

An example of prior art optical signal processing circuit is shown in FIG. 1. In the Figure, the reference numerals 201 and 205 indicate diffraction gratings, 202 and 204 are lenses, and 203 is a spatial filter or an optical storage medium. When a time series signal light is applied to this optical circuit, a Fourier transformation of the time series signal light, that is, a frequency spectrum distribution thereof is formed on the spatial filter 203 by the frequency decomposition function of the diffraction grating 201 and the Fourier transformation function of the lens 202. When the frequency spectrum distribution is modulated by means of the spatial filter 203, the waveform of the time series signal can be modulated. Here, the waveform can be controlled by the spatial filter 203 even when the time series signal is very high in speed.

As an example, when an optical signal of a pulse width of 200 fs and a pulse interval of 5 ps shown in the upper part of FIG. 2 is applied, the incident optical spectrum has a shape as shown in the upper part of FIG. 3, having an optical power distribution shown by the broken line in the middle part of FIG. 3 on the spatial filter 203 after passing through the diffraction grating 201 and the lens 202, and when this is modulated by the spatial filter 203, it has a shape as shown in the lower part of FIG. 3 in the spectrum after passing through the spatial filter 203. A time-dependent waveform corresponding to the spectrum is the pulse sequence shown in the lower part of FIG. 3. Thus, optical signal processing can be achieved by modulating the frequency spectrum of optical signal by the spatial filter 203. That is, various waveform shaping according to the filter is possible.

Further, with 203 shown in FIG. 1 used as an optical storage medium, by applying time series signal light and reference light simultaneously, an interference fringe of both lights is hologram recorded on the optical storage medium 203. After the recording, when only the reference light is incident, the signal light is reproduced and output. Such studies are reported, for example, in A. M. Weiner, "Programable shaping of Femtosecond optical pulses by use of 128-Element Liquid Crystal Phase Modulator," IEEE J Quntun Electronics, Vol. 28 No. 4, pp. 908–920(1992); A. Weiner et al., "Spectral holography of Shaped femtosecond pulses", Optics Letters, vol. 17, pp. 224–226 (1992).

With the advance in optical communication technology, pulse widths of optical signals utilized in optical transmission are 100 ps (ex; FA-10G system) in the practical application stage, and those of next-generation very large capacity transmission apparatus are considered to utilize picosecond pulses of 1–10 ps. Optical pulses of femtosecond region are application region of the time being in the research and development and material evaluation of stable light sources, and considered not to be applied in optical communications immediately. That is, basic apparatus and method enabling optical pulse generation, waveform shaping, waveform measurement, waveform recording, correlation processing, and the like are required for constructing next-generation very high capacity systems.

However, the above-described prior art has the following problems. That is, in the modulation or hologram recording, all of the diffraction gratings 201, 203, the lenses 202 and 204, and the spatial filter 203 must be laid out in high precision, are liable to be affected by the external environment, are thus difficult to be modular structured, and are nearly impossible to operate other than in a so-called experimental environment. Therefore, it is not practicable at present stage.

Still further, when treating a time series signal, signal processing is in principle possible by single dimensional diffraction grating and lens. However, the diffraction grating and the lens have a redundant two-dimensional structure, which requires tedious positioning which is inherently unnecessary.

Yet further, when treating a long pulse sequence of over 10 ps or a pulse of large pulse width, it is required to increase the incident beam diameter which, in turn, requires large-sized diffraction grating or lens, and thus a large sized apparatus.

That is, the prior art structure using the diffraction grating pair and the lens effective for femtosecond pulses requires a very large sized apparatus for picosecond pulses, and is difficult to be packaged in a transmission apparatus of about 30×40×3 cm. Further, it is required to use a connection optical system with the optical fiber, and flexible apparatus design according to the pulses is impossible.

Heretofore, a semiconductor mode-locked laser is known as picosecond pulse generation means.

FIG. 4 shows the structure of a prior art mode-locked laser for use as a short pulse light source.

In the Figure, the mode-locked laser comprises an optical gain medium 51, an pumping circuit 52 for forming a population inversion to the optical gain medium 51, mirrors 53-1 and 53-2 constituting an optical resonator, an optical modulator 54 placed in the optical resonator, and a clock generator 55 for driving the optical modulator 54. In this construction, when the clock generator 55 drives the optical modulator 54 at a clock frequency equal to the resonance mode spacing of the optical resonator or an integer multiple thereof, an optical short pulse sequence of a repetition frequency equal to the clock frequency or an integer multiple thereof.

FIG. 5 shows the structure of a multi-wavelength light source for simultaneously oscillating light of a plurality of wavelengths.

In the Figure, the multi-wavelength light source comprises an optical gain medium 61, an arrayed-waveguide grating 62, a lens 63 for coupling the optical gain medium 61 with the arrayed-waveguide grating 62, a high reflection mirror 64 and a low reflection mirror 65 disposed at both end surfaces of the optical gain medium 61, and a high reflection mirror 66 disposed at the other end of the arrayed-waveguide grating 62.

The arrayed-waveguide grating 62 comprises an input waveguide 71, an arrayed waveguide 73 including a plurality of waveguides gradually increasing in length by a waveguide length difference ΔL, a plurality of output waveguides 75, a slab waveguide 72 for connecting the input waveguide 71 and the arrayed waveguide 73, and a slab waveguide 74 for connecting the arrayed waveguide 73 and the output waveguide 75, which are formed on a substrate 70.

Light incident into the input waveguide 71 spreads by diffraction in the slab waveguide 72, and incident and distributed in equal phase into individual waveguides of the arrayed waveguide 73. The light transmitted in the individual waveguides of the arrayed waveguide 73 and reaching the slab waveguide 74 has a phase difference corresponding to the waveguide length difference ΔL. Since the phase difference varies with the wavelength, when focused on the focal plane by the lens effect of the slab waveguide 74, the light is focused at different positions by wavelengths. Therefore, light of different wavelengths are taken out from the individual waveguides of the output waveguide 75.

In the multi-wavelength light source using such an arrayed waveguide grating 62, an optical resonator is formed between the high refection mirror 64 and the high reflection mirror 66, and light of a plurality of wavelengths can be simultaneously oscillated by steadily exciting the optical gain medium 61.

However, the prior art mode-locked laser has the following problems.

(1) The oscillation mode envelope spectrum is largely varied by the operation condition, and it is difficult to set the central wavelength and the pulse width.

(2) Since the amplitude and phase of each mode cannot be independently controlled, pulse shape design is difficult.

(3) A very large number of modes are excited, however, correlation between modes is insufficient due to dispersion and nonlinear effect of the semiconductor medium of the long resonator, and it is difficult to generate a transform limit optical short pulse sequence.

Further, since the phase to each mode is not controlled in the multi-wavelength as shown in FIG. 5, it is impossible to generate an optical short pulse sequence of high repetition frequency by mode locking.

As described above, there has heretofore been a semiconductor mode-locked laser as picosecond pulse generation means, however, to utilize it as a light source for optical communications, it is required that the phase and intensity are stable, the central wavelength and pulse width and pulse shape can be set (in design and fabrication), and a high quality pulse close to the transform limit is generated. However, present semiconductor mode-locked lasers are difficult to simultaneously meet these requirements. Further, it is very difficult to incorporate the prior art shown in FIG. 1 in a semiconductor mode-locked light source, and no studies have been reported on the problems.

In a very high speed optical transmission apparatus, distortion of waveform due to group velocity dispersion in the optical fiber is a first factor that limits the transmission distance. Dispersion characteristics of a transmission line (optical fiber) depend on ambient temperature, on material and cover with passage of time. Further, the dispersion characteristics are changed when the optical fiber is changed to another optical fiber in association with a malfunction or replacement of the transmission line. Or, even if the dispersion of the optical fiber is unchanged, the dispersion value applied to the optical signal is changed by changes in light source wavelength or filter characteristics.

Since even dispersion shift optical fibers of small dispersion, which are generally used, have a dispersion of about ±1 ps/nm/km, a transmission section of 80 km has a dispersion of ±80 ps/nm. Since an optical band width of optical signal of pulse width of 10 ps at 20 Gbit/s is about 1 nm, a pulse broadening of a maximum of 80 ps is generated. However, the time slot of 20 Gbit/s signal is 50 ps, a large inter-symbol interference is generated to produce large errors. Therefore, an apparatus for compensating (equalizing) the dispersion of transmission line is indispensable for a very high speed transmission apparatus.

An example of prior art is shown in FIG. 6. In FIG. 6, 01 is an optical amplifier, 02 is an optical switch, and 03 is a dispersion compensation fiber.

In the prior art, the optical signal is passed through another optical fiber having dispersion characteristics reverse to the dispersion of the transmission line to compensate the dispersion, thereby obtaining a good waveform.

Since dispersion characteristics of the dispersion compensation fiber 03 are not variable, it is general to provide fibers of different dispersion characteristics for compensating the dispersion according to changes in dispersion characteristics of the transmission line.

However, the prior art has the following problems.

(i) Compensation is difficult for high order dispersion.

(ii) A number of fibers must be provided to compensate the dispersion. In particular, since the tolerance of dispersion is narrow in a very high speed optical signal, fibers of small increment in dispersion value are required. As a result, the apparatus becomes large in size, and an optical switch of multiple switches is required.

(iii) Since the dispersion compensation fiber is switched by an optical switch, a momentary disconnection of optical signal occurs during switching.

Further, as other prior art examples, there are constructions of chirped fiber grating and multiple-connected MZ interferometer, however, these have the following problems.

(iv) Control width of central wavelength of dispersion compensation is small, and the compensation band width is narrow.

In a very high speed optical transmission apparatus, a second factor of limiting the transmission distance is distortion of waveform due to self-phase modulation in the optical fiber. Another example of prior art is shown in FIG. 7. In FIG. 7, the symbol 04 indicates an optical transmitter, 05 is a high dispersion fiber, 06 is an optical amplifier, 07 is an optical transmission line, 08 is a dispersion compensation circuit, and 09 is an optical receiver.

This construction provides a transmission method in which an optical signal is previously passed through a high dispersion medium on the assumption of compensation to increase the pulse width, thereby reducing the self-phase modulation. Since the self-phase modulation is generated nearly proportional to the optical pulse peak intensity, the modulation can be reduced by increasing the pulse width to decrease the peak power. Since, dispersion can be compensated to reproduce the waveform, however, degradation of waveform due to self-phase modulation, which is a nonlinear phenomenon, cannot be reproduced by a normal linear waveform equalization method, a transmission apparatus is required which does not generate a nonlinear phenomenon in the transmission line.

However, the prior art has the following problems.

(v) Since changes in dispersion in the transmission line cannot be previously estimated, there is a possibility that dispersion is equalized by chance in the course of the transmission line, resulting in self-phase modulation leading to an increase in waveform degradation and errors.

As described above, as picosecond pulse waveform shaping (e.g., dispersion compensation) means, there are other optical fibers having reverse dispersion characteristics to the dispersion in the transmission line, a chirped fiber grating, and a multiple-connected MZ interferometer. However, these means are difficult to achieve compensation for high order dispersion, variable dispersion compensation, and wide band compensation. Further, the prior art shown in FIG. 1 is very small in compensatable dispersion amount. For example, for an optical pulse of 2 ps in pulse width, it can provide only a compensation of about 5 ps/nm.

The optical signal processing apparatus as described above is required to measure waveform of optical signals of higher speed.

Heretofore, as waveform measuring and recording means, there is a very high speed O/E converter or a streak camera. However, the band width of the O/E converter is as much as 50 GHz and impossible to measure picosecond pulses of 1–10 ps. Further, since the streak camera is low in sensitivity in the optical communication wavelength region, a sufficient S/N is not obtained by a single sweeping, and a real-time waveform cannot be observed. There is no report of study using the prior art shown in FIG. 1. When the prior art is applied, as is, since light is distributed two-dimensionally on the Fourier transformation plane, measurement of high S/N is difficult unless a specific optical system is devised.

SUMMARY OF THE INVENTION

An object of the present invention, as described above, is to provide an optical signal processing apparatus and optical signal processing method which enables generation, waveform shaping, waveform measurement, waveform recording, correlation processing, and the like of optical pulses of 1–10 ps.

Basic construction of the optical signal processing apparatus according to the present invention suitable for such problems comprises an optical waveguide, first means for equally distributing an output of the optical waveguide, a arrayed waveguide comprising an aggregate of optical waveguides changing in optical length by a constant interval for spectrally dividing the output light, second means for focusing the optical output of the arrayed waveguide, and a mirror for receiving and reflecting incident light focused by the second means.

Or, the optical signal processing apparatus according to the present invention comprises an optical waveguide, first means for equally distributing an output of the optical waveguide, a arrayed waveguide for dividing the output light, second means for focusing the optical output of the arrayed waveguide, and a spatial filter for receiving incident light focused by the second means and spectrally dividing the incident light on a straight line and for modulating the incident light into a desired amplitude or phase according to the position on the straight line, thereby reflecting the incident light.

Further, another construction of the optical signal processing apparatus according to the present invention comprises a first optical waveguide, first means for equally distributing an output of the first optical waveguide, a first arrayed waveguide comprising an aggregate of optical waveguides changing in optical length by a constant interval for dividing the output light, second means for focusing the optical output of the first arrayed waveguide, a spatial filter for receiving incident light focused by the second means and distributing the incident light on a straight line and for modulating the light into a desired amplitude according to the position on the straight line, third means comprising an aggregate of optical waveguides changing in optical length by a constant interval for applying light to the second arrayed waveguide, fourth means for converging the output light of the second arrayed waveguide to a single point, and a second optical waveguide to which the output light of the fourth means is applied.

A yet further construction of the optical signal processing apparatus according to the present invention comprises a reflective type spatial filter, a arrayed waveguide comprising an aggregate of optical waveguides changing in optical length by a constant interval, first means for applying coherent light to the reflective type spatial filter and inputting the coherent light modulated by the reflective type spatial filter into the arrayed waveguide, and second means for converging output light of the arrayed waveguide to a single point.

A yet further construction of the optical signal processing apparatus according to the present invention comprises a transmission type spatial filter, a arrayed waveguide comprising an aggregate of optical waveguides changing in optical length by a constant interval, first means for applying coherent light to the transmission type spatial filter, second means for applying the coherent light modulated by the transmission type spatial filter into the arrayed waveguide, and third means for converging output light of the arrayed waveguide to a single point.

The optical signal processing method according to the present invention is characterized in that an optical signal is input to an optical signal processing apparatus having a arrayed waveguide and a spatial filter, to convert the optical signal into a frequency spectral image, the frequency spectral image is subjected to a desired modulation by the spatial filter, and the modulated frequency spectral image is converged to a single point to obtain a new optical signal.

In the optical signal processing method, the optical signal processing apparatus used is preferably the above-described optical signal processing apparatus.

Another arrangement of the optical signal processing method according to the present invention is characterized in that coherent light is input in an optical signal processing apparatus having a arrayed waveguide and a spatial filter written with a hologram image corresponding to the frequency spectrum of a desired optical signal to generate an optical signal.

Still further, in the present invention, by combining the optical signal processing apparatus of the basic structure with predetermined parts, generation of a short pulse is possible.

The basic construction of such optical signal processing apparatus is characterized by comprising in the optical signal processing apparatus of the basic structure having the above-described mirror, at the input side of the optical waveguide, optical modulation means for modulating an oscillation light in an optical resonator with a frequency nearly equal to the resonance mode spacing or an integer multiple thereof, and optical gain means, wherein the modulation means, the gain means, and the optical waveguide are sequentially coupled by optical coupling means, an optical reflection mirror is disposed on the end surface not facing the coupling means of the optical modulator, the mirror formed on the end surface of the second means is a high reflection type, a resonator is formed between these high reflection type mirrors, thereby enabling generation of a short pulse light.

In the construction for generating short pulses, a plurality of output waveguides may be disposed at predetermined spacings between the focal plane of one slab waveguide of the arrayed waveguide grating and the high reflection mirror.

Similarly, the plurality of output waveguides may be disposed at equal spacings.

Similarly, the high reflection mirrors corresponding to the individual output waveguides may be different in reflectivity from each other.

Similarly, the plurality of output waveguides may be set with predetermined waveguide length differences for compensating dispersion in the optical resonator.

Similarly, in place of the high reflection mirrors, a plurality of lens arrays disposed at a predetermined spacing, and a liquid crystal light modulator having a high reflection mirror on one side may be provided.

Similarly, an optical synthesizer for synthesizing part or all of a plurality of output waveguides.

Similarly, gratings formed in the individual output waveguides may be different in diffractive efficiency from each other.

Similarly, a plurality of high reflection mirrors may be disposed at predetermined spacings on the focal plane of one slab waveguide of the arrayed waveguide grating.

Similarly, a plurality of high reflection mirrors may be disposed at equal spacings.

Similarly, the plurality of high reflection mirrors may be different in reflectivity from each other.

Similarly, in place of the high reflection mirrors, a plurality of diffraction gratings may be formed at a predetermined spacing in the focal plane of the slab waveguide.

Similarly, the plurality of diffraction gratings may be disposed at equal spacings.

Similarly, the plurality of diffraction gratings may be different in diffractive efficiency from each other.

Similarly, the individual positions of the plurality of diffraction gratings may be dislocated in the normal direction of the focal plane of the slab waveguide.

Similarly, in place of the high reflection mirrors, a groove may be formed on the focal plane of the slab waveguide, and films formed by stacking a plurality of mirrors may be disposed at a predetermined spacing in the groove.

Similarly, the optical modulation means and the optical gain means may be integrated.

Similarly, part of the individual components may be connected with an optical fiber.

Similarly, the position of the high reflection mirror may be controlled by a fine control mechanism.

Similarly, the spacing of the high reflection mirrors may be varied in the normal direction of the slab waveguide.

Further, based on the optical signal processing apparatus of the basic structure according to the present invention, an apparatus for observing the waveform of the optical signal to be processed can be constructed.

Such a waveform observable optical signal processing apparatus comprises an optical waveguide, an arrayed waveguide comprising a plurality of optical waveguides gradually increasing in waveguide length, distribution means for distributing output light of the optical waveguide to the arrayed waveguide, focusing means for focusing the output light of the arrayed waveguide, a spatial filter disposed in the vicinity of the focal plane of the focusing means for modulating the light image, reflection means for reflecting light modulated by the spatial filter, and optical division means for taking out the reflected light from the reflection means in the optical waveguide.

Or, the apparatus comprises a first optical waveguide, a first arrayed waveguide comprising a plurality of optical waveguides gradually increasing in waveguide length, distribution means for distributing the output light of the first optical waveguide to the first arrayed waveguide, first focusing means for focusing the output light of the first arrayed waveguide, a spatial filter disposed in the vicinity of the focal plane of the first focusing means for modulating the light image, and further comprising a second arrayed waveguide comprising a plurality of optical waveguides gradually increasing in waveguide length, second focusing means for focusing the light modulated by the spatial filter to the second arrayed waveguide, a second optical waveguide, and wave synthesis means for synthesizing the output light of the second arrayed waveguide and coupling to the second optical waveguide.

Still further, the apparatus comprises a first optical waveguide, a first arrayed waveguide comprising a plurality of optical waveguides gradually increasing in waveguide length, distribution means for distributing output light of the first optical waveguide to the first arrayed waveguide, a reference light input optical waveguide, a second arrayed waveguide comprising a plurality of optical waveguides gradually increasing in waveguide length, second distribution means for distributing the output light of the reference light input optical waveguide to the second arrayed waveguide, focusing means for focusing the output light of the first arrayed waveguide and the output light of the second arrayed waveguide, an optical recording medium disposed in the vicinity of the focal plane of the focusing means, and optical division means for taking out the reflected light from the first optical waveguide.

A yet further construction of the waveform observable apparatus comprises a first optical waveguide, a first arrayed waveguide comprising a plurality of optical waveguides gradually increasing in waveguide length, first distribution means for distributing the output light of the first optical waveguide to the first arrayed waveguide, a third arrayed waveguide comprising a plurality of optical waveguides gradually increasing in waveguide length, second distribution means for distributing the output light of the reference light input optical waveguide to the third arrayed waveguide, first focusing means for focusing the output light of the first arrayed waveguide and the output light of the third arrayed waveguide, an optical recording medium disposed in the vicinity of the focal plane of the first focusing means, a second arrayed waveguide comprising a plurality of optical waveguides gradually increasing in waveguide length, second focusing means for focusing the light modulated by the optical recording means to the second arrayed waveguide, a second optical waveguide, and wave synthesis mans for synthesizing the output light of the second arrayed waveguide and coupling to the second optical waveguide.

Yet further, another construction of the waveform observable apparatus comprises a first optical waveguide, a first arrayed waveguide comprising a plurality of optical waveguides gradually increasing in waveguide length, first distribution means for distributing the output light of the first optical waveguide to the first arrayed waveguide, a first reference light input optical waveguide, a second arrayed waveguide comprising a plurality of optical waveguides gradually increasing in waveguide length, second distribution means for distributing the output light of the first reference light input optical waveguide to the second arrayed waveguide, a second reference light input optical waveguide, first focusing means for focusing the output light of the first arrayed waveguide and the output light of the second arrayed waveguide and the output light of the second reference light input optical waveguide, an optical recording medium disposed in the vicinity of the focal plane of the first focusing means, second focusing means for focusing the light modulated by the optical recording medium, and a light receiver array disposed in the vicinity of the focal plane of the second focusing means.

In the waveform observable apparatus, the focusing means may be a slab waveguide having a circular end surface.

Similarly, the focusing means may comprise a slab waveguide and a phase spatial modulation device.

Similarly, the spatial filter may be a phase filter, or an amplitude filter, or a spatial filter formed of amplitude filters and phase filters connected in multiple stages.

Similarly, the focal length of the phase spatial modulation device may be equal to the focal length of the slab waveguide of the coupling means.

Similarly, the spatial filter and the reflection means may be combined to form a pattern mirror comprising a number of partial mirrors.

Similarly, the spatial filter may be a spatial filter combining with a function of a phase spatial modulation device.

Similarly, the focusing means may be a lens.

Similarly, the focusing means may be a slab waveguide of the focal plane, having a phase adjusting arrayed waveguide at the end of the slab waveguide, and the phase adjusting arrayed waveguide end may be connected to the spatial filter.

Similarly, the focusing means may be a slab waveguide of the focal plane, having a phase adjusting arrayed waveguide at the slab waveguide end, and the phase adjusting arrayed waveguide may have an optical modulator array.

Similarly, phase difference between waveguides of the phase adjusting arrayed waveguide may be an integer multiple of $2\pi$.

Similarly, the optical division means may be an optical circulator.

Similarly, the focusing means is a slab waveguide, having optical bend means at the slab waveguide end for bending light in direction perpendicular to the waveguide.

Similarly, the spatial filter may be a liquid crystal spatial modulator comprising a glass substrate, a transparent electrode, a liquid crystal, and a liquid crystal alignment film.

Similarly, a quarter-wave plate may be provided in the liquid crystal spatial modulator.

Similarly, the liquid crystal of the liquid spatial modulator may be a twist nematic type.

Further, the optical signal processing method by the waveform observable optical signal processing apparatus is characterized in that a time series optical signal is input in the optical waveguide to convert the time series optical signal into a frequency spectrum image, the frequency spectrum image is subjected to desired phase or amplitude or both modulations, and the modulated light is synthesized to obtain a new time series optical signal. Or, filter characteristics of the spatial filter may be a hologram image of a pattern corresponding to the frequency spectrum of a desired time series optical signal, and coherent pulse light is applied to the optical waveguide to generate the desired optical signal. Still further, an optical signal may be input in the optical waveguide, a reference light of coherent pulse light is applied to the reference light input waveguide, hologram recording is made on the recording medium, a reference light of another coherent pulse light is applied to the reference light input waveguide, to output a phase conjugate light of the signal light. Yet further, signal light is input in the optical waveguide, a reference light of coherent pulse light is applied to the reference light input waveguide, hologram recording is made on the recording medium, a reference light of another coherent pulse light is applied to the reference light input waveguide, to output a signal light or a correlated light of the signal light and the reference light. Yet further, a signal light is input in the optical waveguide, a reference light of coherent pulse light is applied to the first reference light input waveguide, a reference light of single color is applied to the second reference light input waveguide to form reference light of coherent pulse light in the first reference light input waveguide to observe the pulse waveform.

Yet further, the present invention, based on the optical signal processing apparatus of the above-described basic structure, can provide an optical signal processing apparatus which enables dispersion compensation of the processed optical signal. The optical signal processing apparatus that enables such dispersion compensation comprises a first optical amplifier, an optical wavelength filter, a first optical waveguide, a first arrayed waveguide comprising a plurality of optical waveguides gradually increasing in waveguide length, distribution means for distributing the output light of the first optical waveguide to the arrayed waveguide, first focusing means for focusing the output light of the first arrayed waveguide, a spatial filter disposed in the vicinity of the focal plane of the first focusing means for modulating optical image, reflection means for reflecting light modulated by the spatial filter, optical division means for taking out the reflected light from the first optical waveguide, and a second optical amplifier.

Another construction of the dispersion compensatable optical signal processing apparatus comprises a first optical amplifier, an optical wavelength filter, a first arrayed waveguide comprising a plurality of optical waveguides gradually increasing in waveguide length, distribution means for distributing the output light of the first optical waveguide, first focusing means for focusing the output light of the first arrayed waveguide, a spatial filter disposed in the vicinity of the focal plane of the first focusing means for modulating the optical image, a second arrayed waveguide comprising a plurality of optical waveguides gradually increasing in waveguide length, second focusing means for focusing light modulated by the spatial filter to the second arrayed waveguide, a second optical waveguide, optical synthesis means for synthesizing the output light of the second arrayed waveguide and coupling to the second optical waveguide, and a second optical amplifier.

Yet further, an optical signal processing apparatus can be constituted of the dispersion compensatable optical signal processing apparatus, a light source, and an optical modulation signal generation circuit.

Yet further, an optical signal processing apparatus can be composed of the dispersion compensatable optical signal processing apparatus and an optical receiver.

Similarly, an optical signal processing apparatus can comprise the dispersion compensatable optical signal processing apparatus, an optical signal transmitter circuit comprising a light source, an optical modulator, an optical signal receiver circuit comprising the dispersion compensatable optical signal processing apparatus and an optical receiver, and an optical transmission line.

In the dispersion compensatable optical signal processing apparatus, the spatial filter may be a phase filter in which a relative phase $\phi$ may have a characteristic approximating $\phi(x)=\text{Mod } [ax^2, \pi]$ (a: constant)

with respect to the position (x) on the spatial filter. (wherein Mod[u, v] indicates a remainder using v as a modulus.).

Similarly, the spatial filter may be a phase filter in which a relative phase $\phi$ may have a characteristic approximating $\phi(x)=\text{Mod } [ax^2, 2\pi]$ (a: constant) with respect to the position (x) on the spatial filter. (wherein Mod[u, v] indicates a remainder using v as a modulus.).

Similarly, the spatial filter may be a phase filter in which a relative phase $\phi$ has a characteristic approximating φ(x)=π/2 (x>0) and φ(x)=0 (x<0), or φ(x)=0 (x>0) and φ(x)=π/2 (x<0)

with respect to the position (x) on the spatial filter, thereby achieving amplitude modulation—angular modulation conversion.

Similarly, the spatial filter may be a phase filter in which a relative phase φ has a characteristic approximating φ(x)=π (x>0) and φ(x)=0 (x<0), or φ(x)=0 (x>0) and φ(x)=π (x<0)

with respect to the position (x) on the spatial filter, thereby achieving amplitude modulation—angular modulation conversion.

Yet further, in the dispersion compensatable optical signal processing apparatus, the spatial filter may comprise a phase filter and an amplitude filter.

Similarly, the spatial filter may be a liquid crystal spatial modulator comprising a glass substrate, a transparent electrode, a liquid crystal, and a liquid crystal alignment film.

Yet further, an optical signal processing method by the above dispersion compensatable optical signal processing apparatus is characterized in that frequency spectral phase of optical signal generated by the optical signal transmitter circuit is modulated, and dispersion in the optical fiber and frequency spectral phase modulation by the optical signal transmitter circuit are compensated by the optical receiver circuit.

Another arrangement of the optical signal processing method is characterized in that the frequency spectral amplitude of the optical signal generated by the optical signal transmitter circuit is modulated, dispersion in the optical fiber and frequency spectral amplitude modulation by the optical signal transmitter circuit are compensated by the optical signal receiver circuit.

Similarly, a further arrangement is characterized in that frequency spectral phase and frequency spectral amplitude of the optical signal generated by the optical signal transmitter circuit are modulated, and dispersion in the optical fiber and frequency spectral phase modulation and frequency spectral amplitude modulation are compensated by the optical receiver circuit.

A yet further construction of the dispersion compensatable optical signal processing apparatus comprises a first optical signal processing apparatus comprising:

a short pulse light source;

a first optical amplifier;

a first optical wavelength filter;

a first optical splitting means for dividing the output light of the first optical wavelength filter into n(integer) units of light;

first n units of optical modulation circuits;

a first arrayed waveguide comprising a plurality of optical waveguides gradually increasing in waveguide length;

first distribution means for distributing the output light of the first n units of input/output optical waveguides to the first arrayed waveguide;

first focusing means for focusing the output light of the first arrayed waveguide;

a first spatial filter disposed in the vicinity of the focal plane of the first focusing means for modulating light image;

first reflection means for reflecting light modulated by the first spatial filter;

optical splitting means for taking out the reflected light from the first n units of input/output optical waveguides;

optical combining means for synthesizing the reflected light from the n units of second optical splitting means; and a second optical amplifier;

and a second optical signal processing apparatus comprising:

an optical transmission line;

a third optical amplifier;

a second optical wavelength filter;

third optical splitting means for dividing the output light of the second optical wavelength filter into n (integer) units of light;

second n units of input/output optical waveguides;

a second arrayed waveguide comprising a plurality of optical waveguides gradually increasing in waveguide length;

second distribution means for distributing the output light of the second input/output optical waveguides to the second arrayed waveguide;

second focusing means for focusing the output light of the second arrayed waveguide;

a second spatial filter disposed in the vicinity of the focal plane of the second focusing means for modulating light image;

second reflection means for reflecting light modulated by the second spatial filter;

fourth optical splitting means for taking out the reflected light from the second input/output optical waveguide; and n units of optical receivers for receiving the reflected light from the n units of fourth optical splitting means.

A yet further construction of the dispersion compensatable optical signal processing apparatus comprises a first optical signal processing apparatus comprising:

a short pulse light source;

a first optical amplifier;

a first optical wavelength filter;

a first optical splitting means for dividing the output light of the first optical wavelength filter into n(integer) units of light;

first n units of optical modulation circuits;

first n units of input/output optical waveguides a first arrayed waveguide comprising a plurality of optical waveguides gradually increasing in waveguide length;

first distribution means for distributing the output light of the first input/output optical waveguides to the first arrayed waveguide;

first focusing means for focusing the output light of the first arrayed waveguide;

a first spatial filter disposed in the vicinity of the focal plane of the first focusing means for modulating light image;

a second arrayed waveguide comprising a plurality of optical waveguides gradually increasing in waveguide length;

second focusing means for focusing the light modulated by the first spatial filter to the second arrayed waveguide;

first n units of output optical waveguides;

first optical combining means for synthesizing the output light of the second arrayed waveguide and coupling to the first n units of output optical waveguides;

second optical combining means for coupling output of the first n units of output optical waveguides;

a second optical amplifier;

and a second optical signal processing apparatus comprising:

an optical transmission line;

a third optical amplifier;

a second optical wavelength filter;

third optical splitting means for dividing the output light of the second optical wavelength filter into n (integer) units of light;

second n units of input/output optical waveguides;

a third arrayed waveguide comprising a plurality of optical waveguides gradually increasing in waveguide length;

second distribution means for distributing the optical waveguide output light of the second input/output optical waveguide to the third arrayed waveguide;

third focusing means for focusing the output light of the third arrayed waveguide;

a second spatial filter disposed in the vicinity of the focal plane of the third focusing means for modulating light image;

a fourth arrayed waveguide comprising a plurality of optical waveguides gradually increasing in waveguide length;

fourth focusing means for focusing light modulated by the second spatial filter to the fourth arrayed waveguide;

second n units of output optical waveguides;

third optical coupling means for coupling the output light of the fourth arrayed waveguide and coupling to the second n units of output optical waveguides; and n units of optical receivers for receiving output light from the second output optical waveguide.

Yet further, the present invention, based on the optical signal processing apparatus of the above-described basic structure, can provide an optical signal processing apparatus which enables real-time observation of waveform of the processed optical signal.

Such a waveform observable optical signal processing apparatus comprises first time—space conversion means for converting time series optical signal of the signal light into spatial signal light, second time—space conversion means for converting time series optical signal of reference light into spatial signal light, focusing means for focusing the spatial signal light individually output from the first time—space conversion means and the second time—space conversion means to make interference with each other, light receiving means disposed in the vicinity of the focal plane of the focusing means for receiving an interference light image of a plurality of optical signals incident into the focusing means, and an optical signal restoration circuit for restoring a time series signal of the signal light from the detection signals of the light receiving means.

In the waveform observable optical signal processing apparatus, the first and second time—space conversion means may comprise arrayed waveguide gratings, and the focusing means may comprise a slab waveguide having a function for making Fourier transformation of the spatial signal light.

Similarly, in the waveform observable optical signal processing apparatus, the first and second time—space conversion means may comprise diffraction gratings, and the focusing means may comprise a lens for making Fourier transformation of the spatial signal light.

Similarly, in the waveform observable optical signal processing apparatus, the light receiving means may comprise a photodiode array.

Similarly, in the waveform observable optical signal processing apparatus, the optical signal restoration circuit may restore electric field distribution of optical pulse of the signal light by calculation from electric field distribution of the Fourier transform hologram detected by the light receiving means.

A signal processing method by the waveform observable optical signal processing apparatus is characterized by comprising a step of converting a time series optical signal of unknown signal light into spatial signal light, a step of converting time series optical signal of known reference light into spatial signal light, a step of focusing individually the spatial signal of the signal light and the spatial signal of the reference light to make interference with each other, thereby forming a hologram image of a pattern corresponding to the frequency spectrum of time series signal, a step of receiving the hologram image to be converted into an electrical signal, and a step of restoring the unknown signal light from the hologram image converted to electrical signal using a predetermined calculation formula.

In the optical signal processing method, the step of restoring the unknown signal light from the hologram image may have a mathematical calculation operation for multiplying the hologram image formed on the focal plane with electric field distribution of reconstructing light mathematically derived from the electric field distribution of known reference light, followed by Fourier transformation operation and space—time conversion operation.

Further, in the signal processing method, the electric field distribution of reconstructing light on the focal plane to be multiplied with the hologram image may include a factor of dividing by the square of absolute value of amplitude distribution of electric field distribution at the focal plane of the known reference light.

The above and other objects, effects, features and advantages of the present invention will become more apparent from the following description of embodiments thereof taken in conjunction with the accompanying drawings.

BRIEF DESCRIPTION OF THE DRAWINGS

FIG. 15B is a schematic enlarged view showing the star coupler part of the optical signal processing apparatus shown in FIG. 15A;

FIG. 24D is a schematic enlarged view of the Fresnel lens part of a yet further modification example of the optical signal processing apparatus according to the embodiment 5 of the present invention;

FIG. 24E is a schematic enlarged view of the Fresnel lens part of a yet further modification example of the optical signal processing apparatus according to the embodiment 5 of the present invention;

FIG. 26A is a schematic plan view showing the structure in the vicinity of output of a slab waveguide of the optical signal processing apparatus according to an embodiment 7 of the present invention;

FIG. 26B is a schematic cross sectional view showing the structure in the vicinity of output of the slab waveguide of the optical signal processing apparatus according to an embodiment 7 of the present invention;

FIG. 29A is a schematic enlarged cross sectional view in the vicinity of spatial filter of a modification example of the optical signal processing apparatus according to the embodiment 8 of the present invention;

FIG. 29B is a schematic enlarged cross sectional view in the vicinity of spatial filter of another modification example of the optical signal processing apparatus according to the embodiment 8 of the present invention;

FIG. 49A is a diagram showing characteristic of phase filter in the case of reflection type construction of the optical signal processing apparatus of according to an embodiment 17 of the present invention;

FIG. 49B is a diagram showing characteristic of phase filter in the case of reflection type construction of the optical signal processing apparatus of according to the embodiment 17 of the present invention;

DETAILED DESCRIPTION OF PREFERRED EMBODIMENTS

Embodiment 1

A method and arrangement thereof for processing an optical signal according to a first embodiment of the present invention will be described with reference to FIG. 8.

Figure 8:
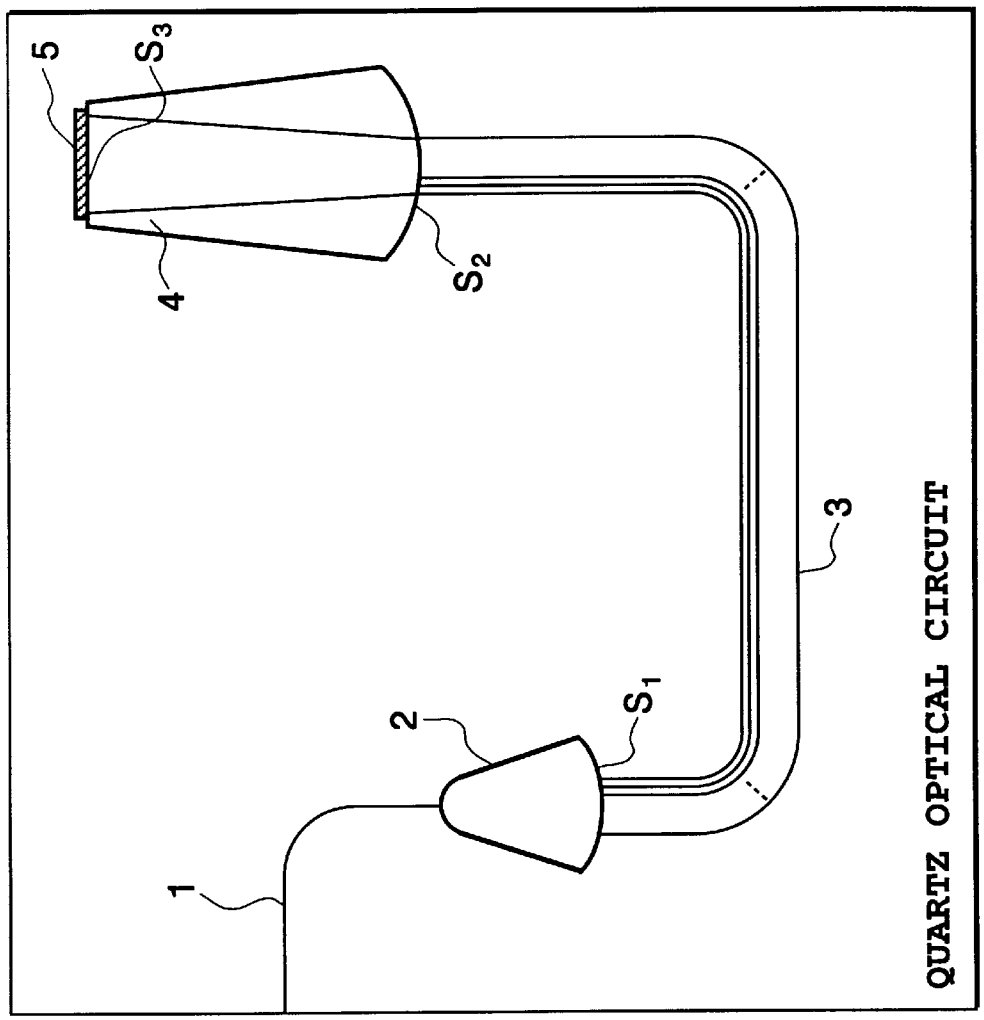
FIG. 8 is a schematic view showing the structure of the optical signal processing apparatus according to a first embodiment of the present invention.

As shown in FIG. 8, an input optical signal u(t), after being incident to a quartz waveguide 1, is divided to an arrayed grating 3 of N waveguides by a star coupler 2. The arrayed waveguide 3 is set so that individual waveguides have an optical length difference of ΔL between an incident surface S1 and an output surface S2.

In this case, best-performance spectroscopic characteristics are shown when S1 is on the circumference about the input end to the star coupler 2 of the quartz waveguide 1, and S2 is disposed on the circumference about the center of S3.

As a result, since adjacent light beam has a phase difference of nΔL (n being a refractive index of waveguide) at the output end from the arrayed waveguide 3 to a slab waveguide 4, the structure is known to have the same wave division function as a diffraction grating (for example, H. Takahashi et al., IEEE J. Lightwave Tech. Vol. 12 (No. 6), pp. 989–995 (1994); M.K. SMIT Electron. Lett. vol.24, pp.385–386(1988); C. Dragone et al., IEEE Photon. Technol. Lett., vol. 3, pp.896–899(1991)).

Heretofore, use of such a arrayed waveguide is well known as an optical wavelength demultiplexer in wavelength division multiplexing optical transmission systems.

The inventors have found that when a time series optical signal is applied to the arrayed waveguide 3, time-frequency spectrum of the optical signal can be formed as a spatial image even without using a lens. Further, the inventors have found a high-resolution arrayed waveguide designing method and devised applications thereof in optical signal processing based on this principle.

That is, when an arrayed waveguide is used, Fourier transformation U(n) of the incident optical signal can be focused on a focal plane S3 of the slab waveguide 4.

It has been found that when a m'th order diffraction light is used, the frequency resolution is proportional to Nm. Wherein N is the number of waveguides of the arrayed waveguide 3. Therefore, when m is increased, an increased resolution can be obtained as compared with an ordinary diffraction grating in which the frequency resolution is proportional to N. When optimally designed according to the guideline, a waveguide array with a very high optical resolution can be obtained, thereby enabling spectral division of a high-speed long optical pulse sequence.

When a reflective spatial filter 5 is disposed on the focal plane S3 of the above-described high resolution arrayed waveguide, an optical pattern of U(v)H(v) is reflected, returned through the star coupler 2, and output from the quartz waveguide 1, wherein H(v) is a spatial pattern of the spatial filter 5.

The output optical signal is u(t)*h(t), wherein * indicates a convolution of two signals.

Specifically, by disposing the optional spatial filter 5, processing can be made in the frequency region of the incident signal light. Input/output between the external and the quartz waveguide 1 is made, for example, by using an optical fiber with a coupler.

Since, in the configuration shown in FIG. 8, the focal plane S3 is on the circumference about the center of S2, when the spatial filter 5 is flat, generally a distortion occurs in the output waveform. When the phase is quadratically changed with respect to the central frequency, the distortion is approximated, this configuration is approximately has a quadratic dispersion characteristics. To compensate this, the input light or output light may be passed through a dispersion medium having the same magnitude and reverse sign. Or, the spatial filter 5 may be designed to include the dispersion compensation.

As a practical application example of this method, a case is considered in which the optical signal u(t) is passed through an apparatus, for example, a long distance optical fiber transmission line, and subjected to a distortion such as f(t)=u(t)*h(t).

Figure 9:
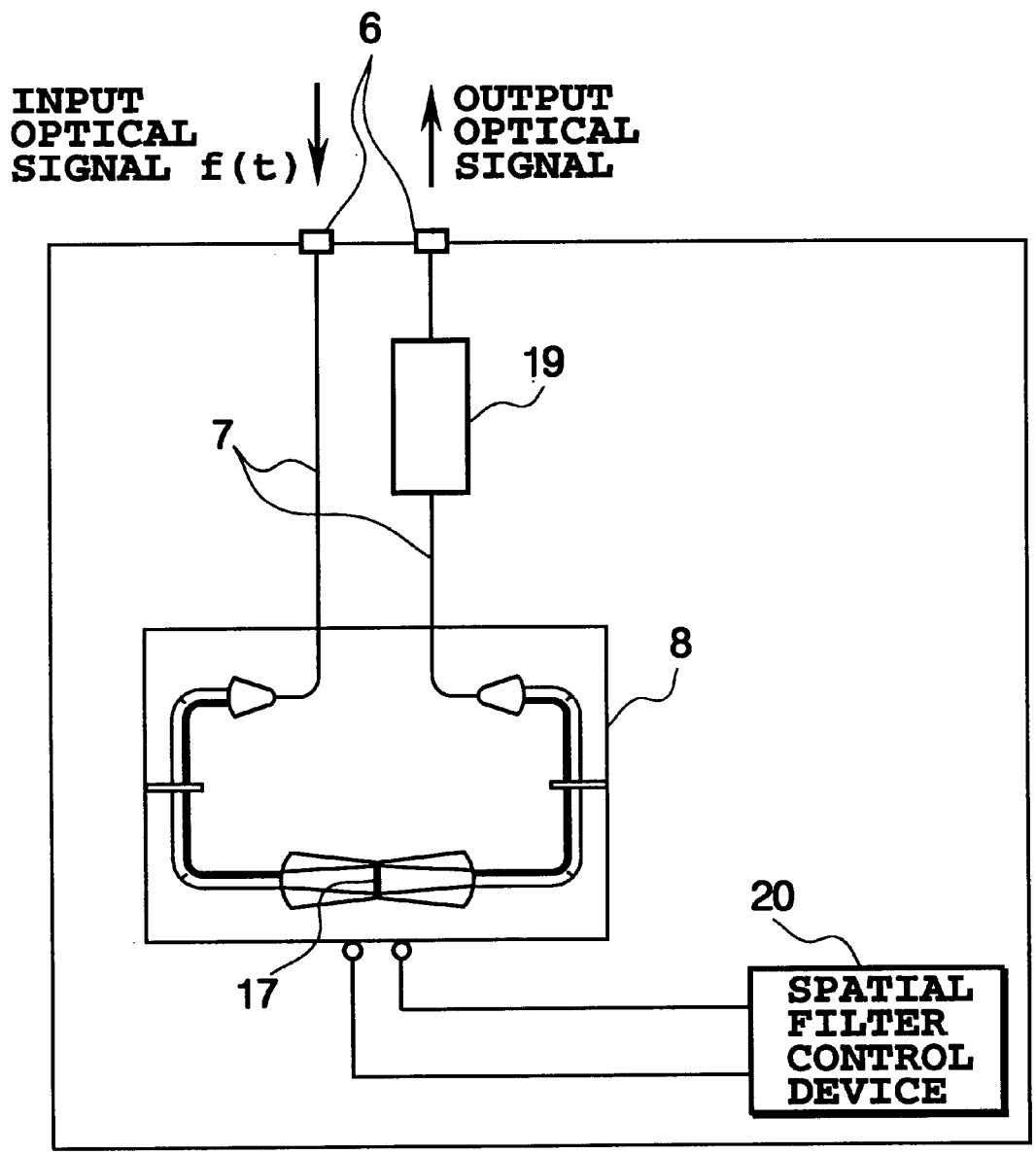
FIG. 9 is a schematic view showing another structure of the optical signal processing apparatus according to the first embodiment of the present invention.

To reshape the distorted signal f(t) back to the original signal u(t), an optical signal processing apparatus as shown in FIG. 9 can be used. A reflective type structure is shown in FIG. 8 showing the principle of optical signal processing, whereas the apparatus shown in FIG. 9 is a transmission type.

As shown in FIG. 9, the optical signal f(t) having a certain distortion is applied to a quartz optical circuit 8 from an optical fiber 7 through an optical connector 6.

Figure 10:
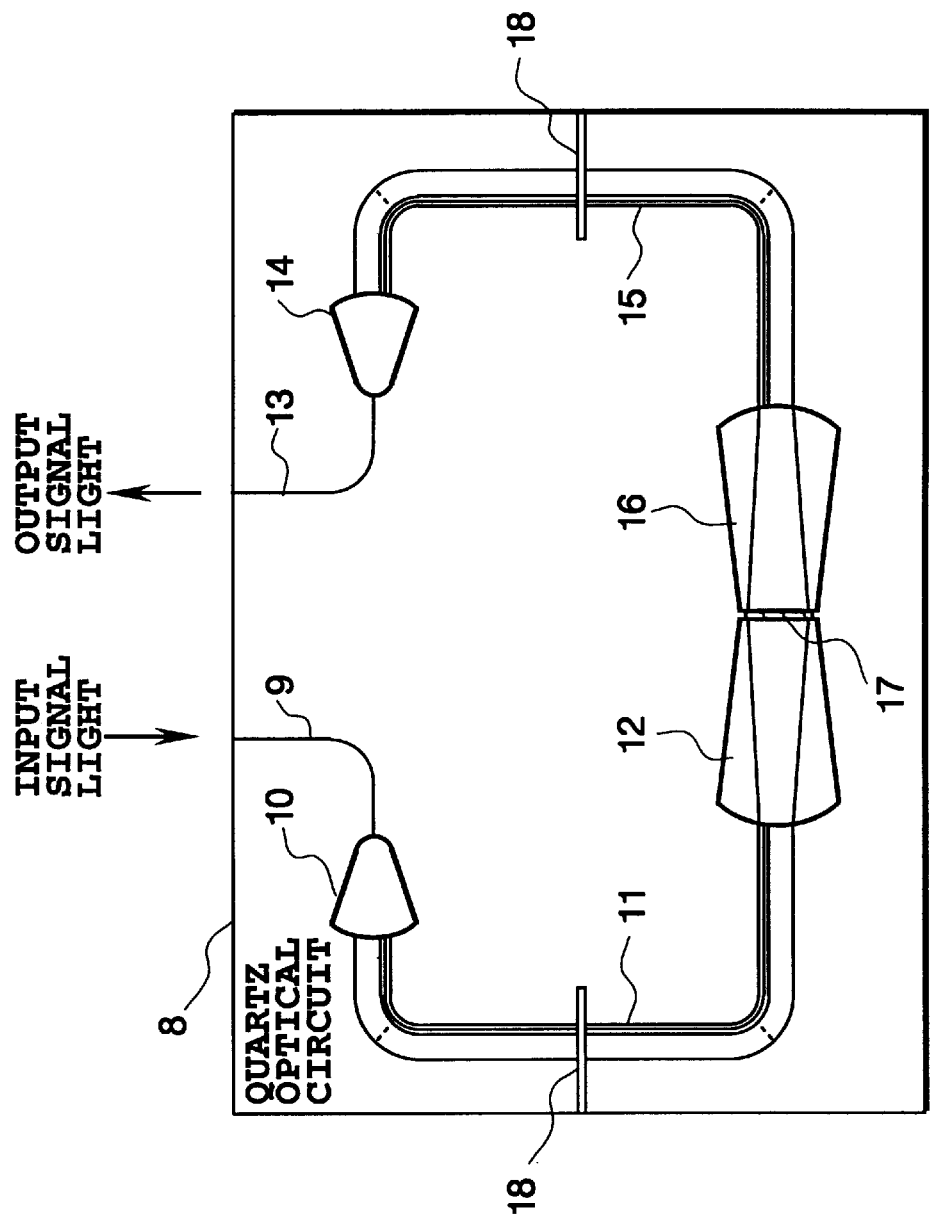
FIG. 10 is a schematic view showing a still further structure of the optical signal processing apparatus according to the first embodiment of the present invention.

The quartz optical circuit 8, as shown in FIG. 10, comprises waveguides 9 and 13, star couplers 10 and 14, arrayed waveguides 11 and 15 and slab waveguides 12 and 16, which are symmetrically disposed to a spatial filter 17.

The arrayed waveguides 11 and 15 are as necessary provided halfway with half wave plates 18 and 18 to eliminate polarization dependence.

The input signal light, after transmitting in the waveguide 9, is incident to the arrayed waveguide 11 by the star coupler 10, and focuses Fourier transformation $F(v)=U(v)H(v)$ on the focal plane S3 in the slab waveguide 12.

Here, one which has the following pattern is disposed as the spatial filter 17 on the focal plane, U(v) is given by the product with the signal.

$$H^*(v)/|H(v)|^2$$

When it is passed through the slab waveguide 16, the arrayed waveguide 15, and the star coupler 14, the signal is inverse Fourier transformed, and the restored optical signal u(t) can be taken out from the waveguide 13. When amplitude damping is large, the signal is output to the outside by the optical connector 6 through an optical amplifier 19.

Here, the spatial filter 17 may be a fixed or rewritable pattern. In the case of a fixed pattern, one which is formed with a pattern of a predetermined phase or transmittance formed by deposition or the like on a substrate such as a glass substrate may be disposed. For a rewritable pattern, an optical modulator comprising a liquid crystal or semiconductor is used as a spatial filter, phase or transmittance of each pixel on the optical modulator is controlled by a voltage output from a spatial filter controller 20.

In effect, using the optical circuit of the structure of FIG. 10, it has been confirmed that shaping is possible of distortion of optical pulse sequence of 1500 nm in wavelength comprising 100 pulses of a single pulse width of 0.2 ps and a period of 0.5 ps, by a spatial filter of fixed pattern formed on a glass substrate.

Embodiment 2

A method and arrangement thereof for generating an optical pulse according to a second embodiment of the present invention will be described with reference to FIG. 11.

In the present embodiment, a reflective type computer generated hologram (CGH) 21 is disposed on the focal plane S3. In this computer generated hologram 21, for example, Fourier transformation U(t) of an optical pulse sequence u(t) is written as a spatial frequency pattern.

Therefore, when read light is applied to a slab waveguide 23 from an optical waveguide 22, the optical pattern U(v) reflected from the hologram is transmitted in the order of the slab waveguide 23, a arrayed waveguide 24, and a star coupler 25, Fourier transformed by the principle described in Embodiment 1, and the optical pulse sequence u(t) is output from a waveguide 26.

In the present embodiment, only by applying an optical pulse as a read light, a desired optical pulse sequence written in the computer generated hologram can be generated.

Figure 12:
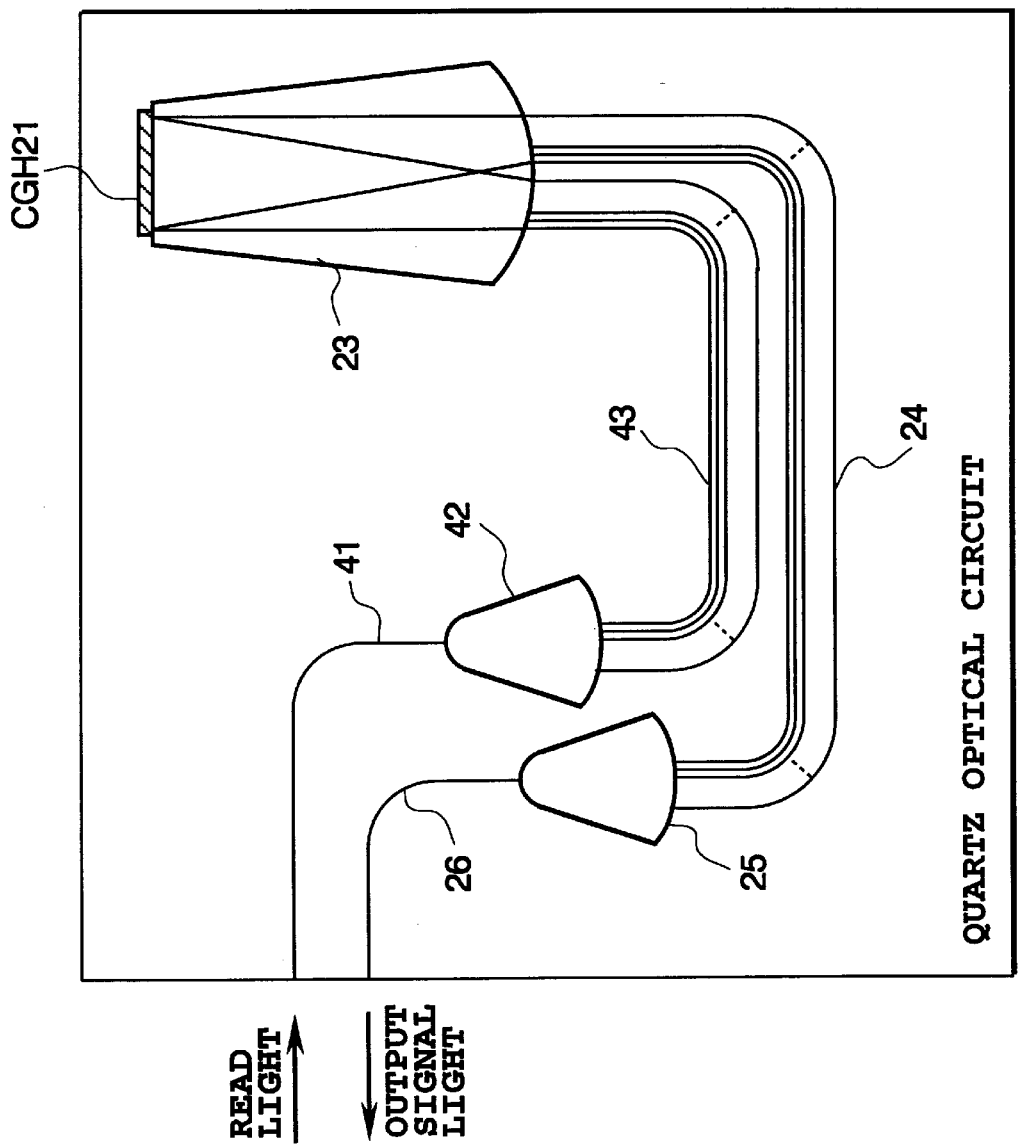
FIG. 12 is a schematic view showing a modification example of the optical signal processing apparatus according to the second embodiment of the present invention.

As a modification of the present embodiment, for example, as shown in FIG. 12, read light may be applied to a arrayed waveguide 43 through a waveguide 41 and a star coupler 42, and applied to the computer generated hologram 21 as a Fourier transformed image. However, the read light may be a short optical pulse.

Figure 13:
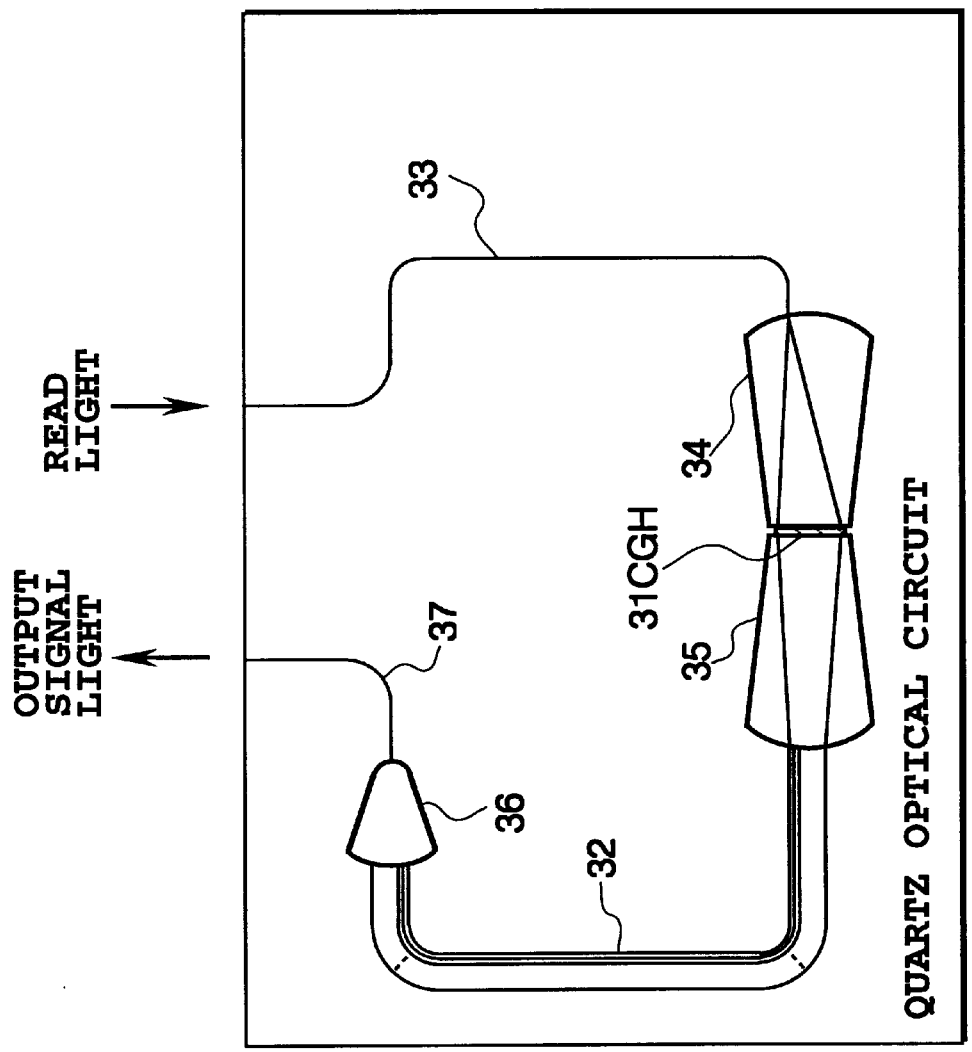
FIG. 13 is a schematic view showing another modification of the optical signal processing apparatus according to the second embodiment of the present invention.

Further, as another modification of the present embodiment, for example, as shown in FIG. 13, a transmission type computer generated hologram 31 can be used. That is, when read light is applied to a slab waveguide 34 from a arrayed waveguide 32 and a waveguide 33 at the opposite side, the optical pattern u(v) passed through the hologram is transmitted in the order of a slab waveguide 35, a arrayed waveguide 32, and a star coupler 36, inverse Fourier transformed as described above, and the optical pulse sequence u(v) is output from an optical waveguide 37.

Figure 11:
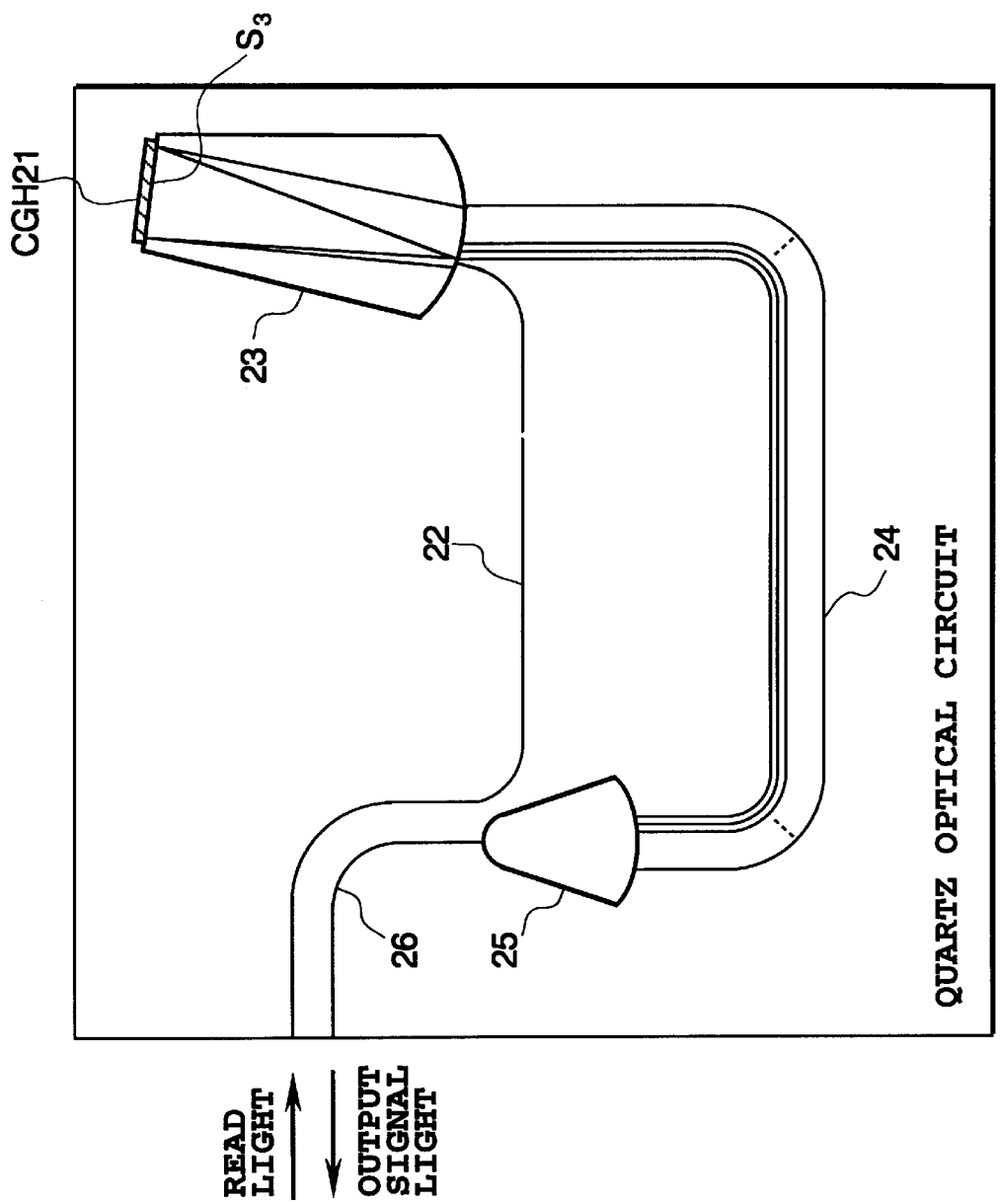
FIG. 11 is a schematic view showing the structure of the optical signal processing apparatus according to a second embodiment of the present invention.

In effect, using an optical circuit of the structure of FIG. 11, generation of an optical pulse sequence has been confirmed which comprises 100 pulses of a single pulse width of 0.2 ps and a period of 0.5 ps.

Embodiment 3

A method and arrangement thereof for temporarily storing an optical pulse according to a third embodiment of the present invention will be described with reference to FIG. 14. In the present embodiment, a photosensitive optical recording medium 51 is disposed on the focal plane S3.

Figure 14:
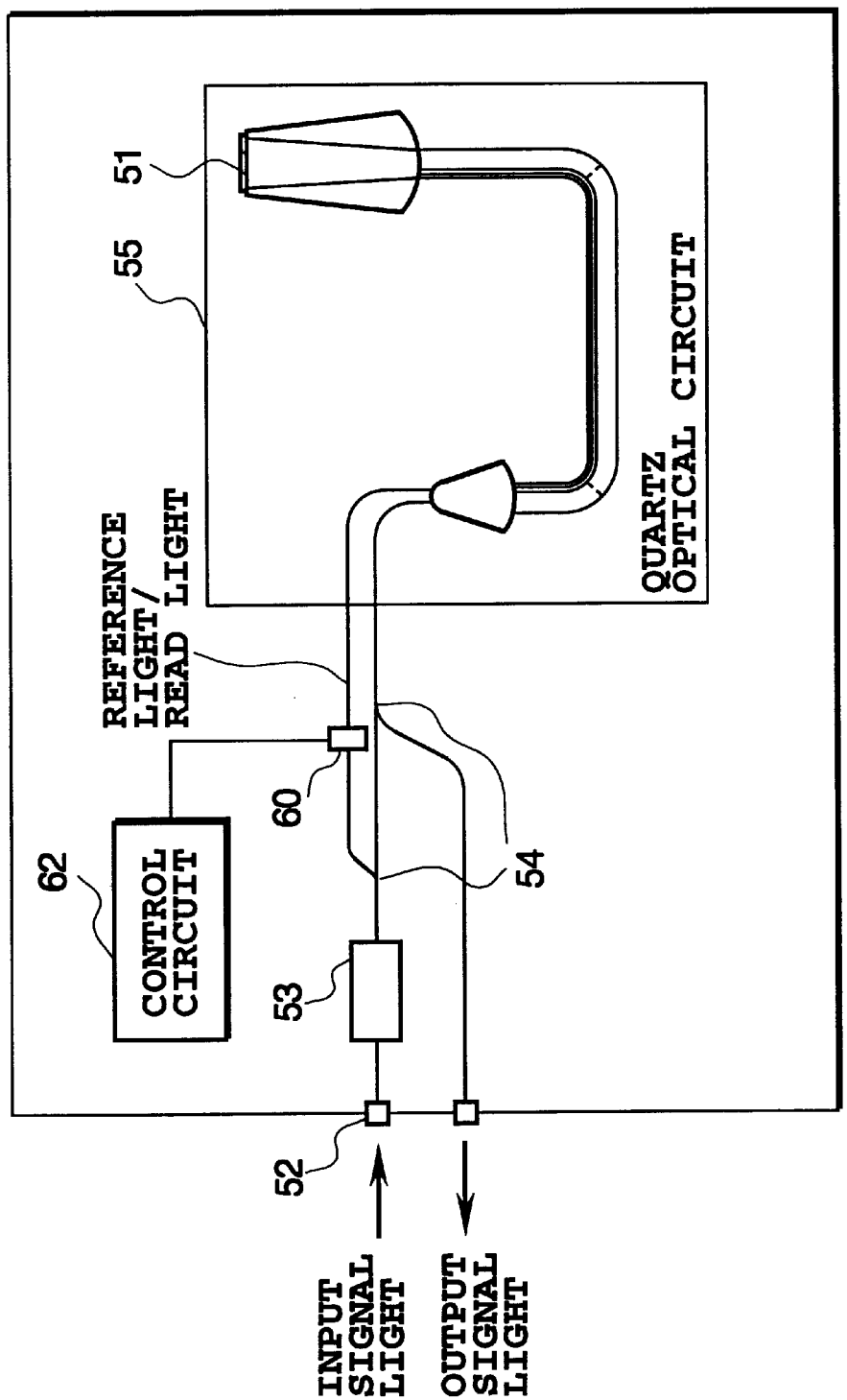
FIG. 14 is a schematic view showing the structure of the optical signal processing apparatus according to a third embodiment of the present invention.

As shown in FIG. 14, the input optical signal u(t) is introduced into the apparatus from the external by an optical connector 52, and amplified by an optical amplifier 53. Then, the signal is divided by an optical coupler 54 into signal light and reference light, and the signal light is applied, as is, to a quartz optical circuit 55.

In the quartz optical circuit 55, as shown in FIG. 15, the signal light, after being applied to a waveguide 56, is divided into a arrayed waveguide 58 by a star coupler 57.

Light output from each arrayed waveguide 58 is transmitted in a slab waveguide 59, spatially focuses Fourier transformation U(v) of the input optical signal on the focal plane S3.

On the other hand, the reference light divided from the signal light is divided by the optical coupler 54, after passing through an optical modulator 60, is applied to the quartz optical circuit 55, as shown in FIG. 15, passing through a reference waveguide 61, and then applied to the slab waveguide 59.

Figure 15A:
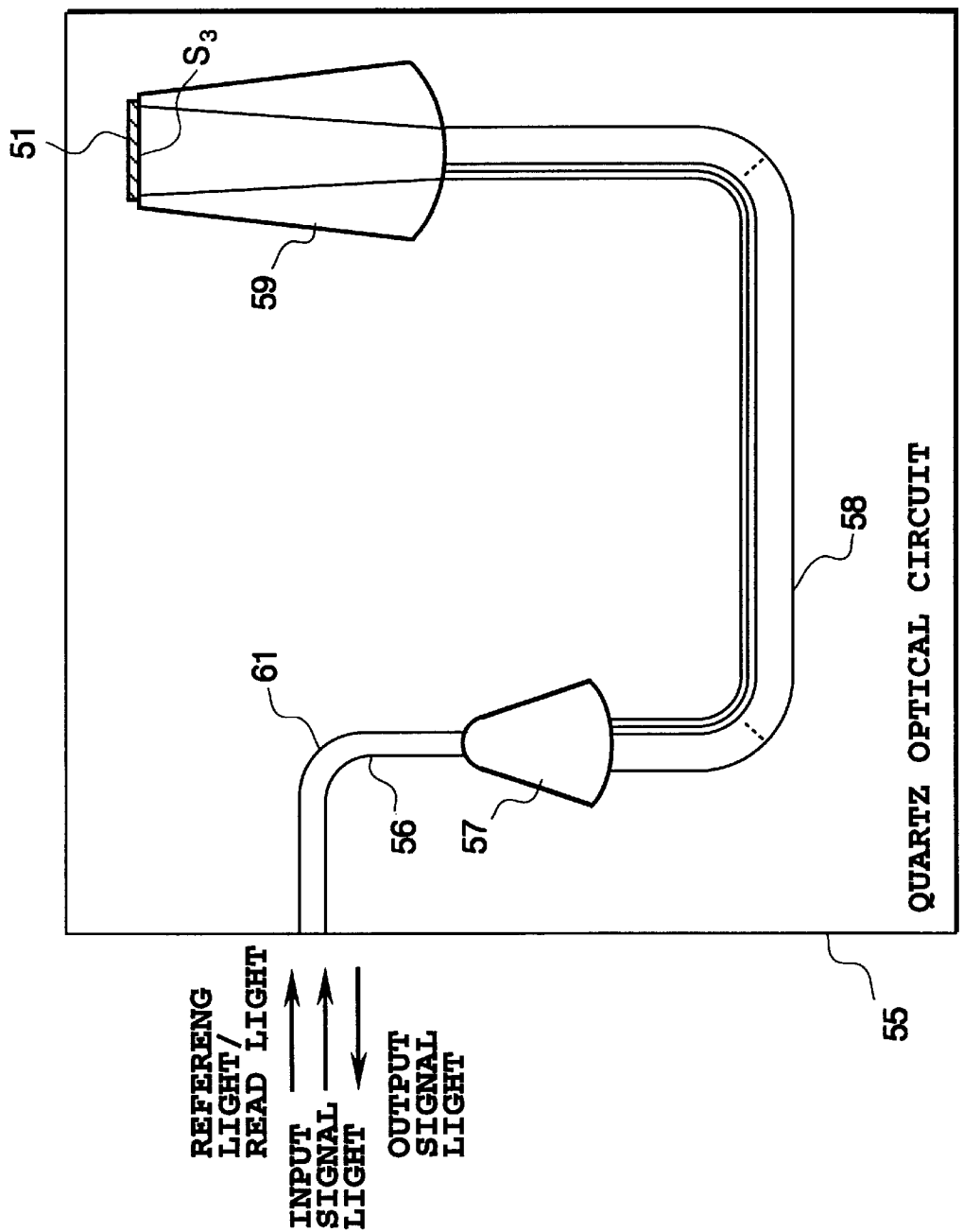
FIG. 15A is a schematic view showing the arrayed waveguide part of the optical signal processing apparatus according to the third embodiment of the present invention.

FIG. 15B shows an enlarged view of the star coupler 57 in FIG. 15A. In this case, the input waveguide end of the arrayed waveguide is disposed on a circumference, on one of a circumference about the input end from the reference waveguide 61 to the star coupler 57, and a circumference about the input end from the waveguide 56 to the star coupler 57. Normally, the number of waveguides disposed on each circumference is set nearly equal to each other.

As a result, by interference of the reference light with the signal light, U(v) is recorded as a hologram on the optical recording medium 51.

After that, when light of the same wavelength as the reference light is applied as a read light from a waveguide W2, U(v) recorded on the hologram is read, inverse Fourier transformed during transmitting in the order of the slab waveguide 59, the arrayed waveguide 58, and the star coupler 57, and the optical pulse sequence u(t) is output from the waveguide 56.

In this case, the optical modulator 60 serves to cut an optical pulse for reference light or read light from part of the signal light.

Thus, the optical pulse sequence is stored by the above described principle.

While the present embodiment shows a reflective type arrangement, it is also possible to use a construction using a transmissive type hologram in which the read waveguide is disposed at the opposite side of the hologram. Further, as in FIG. 12, an arrangement is also possible in which the reference light and the read light are applied through a arrayed waveguide.

The optical recording medium 51 can be, for example, a photo refractive device of a semiconductor multiple quantum well structure or a photosensitive film.

Still further, it is also possible to provide a plurality of reference light waveguides, so that a number of optical pulse sequence patterns are recorded on the hologram according to the individual reference light.

Yet further, when an optical sensor array is disposed in place of the hologram medium on the focal plane and only the signal light is introduced without introducing the reference light, power spectrum of the signal light can be adjusted.

Embodiment 4

Using the arrangement of FIG. 8, the number N of the arrayed waveguides is set to 340, and the order m of diffraction is set to 59. Input light is the output of a Cr/YAG laser which is band limited by a wavelength filter to produce a pulse with a central wavelength of 1549 nm, a spectral width of 2.3 nm, and a pulse width of 1.1 ps.

Figure 16:
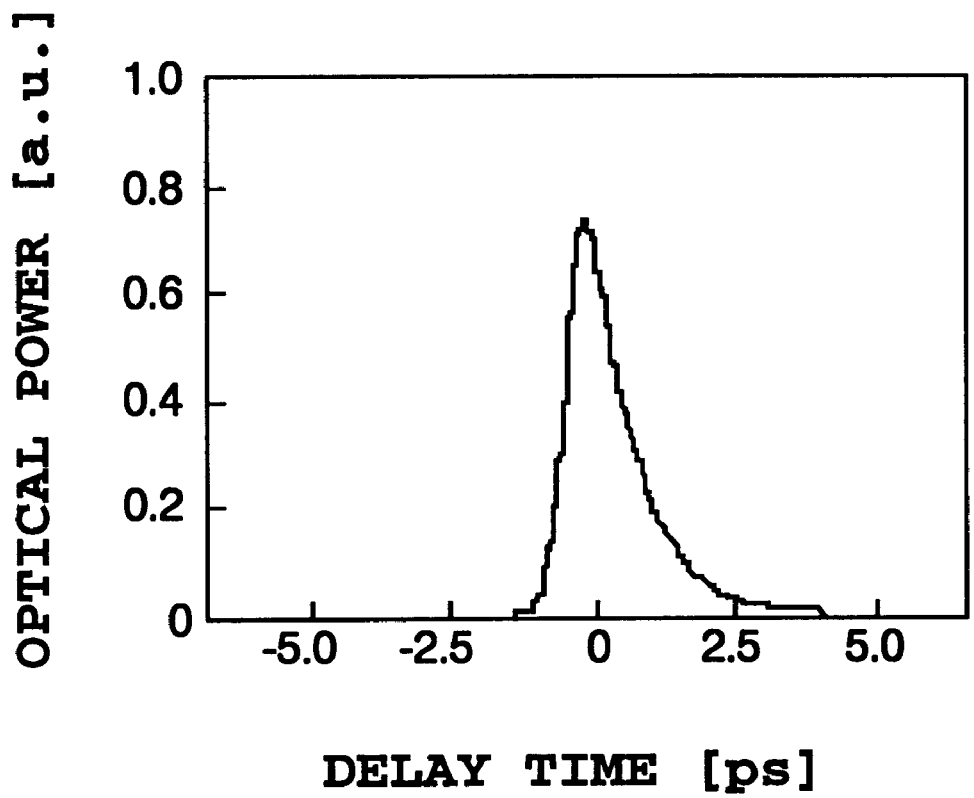
FIG. 16 is a diagram showing pulse waveform of input light to the optical signal processing apparatus according to a fourth embodiment of the present invention, for explaining the present embodiment.
Figure 17:
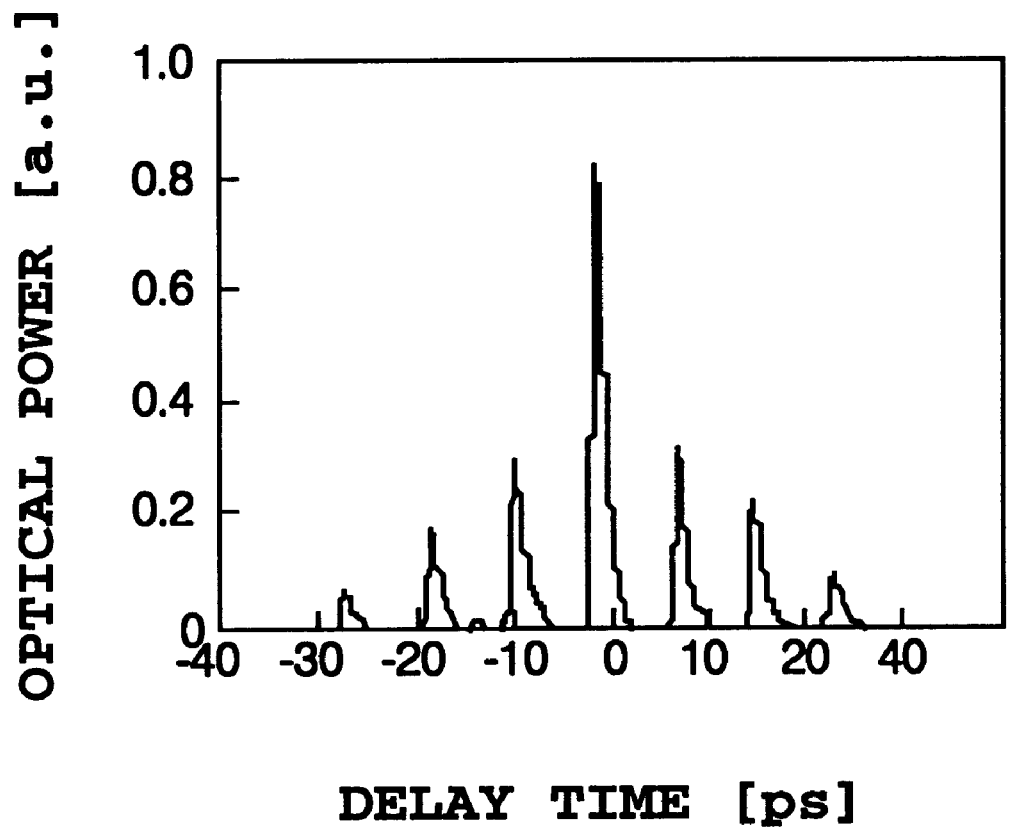
FIG. 17 is a diagram showing pulse waveform of output light to the optical signal processing apparatus according to the fourth embodiment of the present invention, for explaining the present embodiment.
Figure 18:
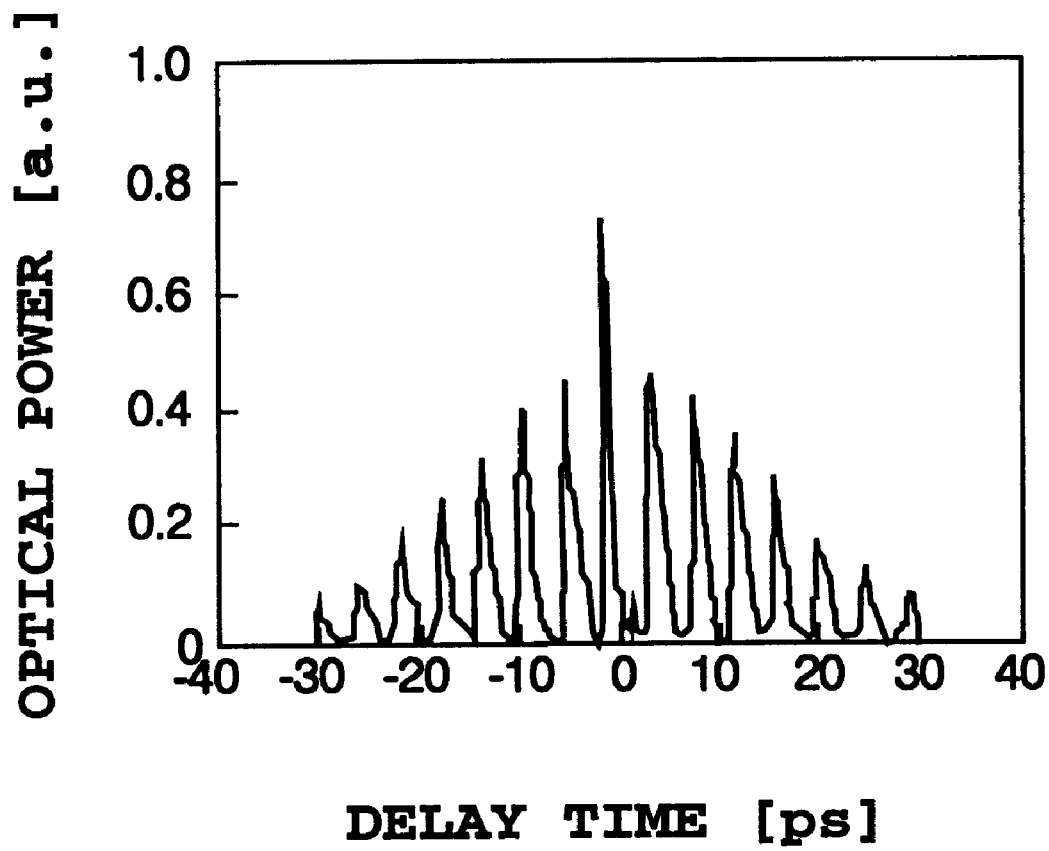
FIG. 18 is a diagram showing pulse waveform of output light to the optical signal processing apparatus according to the fourth embodiment of the present invention, for explaining the present embodiment.

A pulse waveform of the input light when optical signal generation is made with the above arrangement is shown in FIG. 16. An output waveform when processed by providing reflective type amplitude filters for pulse generation on the focal plane is shown in FIGS. 17 and 18. It has been confirmed from FIGS. 17 and 18 that the optical signal processing apparatus and the optical signal processing method according to the present invention function as designed.

Figure 19:
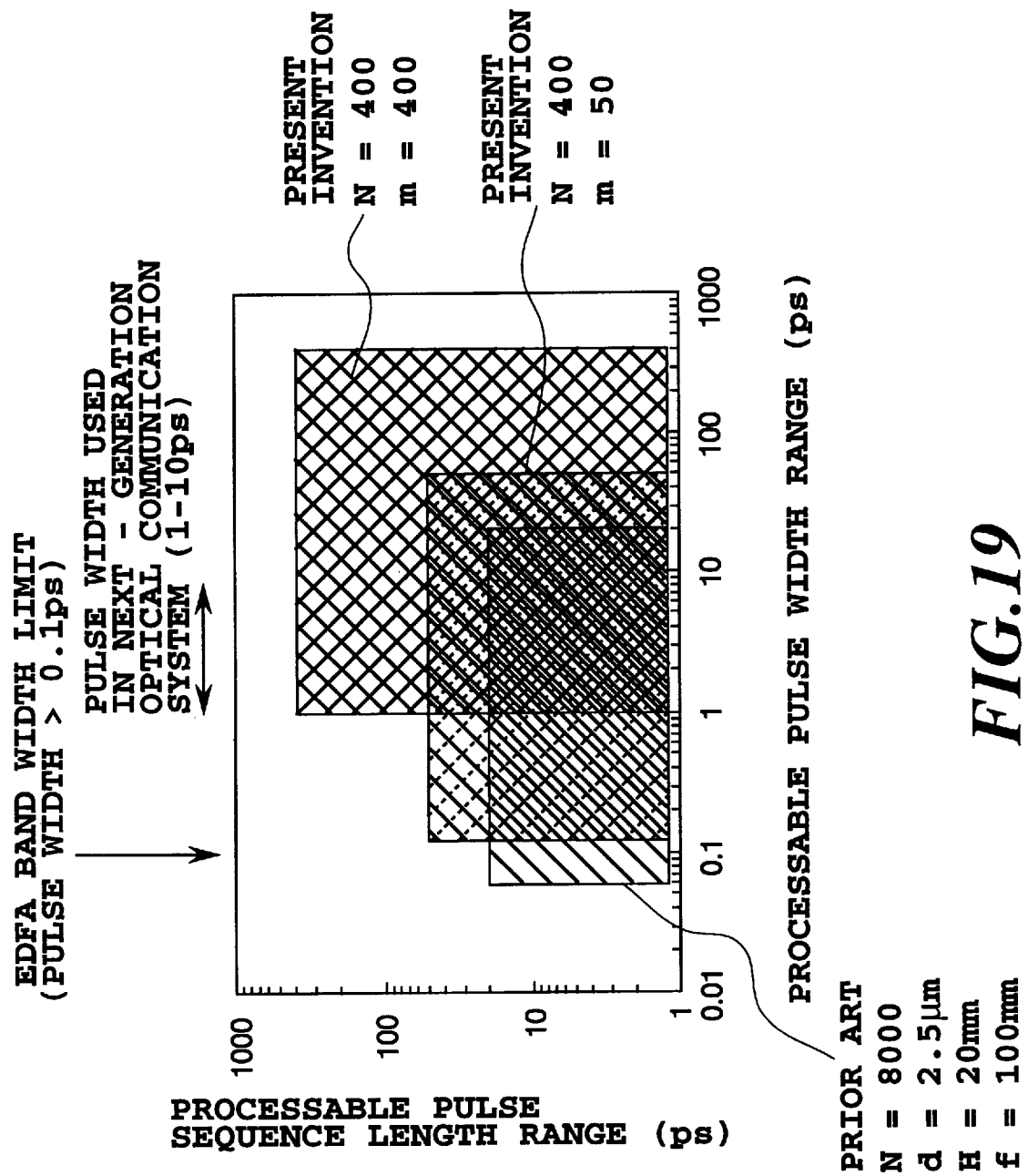
FIG. 19 is a diagram showing the relationship between treated optical pulse and the number of maximum processable optical pulses when using the apparatus according to the fourth embodiment according to the present invention and the prior art apparatus.

The relationship between the treated pulse width and the maximum number of processable pulses, when using a arrayed waveguide and when using a prior art diffraction grating, is shown in FIG. 19.

A first effect of the present invention is that the signal processing capacity (processable pulse sequence length) is high. As can be seen from FIG. 18, the arrangement according to the present invention is long in processable pulse sequence length as compared with the prior art arrangement, and design according to the pulse width of optical pulse to be processed by changing the diffraction order (m). Using numerical formulae, maximum processable pulse sequence length ($T_0$) and minimum pulse width ($\tau$) are as follows.

$T_0 \cong mN/2v_0$ (however, in the prior art, m=1, vo: central frequency, N: number of waveguides, in the prior art $\tau$ is the number of diffraction gratings irradiated with optical beam)

$\tau \cong (2f\lambda_0/v_0 Hd)\alpha$ (prior art, d: groove spacing of diffraction grating, $\lambda_0$: central wavelength, f: lens focal length, H: filter size, $\alpha$: constant (normally 0.3–0.4, depending on pulse waveform)

$\tau \cong (m/2v_0)\alpha$ (present invention)

When making dispersion compensation and the like using the present invention, processing capacity is proportional to the processable pulse sequence length. That is, the circuit of the present invention has about 10 times the capacity of the prior art.

A second effect of the present invention is that the apparatus can be made compact in structure. In the prior art, as can be seen from FIG. 1, the total length is 4f. However, with the assumption of small distortion of the lens, at least f=10 cm and a diameter of 10 cm are required to obtain the performance of FIG. 18, and the total length is about 60–70 cm and the width/height is about 30 cm. When the optical fiber input/output optical system is included, the apparatus is very large in dimensions, which is impossible to be equipped on an optical communication apparatus. However, in the present invention, the optical circuit can be bent and disposed, and since the waveguide material is higher in refractive index than the air, the apparatus can be constructed smaller in size, an apparatus having the performance of FIG. 19 can be fabricated with a quartz substrate of about 10 cm square. With a semiconductor waveguide, the size is about 5 cm square.

A third effect is that integration with other optical circuits is possible. For example, an optical amplifier is incorporated, thereby achieving optical signal processing with reduced loss.

An effect when the present invention is applied to picosecond pulse generation means is that a pulse sequence close to the transform limit can be easily generated by dispersion compensation in the resonator, and that the pulse shape can be designed by control over individual modes.

An effect when the present invention is applied to a dispersion compensation circuit is that high-order dispersion compensation, variable dispersion compensation, and wide band compensation are possible. To an optical pulse of 2 ps in pulse width, compensation of up to about 100 ps/nm is possible. Further, it is possible to dispose a kinoform (Fresnel lens) between the slab waveguide and filter/mirror to achieve waveform shaping without distortion.

An effect when the present invention is applied to a transmission apparatus is that dispersion compensation following a change in the dispersion of the transmission line is possible, system construction is possible with reduced transmission waveform degradation due to self-phase modulation, and that an amplitude modulation—angular modulation conversion circuit can be easily constructed Embodiment 5

Figure 20:
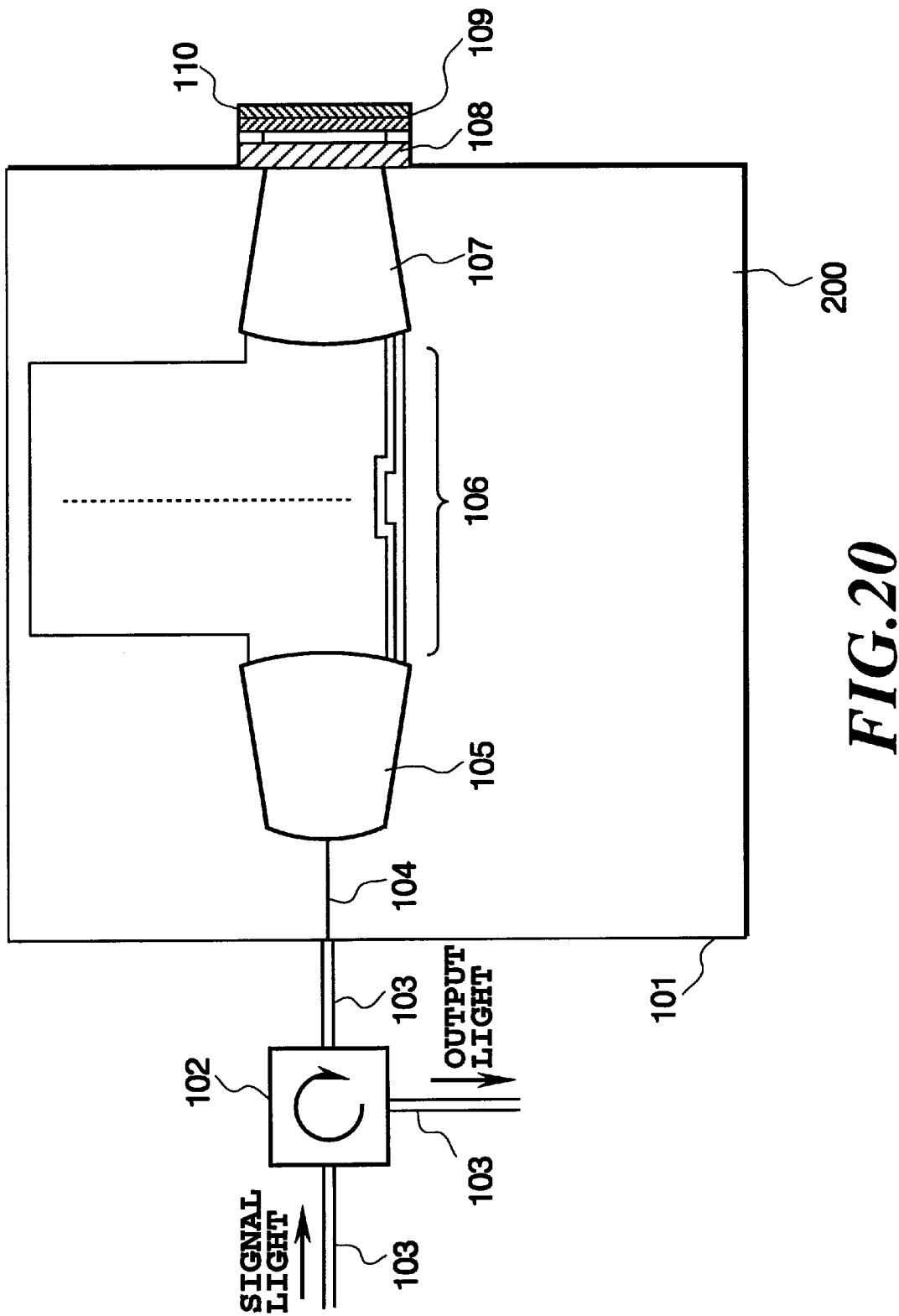
FIG. 20 is a schematic view showing the optical signal processing apparatus according to an embodiment 5 of the present invention.

FIG. 20 shows an embodiment 5 according to the present invention. In the apparatus of the present embodiment, a first slab waveguide 105 for distributing output of an optical waveguide 104, an arrayed waveguide 106 formed of a plurality of optical waveguides gradually increasing in waveguide length for generating phase difference by differing the optical length of distributed light of the slab waveguide 105, and a second slab waveguide 107 having a circular end surface and a lens function are integrated on a quartz substrate 101. In the Figure, 200 is an arrayed waveguide grating.

At the optical input side to the quartz substrate 101, signal light is input through an optical fiber 103, an optical circulator 102 for taking out return reflected light is disposed in the course of the optical fiber 103. In this case, an optical fiber coupler has the same function and can be used, however, it has an extra loss of at least 6 dB.

On the other hand, at the optical output side of the quartz substrate 101, a phase spatial modulation device represented by a Fresnel lens 108 or kinoform, a spatial filter 109, and a mirror 110 as reflection means are present.

Figure 21:
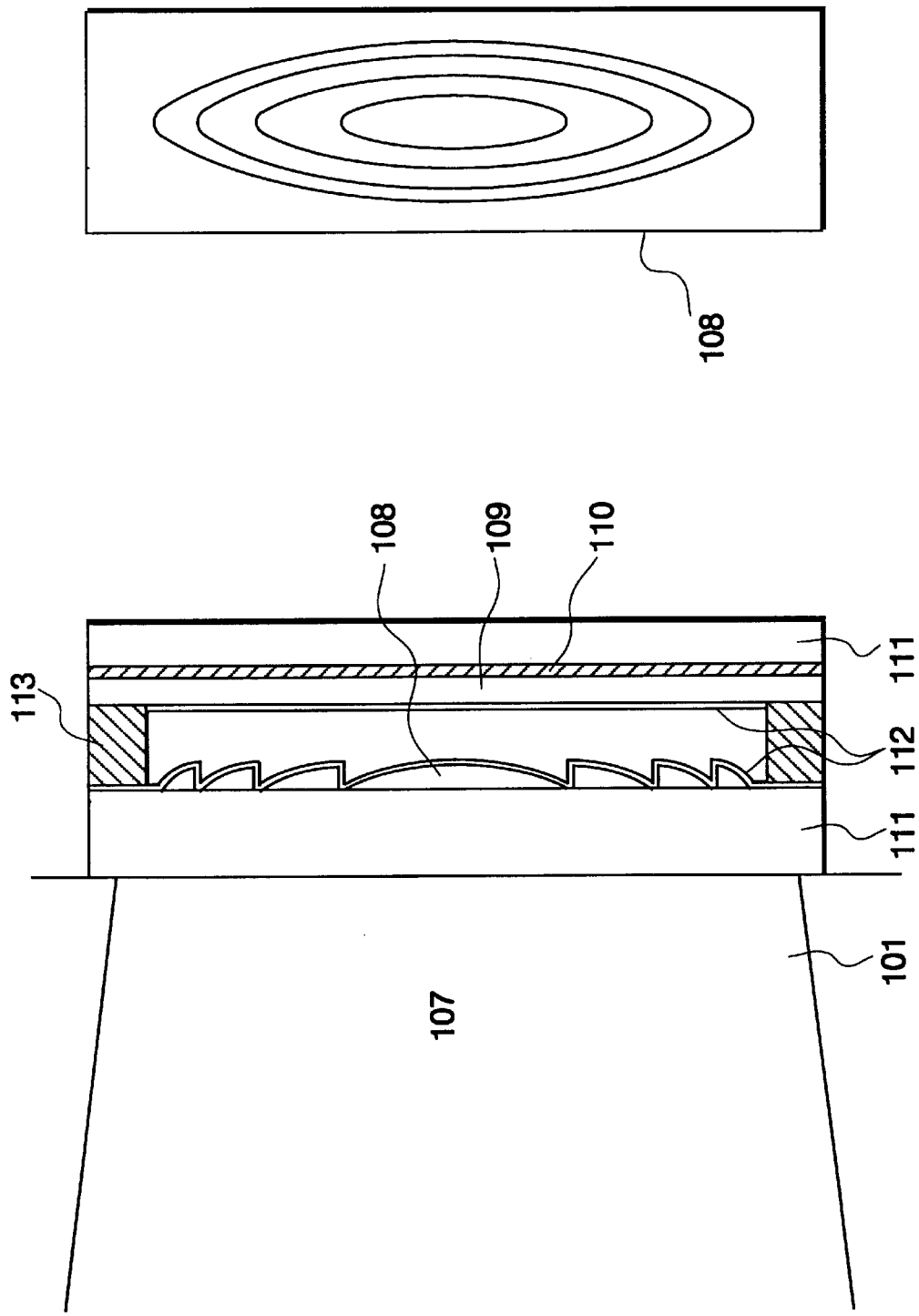
FIG. 21A is a schematic enlarged cross sectional view of a Fresnel lens of the optical signal processing apparatus according to the present invention.
FIG. 21B is a schematic plan view showing the structure of the optical signal processing apparatus according to the embodiment 5 of the present invention.

FIG. 21 is a schematic enlarged view showing the Fresnel lens 108 as a phase spatial modulation device, the spatial filter 109, and the like disposed on the quartz substrate 101, as shown in FIG. 21A, the Fresnel lens (kinoform) 108, a holding substrate 113, the spatial filter 109, and the mirror 110 are provided to be disposed between quartz substrates 111, a low reflection filer 112 is stuck on the surface of the Fresnel lens (kinoform) 108 and the surface of the spatial filter 109. In this case, the side surface shape of the Fresnel lens (kinoform) 108 is, as shown in FIG. 21B, is formed so that the contour part is elliptical, and curvature in the minor diameter direction is equal to the focal length of the slab waveguide 107, which can be fabricated by etching a material which is transparent in the operation wavelength region. The structure and production method of the Fresnel lens will be described in detail in a later embodiment.

Although greater in film thickness than a Fresnel lens, it may be fabricated by etching a spheric or an aspheric lens or the like, and used in place of the Fresnel lens 108. The fabrication method is similar to the Fresnel lens.

Figure 1:
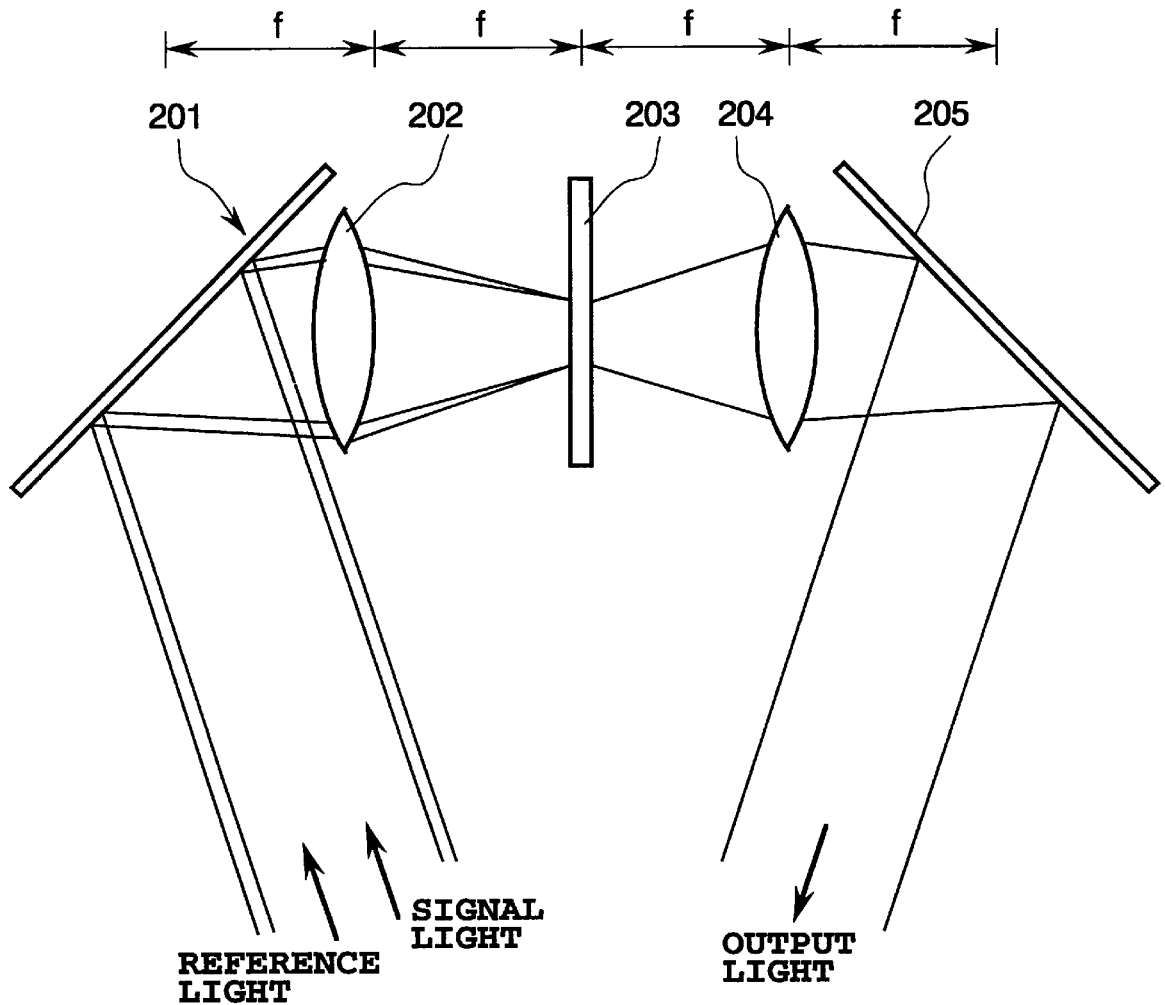
FIG. 1 is a schematic view showing an example of an optical signal processing apparatus.
Figure 2:
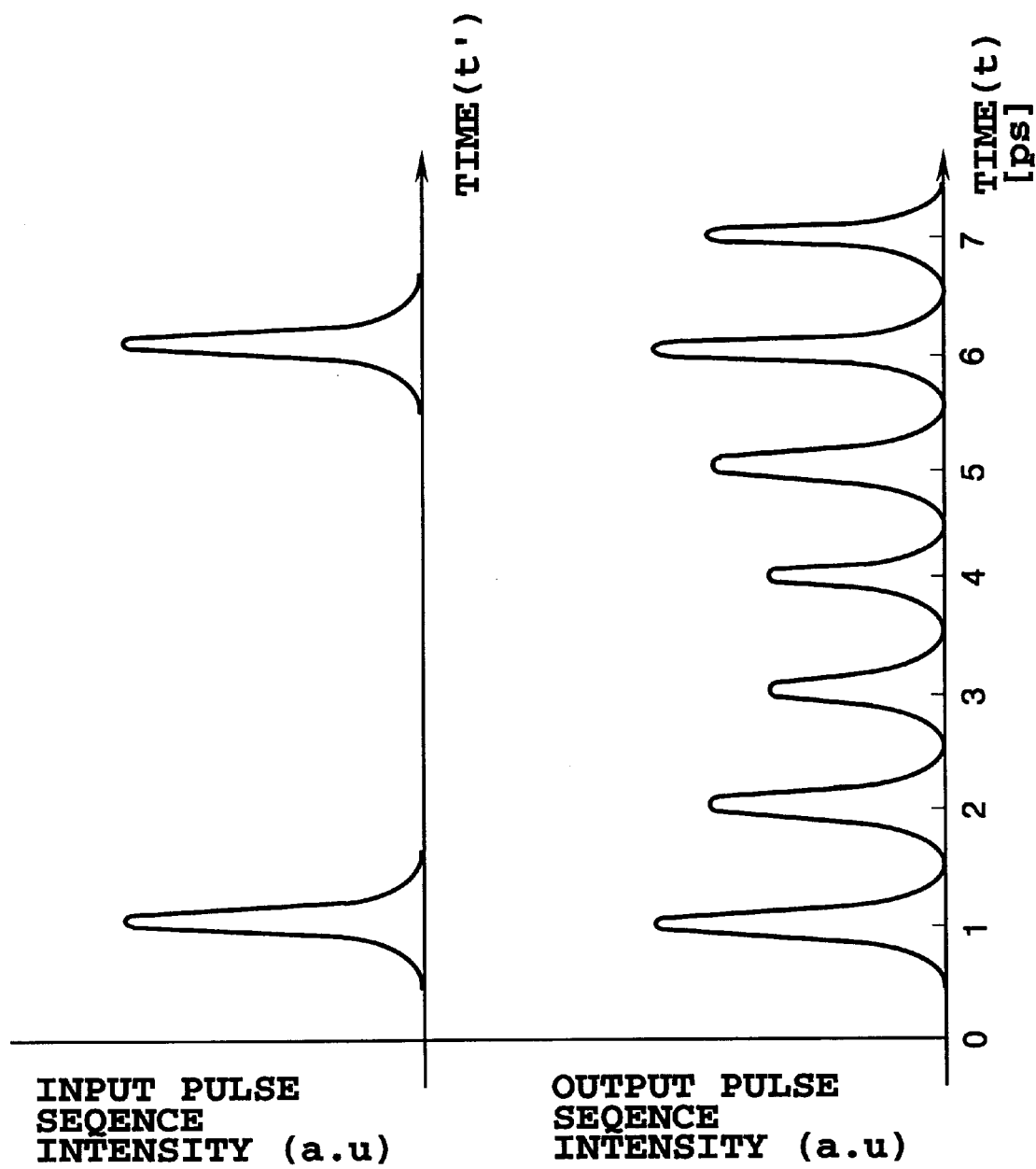
FIG. 2 is a diagram showing pulse amplitude of input optical signal and output signal in the prior art apparatus.
Figure 3:
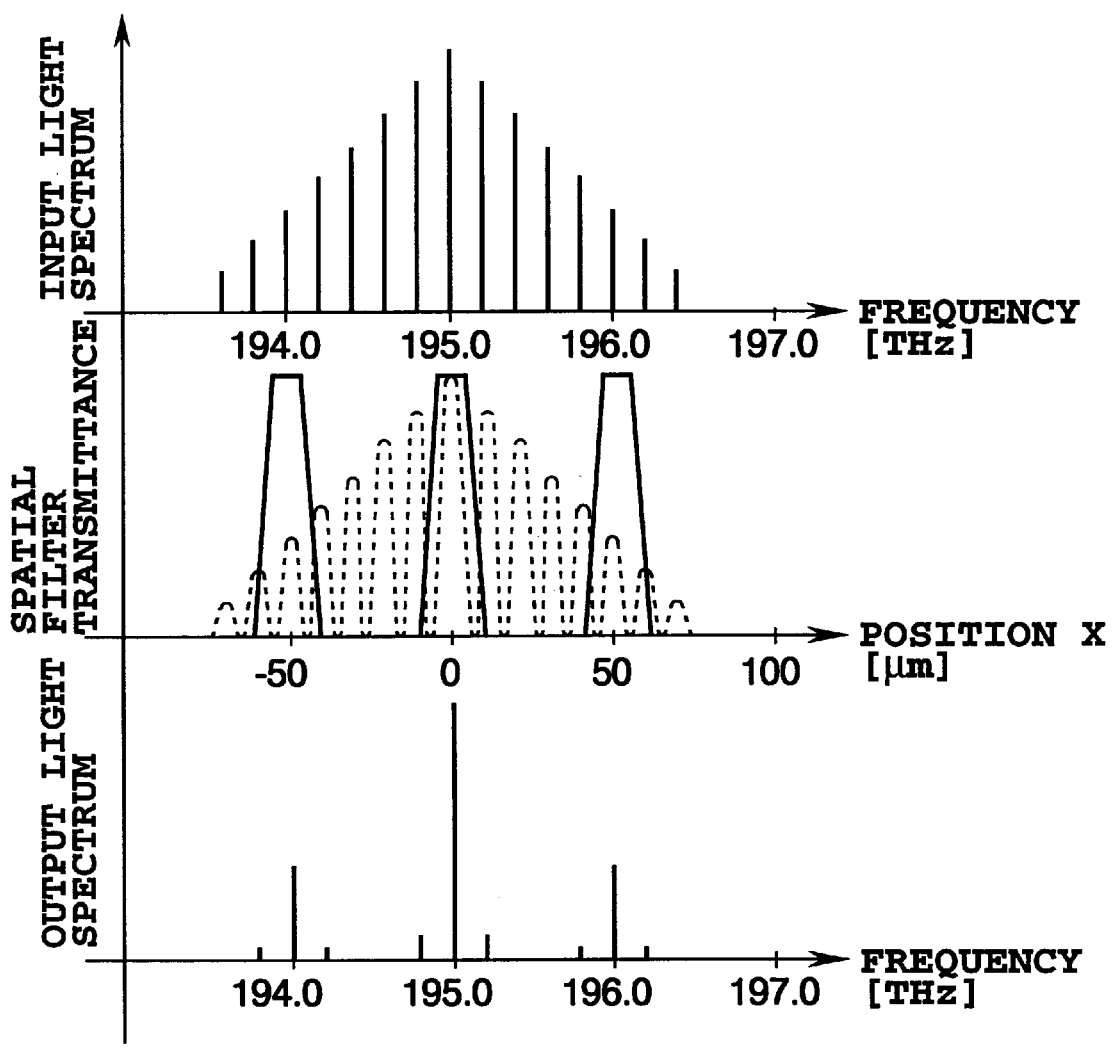
FIG. 3 is a diagram showing optical spectrum of input optical signal, spatial filter transmittance of the optical signal, and optical spectrum of output optical signal in the prior art apparatus.
Figure 4:
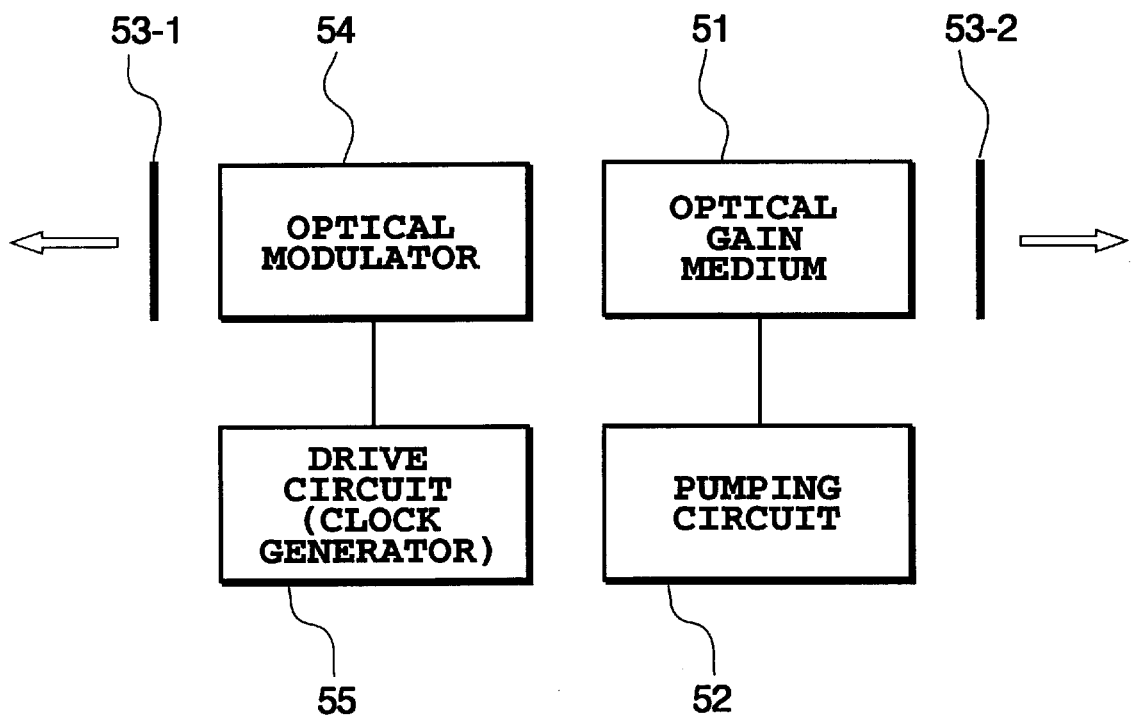
FIG. 4 is a schematic view showing the structure of a mode locked laser used as a prior art short pulse light source.

The function of the structure shown in FIGS. 20 and 21 is substantially equivalent to the function of the prior art structure shown in FIG. 1, as to the large size which is a problem in the prior art, for example, in an example of repetition signal (FIG. 22 upper part) of a pulse interval 50 ps and a pulse with 2 ps, an optical system of a beam diameter of, for example, at least 15 mm is required, an apparatus of about 50×100 cm in size is required considering the effective diameter of the lens. On the other hand, in the present embodiment, an optical length difference of a maximum of about 10 mm may be provided in the quartz waveguide, which can be integrated on a substrate of about 5×5 cm, thus there is a big difference in size.

The first slab waveguide 105, the arrayed waveguide 106, and the second slab waveguide 107 are integrated on the quartz substrate, of which the arrayed waveguide 106 differs in waveguide length by ΔL between adjacent individual waveguides to have a optical path difference of nΔL, wherein n is a refractive index of the waveguide. That is, the arrayed waveguide 106 has a wave division function same as a diffraction grating.

Output end of the arrayed waveguide is formed in a circumferential form of a radius f and connected to the second slab waveguide 107, the second slab waveguide 107 functions as a lens of a focal length f. That is, in the case of a lens, whereas it has a Fourier transformation function of image between focal planes of both ends of the lens in the vicinity of the optical axis, the second slab waveguide 107 also has a single dimensional Fourier transformation function of output image of the arrayed waveguide 106. Since the focus of the second slab waveguide is positioned on the circumferential surface on the optical axis of the second slab waveguide 107, the Fresnel lens (kinoform) 108 is provided at the output side to make the focal plane flat. The focal length in the waveguide surface of the Fresnel lens (kinoform) 108 is set equal to the above described f. The arrangement of the spatial filter 109 for modulating through the low reflection coating 112 and the mirror for reflection is as shown in FIG. 21A, however, the Fresnel lens (kinoform) 108 and the spatial filter (in the case of a phase filter) can be fabricated by etching a material which is transparent to the operating wavelength, or can be fabricated in a desired shape by adjusting exposure to the photosensitive material by direct depicting of electron beam, since the developed thickness is determined in inverse proportion to the exposure. Further, it is also possible to fabricate the Fresnel lens 108 and the spatial filter 109 by etching the substrate using the photosensitive material as a mask to process the substrate form. Still further, in the case of an amplitude filter, the light absorption film can be etched into strips with controlled line—space ratio. As to whether a phase filter or an amplitude filter is selected, the former has a problem of difficult in design, the latter has a problem of high loss, it may be selected according to the purpose, or both are provided.

Figure 22:
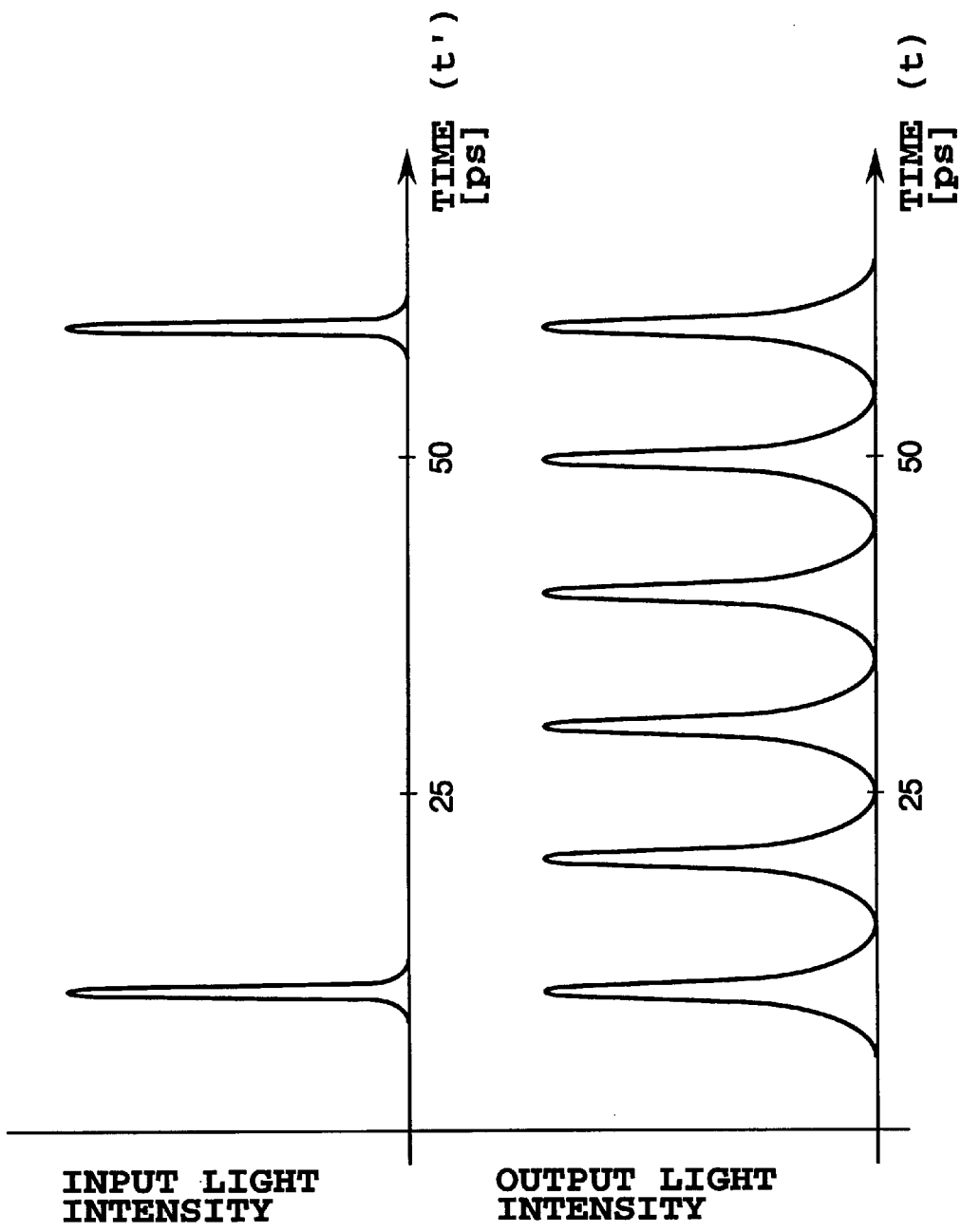
FIG. 22 is a diagram showing pulse amplitude of input signal and output signal in the optical signal processing apparatus according to the embodiment 5 of the present invention.

FIG. 22 shows an input pulse waveform of a repetition signal of a pulse interval 50 ps and a pulse width 2 ps. The input signal light is passed through the circulator shown in FIG. 20, applied to the optical waveguide 104, and distributed to individual waveguides of the arrayed waveguide 106 by the first slab waveguide 105. Then, the signal light is divided by the arrayed waveguide 106 according to the optical length difference, Fourier transformed by the second slab waveguide 107, phase modulated by the spatial filter (in this case, tentatively a phase filter) 109 through the Fresnel lens (kinoform) 108, returned by reflection of the mirror 110, inverse Fourier transformed, and taken out as an output light from the optical circulator 102. FIG. 22 lower part shows the output light waveform, which has 5 times pulse repetitions.

Figure 23:
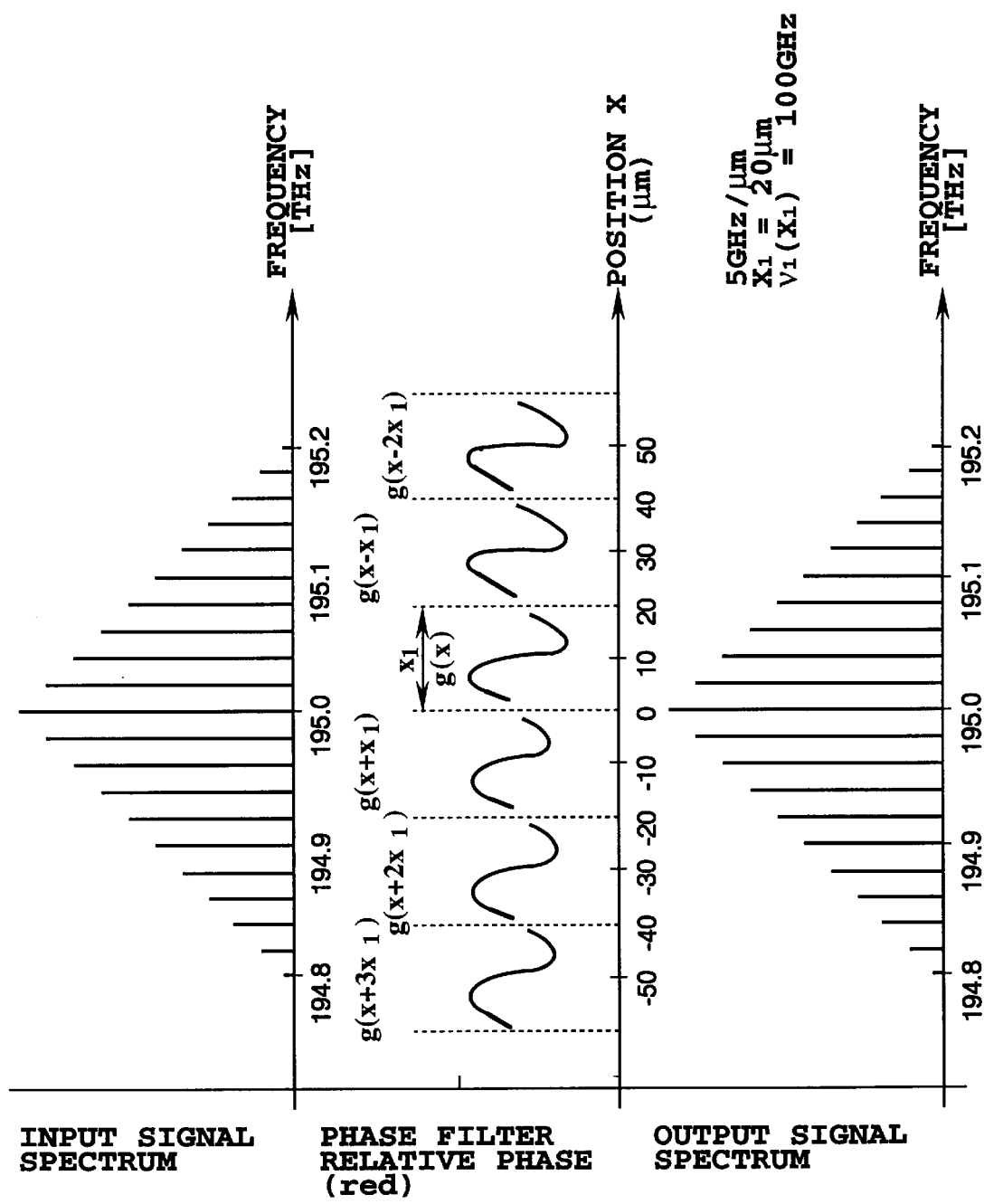
FIG. 23 is a diagram showing the relationship between optical spectrum of input optical signal, relative position of phase filter, and optical spectrum of output optical signal in the optical signal processing apparatus according to the embodiment 5 of the present invention.

In this case, the spatial filter has a positional dependence of relative phase as shown in FIG. 23 middle part.

Where $t_1$ is a pulse width of processed optical pulse, and $v_0$ is a central frequency, the amplitude vibrates n times in the pulse.

$$n = v_0 t_1$$

In this case, when a phase variation d satisfies the following formula, $$n \geq d/2\pi$$

the phase variation may be approximated as
d'≡Mod[d, 2π] (wherein [u, v] indicates a remainder using v as a modulus.).

That is, in a reflective arrangement, since light passes two times through the phase filter, the filter can be fabricated with a maximum phase change of π. Further, for the case of a transmission type, the phase variation may be approximated as d"≡Mod[d, 2π], and the filter can be fabricated with a maximum phase change of 2π.

Of course, although increasing in film thickness, it is needless to say that a phase filter for obtaining a necessary phase variation may be used.

FIG. 23 upper part shows a frequency spectrum of incident signal, and FIG. 23 lower part shows a frequency spectrum of signal light after passing through the spatial filter 109. FIG. 23 lower part is only phase modulation, and has no spectral change.

Thus, a time series waveform can be modulated.

When representing the modulation by numerical formulae, incident signal light is u(t), transmission function of filter (forward and reverse) is h(x), t is time, x is a structural position on the filter. Frequency spectral image is represented as U(V(x)) using Fourier transformation U of u. Wherein, v shows a frequency relating to the repetition structure of the filter.

Spectrum after passing through the filter is S(v(x))=U(v(x))·h(x). Waveform of the output light is inverse Fourier transformed to s(t)=u(t)*H(t). Wherein * indicates convolution integration.

As shown in FIG. 22, the repetition frequency of pulse is increased 5 times, constituted by repetitions of the same pattern in the phase filter. Where pattern is g(x), and repetition period is v1(x1), the repetition period of the pulse is 1/v1(x1).

Further, in general, pulse amplitude in the period differs. To align the pulse amplitude, each pattern may be binary phase according to M series, for example, repetition period may be divided into 15 parts (π, 0, 0, 0, π, 0, 0, π, π, 0, π, 0, π, π, π).

Where a desired waveform is s(t), and Fourier transformation thereof is S(v(x)), a desired waveform can be obtained with a filter having a transmission function represented by h(x)=S(v(x))/U(v(x)).

Figure 24C:
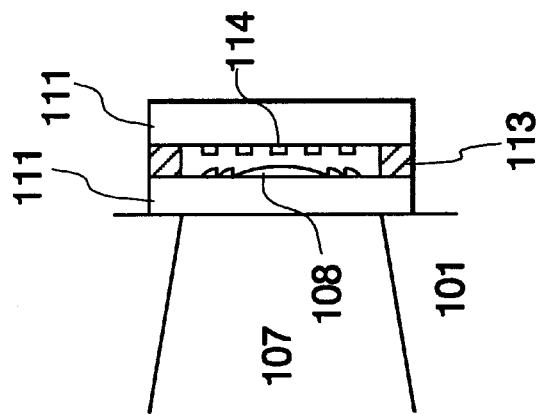
FIG. 24C is a schematic enlarged view of the Fresnel lens part of a still further modification example of the optical signal processing apparatus according to the embodiment 5 of the present invention.
Figure 24B:
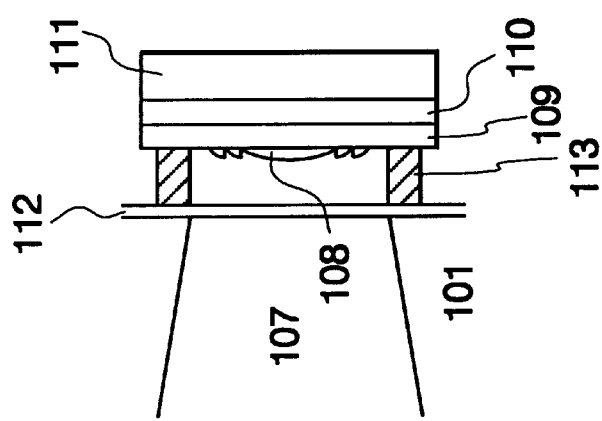
FIG. 24B is a schematic enlarged view of the Fresnel lens part of another modification example of the optical signal processing apparatus according to the embodiment 5 of the present invention.
Figure 24A:
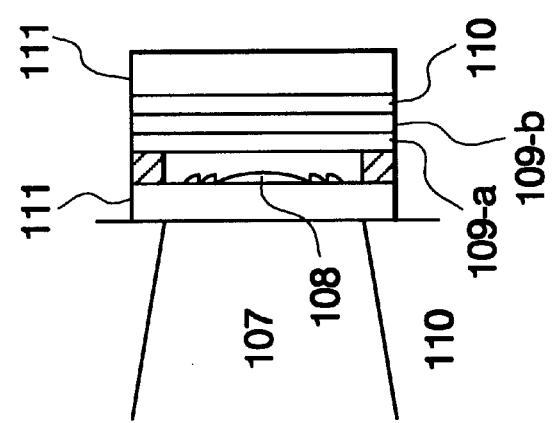
FIG. 24A is a schematic enlarged view of the Fresnel lens part of a modification example of the optical signal processing apparatus according to the embodiment 5 of the present invention.

FIG. 24 shows a modification in structure (Embodiment 5) of FIG. 20 and FIG. 21, FIG. 24A shows an example provided with both a phase filter 109a and an amplitude filter 109b for the spatial filter 109, the optical signal processing range is expanded by controlling both filters, rather than controlling one of the two filters, phase and amplitude.

FIG. 24B shows an example which is the same in function as FIG. 21, but the Fresnel lens (kinoform) 108 is mounted on the upper surface of the filter, which is simple in fabrication. However, the focal length of the Fresnel lens (kinoform) 108 must be f/ns wherein ns is a refractive index of the slab waveguide 107.

FIG. 24C shows an example in which a pattern mirror 114 serving as both the mirror 110 shown in FIG. 21 and the amplitude filter 109, which is simple in fabrication.

FIG. 24D shows an example which, in place of the slab waveguide 107 and the Fresnel lens (kinoform) 108, is provided with a lens 115 only in this part, which has slightly larger in size but high precision Fourier transformation is possible.

Further, FIG. 24E shows an example provided with a phase filter 116 which serves as both the Fresnel lens 108 and the spatial filter (phase filter) 109. This construction is difficult in design but simple in fabrication.

While Embodiment 5 is described assuming the use of quartz waveguides, it is needless to say that the same optical circuit can be fabricated with semiconductor waveguides such as InP, GaAs, or Si, or dielectric material optical waveguide such as $LiNbO_3$, or organic material optical waveguides such as polyimide. In particular, semiconductor optical waveguides are possible to construct even further compact apparatus due to their high refractive index, and an optical amplifier can be incorporated in the optical circuit.

Embodiment 6

Figure 25B:
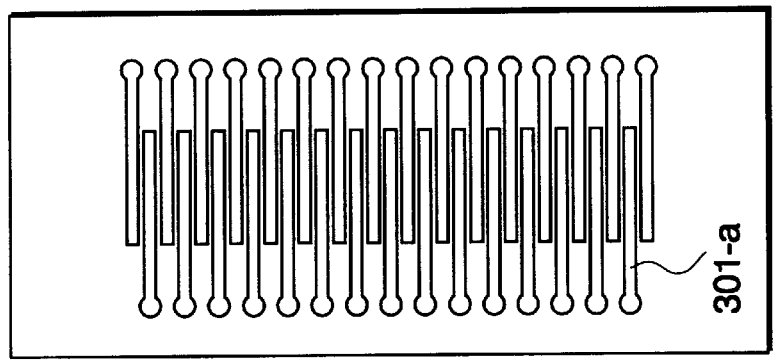
FIG. 25B is a schematic plan view showing a transparent electrode forming the spatial filter of the optical signal processing apparatus according to the embodiment 6 of the present invention.
Figure 25A:
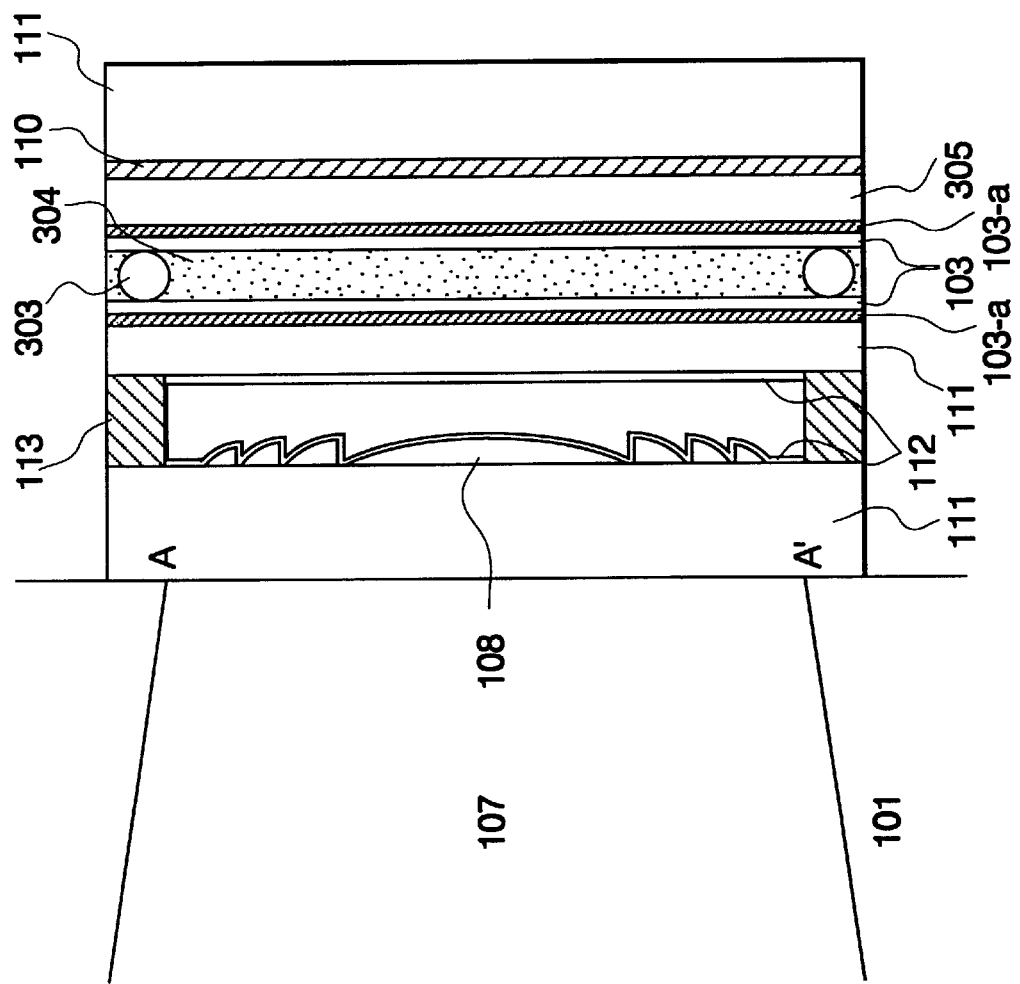
FIG. 25A is a schematic cross sectional view showing spatial filter part comprising liquid crystal of the optical signal processing apparatus according to an embodiment 6 of the present invention.

FIG. 25A shows an example in which the spatial filter shown in FIG. 21 is made from a liquid crystal, 301a and 301b are transparent electrodes, 302 is an alignment film, 303 is a spacer, 304 is a nematic liquid crystal, and 305 is a quarter-wave plate. The quarter-wave plate is necessary for eliminating polarization dependence when using a polarization-dependent spatial filter, and f axis and s axis of the quarter-wave plate are disposed with a 45-degree inclination to the waveguide facet (A-A' line in FIG. 25A). Orientation of the liquid crystal is homogeneous orientation parallel or perpendicular to the waveguide facet (A-A' line in FIG. 25A).

FIG. 25B shows the structure of the transparent electrode 301a, which has strip-formed electrodes and the individual electrode can be applied with an optional voltage. By applying a voltage, orientation of crystal is changed, phase difference is changed between the transparent electrodes 301a and 301b, since the electrodes are provided in strips, a desired spatial phase filter can be achieved. That is, in this example, it is possible to make optical signal processing as necessary by adjusting the phase filter. Further, a twist nematic liquid crystal may be used as the liquid crystal. In this case, the quarter-wave plate is unnecessary. When the applied voltage is sufficiently high, this arrangement functions as a polarization independent phase modulator.

Embodiment 7

FIG. 26 shows an embodiment 7 of the present invention, in which the optical path is bent to form an even smaller sized apparatus. In FIG. 26, 401 is a core of optical waveguide, 402 is a mirror, 403 is a groove on a slanted (7–8 degrees) end surface. In the present embodiment, an optical bend unit is formed of the groove 403 for bending light and the mirror 402 so that the focal plane of the slab waveguide 107 is on the mirror 110. In the present embodiment, since the filter can be disposed on the quartz substrate, an even smaller sized apparatus can be constructed. The groove can be easily formed using a reactive ion etching apparatus.

Embodiment 8

Figure 27:
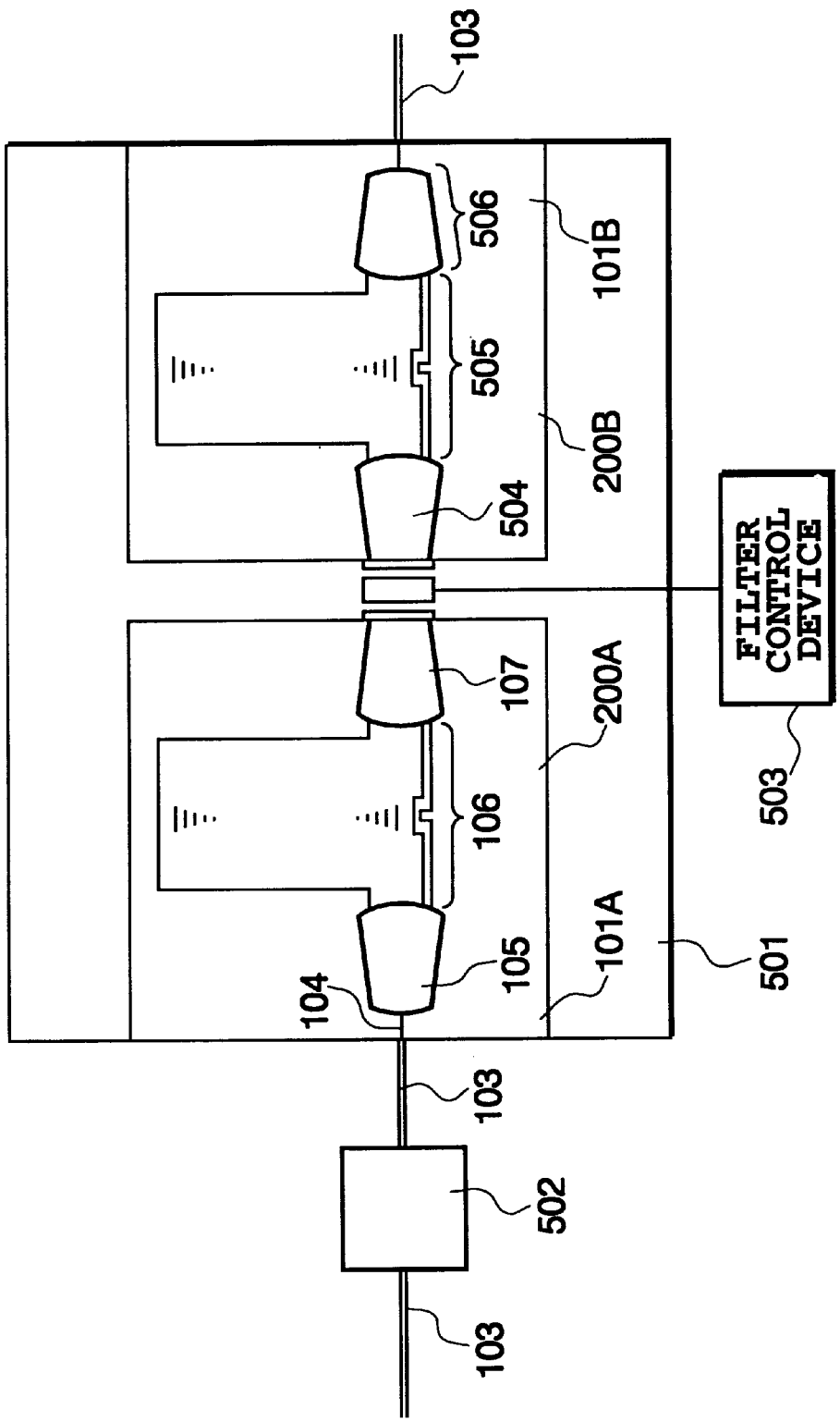
FIG. 27 is a schematic view showing the structure of the optical signal processing apparatus according to an embodiment 8 of the present invention.

FIG. 27 shows a transmission type structure, in which a first quartz substrate 101A having the first arrayed waveguide 106 and a second quartz substrate 101B having a second arrayed waveguide 505 are disposed on a heat sink 501. The two quartz substrates 101A and 101B are symmetrical in structure. That is, the quartz substrate 101A is integrated thereon with a first slab waveguide 105 for wave division, a first arrayed waveguide 106, and a second slab waveguide 107 for focusing, the second quartz substrate is also integrated thereon with a first slab waveguide 504, a second arrayed waveguide 505, and a second slab waveguide 506 for wave synthesis. A spatial filter and the like are disposed between the quartz substrates 101A and 101B. 502 denotes an optical amplifier.

An arrayed waveguide grating 200A is formed on the quartz substrate 101A on the heat sink 501, and similarly a second arrayed waveguide grating 200B is formed on the quartz substrate 101B on the heat sink 501, disposed symmetrically about the spatial filter. The first arrayed waveguide grating 200A comprises an optical waveguide 104, a first slab waveguide 105, and arrayed waveguide 106, and a second slab waveguide 107. The other second arrayed waveguide grating 200B similarly comprise a first slab waveguide 504, an arrayed waveguide 505, a second slab waveguide 506, and an optical waveguide 507.

Figure 28:
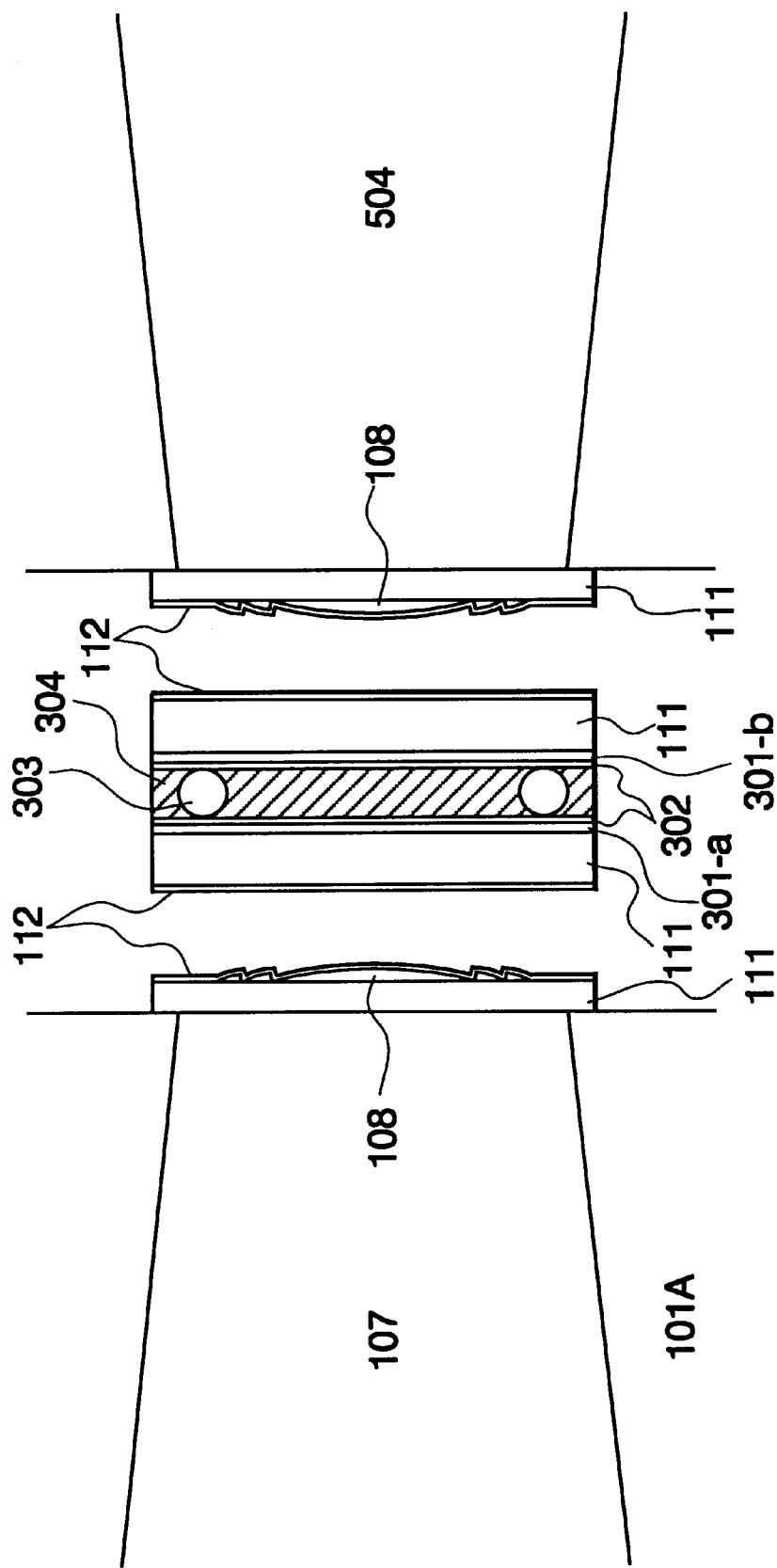
FIG. 28 is a schematic enlarged cross sectional view in the vicinity of spatial filter provided at a central part of the optical signal processing apparatus according to the embodiment 8 of the present invention.

FIG. 28 is an enlarged view, the spatial filter is one which is similar to that of FIG. 25, but since it is a transmission type, it is required to obtain at least a phase difference ($2\pi$). Further, the mirror 110 and the quarter-wave plate 305 of FIG. 25 are unnecessary and omitted. Since this construction has a polarization dependence, when eliminating the dependence, two stages of filters may be connected perpendicularly. The transmission type construction of the present embodiment is equivalent in operation to the construction shown in FIG. 20. While the apparatus becomes large, the circulator 102 of FIG. 20 is unnecessary and the loss can be reduced. 503 in FIG. 27 denotes a filter control unit.

Figure 29D:
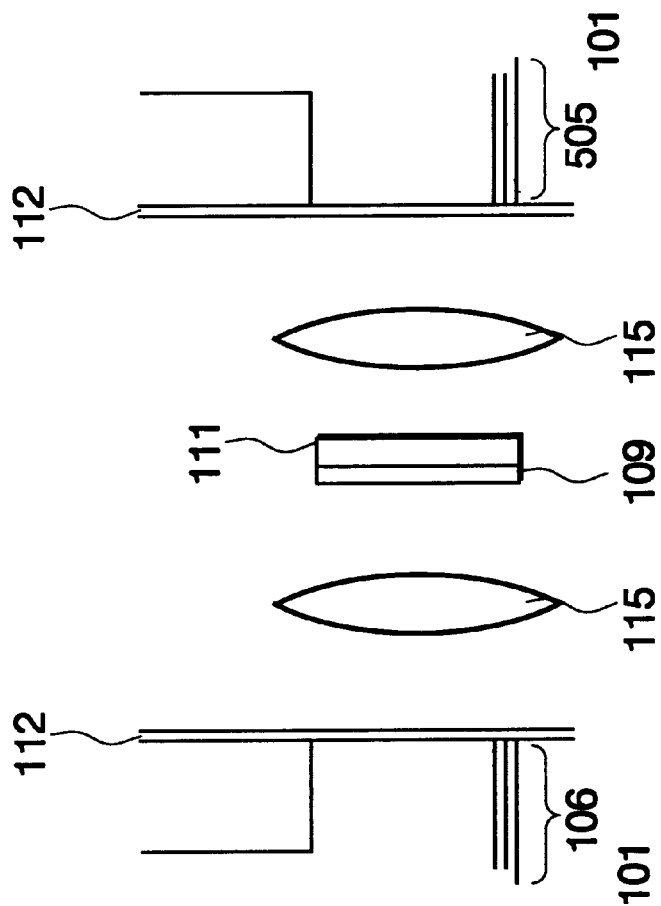
FIG. 29D is a schematic enlarged cross sectional view in the vicinity of spatial filter of a yet further modification example of the optical signal processing apparatus according to the embodiment 8 of the present invention.
Figure 29C:
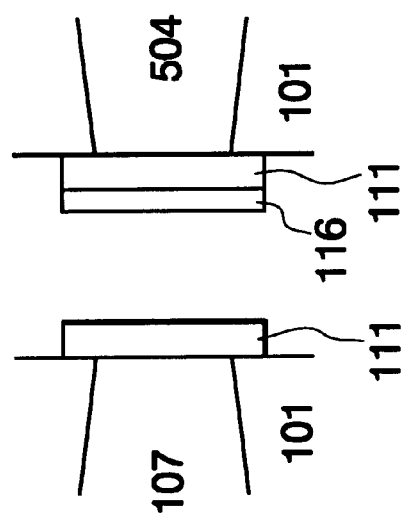
FIG. 29C is a schematic enlarged cross sectional view in the vicinity of spatial filter of a still further modification example of the optical signal processing apparatus according to the embodiment 8 of the present invention.

FIG. 29 shows a modification of the embodiment 8 shown in FIGS. 27 and 28, FIG. 27A is an example using a fixed spatial filter, FIG. 29B is an example using the Fresnel lens (kinoform) 108 formed on the substrate, FIG. 29C is an example using a phase filter 116 which serves as both Fresnel lens (kinoform) and phase filter, and FIG. 29D is an example using a lens 115 in place of the first slab waveguides 107 and 504. In this case, since the spatial filter is transmission type, at least a phase difference of $2\pi$ can be obtained.

Embodiment 9

Figure 30:
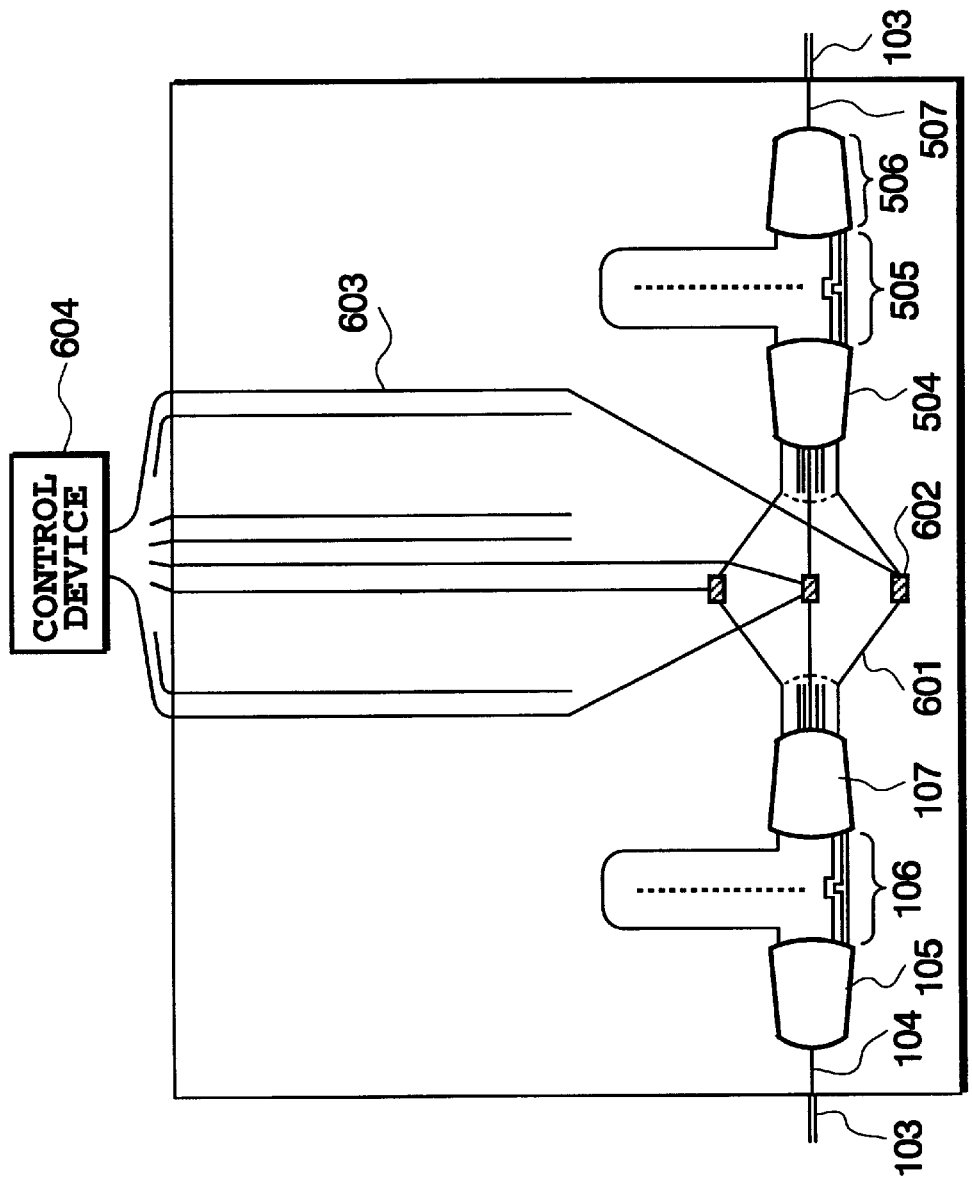
FIG. 30 is a schematic view showing the structure of the optical signal processing apparatus according to an embodiment 9 of the present invention.
Figure 31:
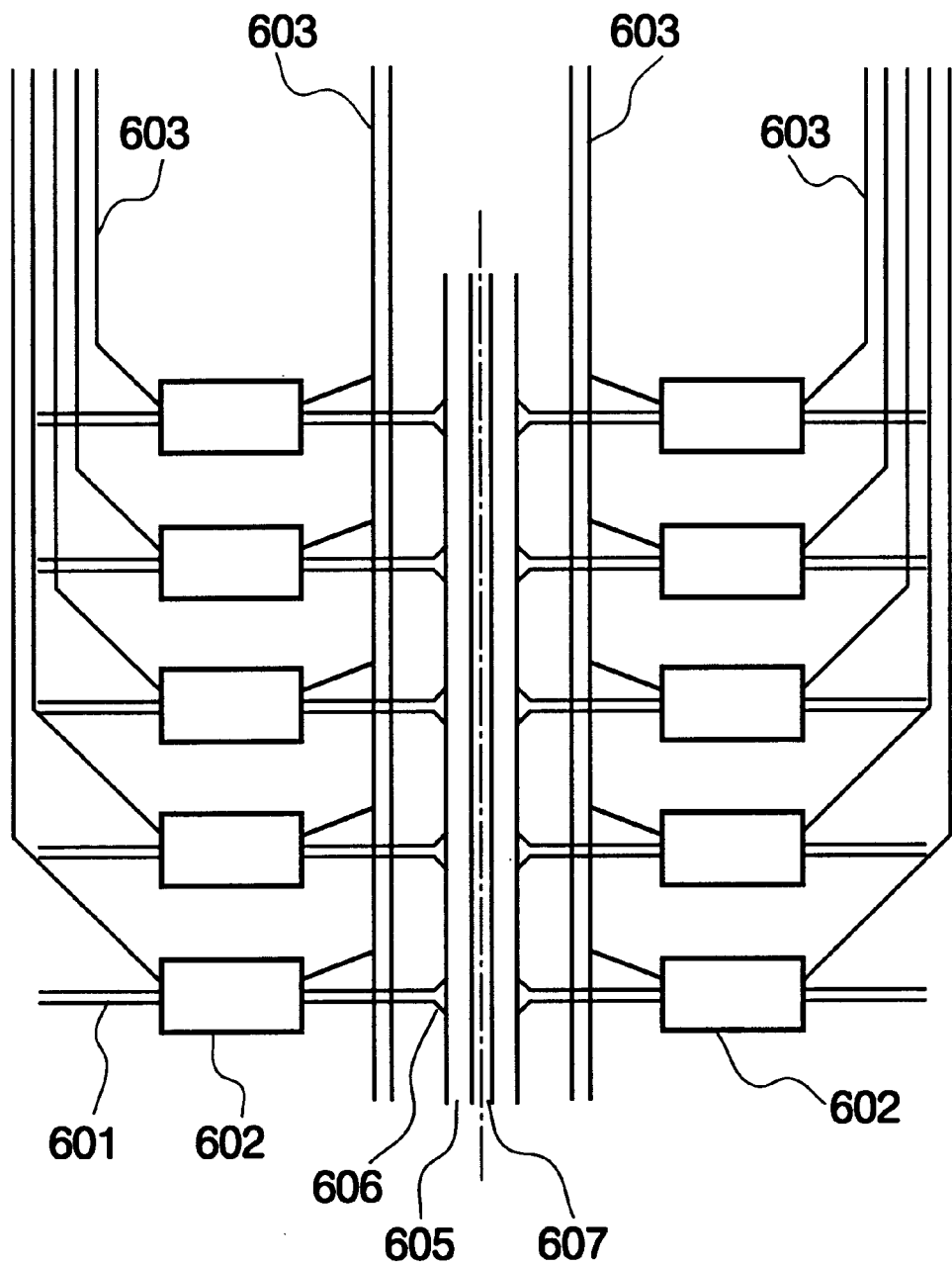
FIG. 31 is a schematic enlarged view showing the structure of the optical signal processing apparatus according to the embodiment 9 of the present invention.

FIG. 30 shows another example of transmission type, in which phase adjustment is achieved by heating. That is, 601 is an arrayed waveguide, 602 is a heating electrode, 603 is a wiring, and 604 is a control unit. FIG. 31 shows an enlarged view of the arrayed waveguide. Here, 605 is a groove provided in the waveguide, 606 is a taper structure for reducing connection loss, and 607 is a half-wave plate. The groove 605, the taper 606, and the half-wave plate are a structure for reducing polarization dependence of the waveguide, which can also be used in other arrayed waveguide as necessary. Since, in general, refractive index of a material has a temperature dependence, optical length of waveguide, that is, the phase, can be modulated by heating. In this case, the phase of each waveguide of the arrayed waveguide 601 can be adjusted by adjusting the current in the electrode 602. That is, when it is disposed so that input end of the arrayed waveguide 601 is Fourier transformation plane by the slab waveguide 107, the arrayed waveguide 601, the heating electrode 602, the groove 605, the taper 606, and the half-wave plate 607 function as a variable phase filter. To facilitate phase control, fabrication is made so that the phase difference between individual waveguides of the arrayed waveguide 601 is an integer multiple of $2\pi$. Also in the present embodiment, same as in the case of FIG. 25, optional phase variation and flexible optical signal are achieved.

Further, as indicated by the virtual line in FIG. 31, a construction is possible in which the spatial filter and the half-wave plate are disposed at the center to be connected to the phase adjustment arrayed waveguide end.

Embodiment 10

Figure 32:
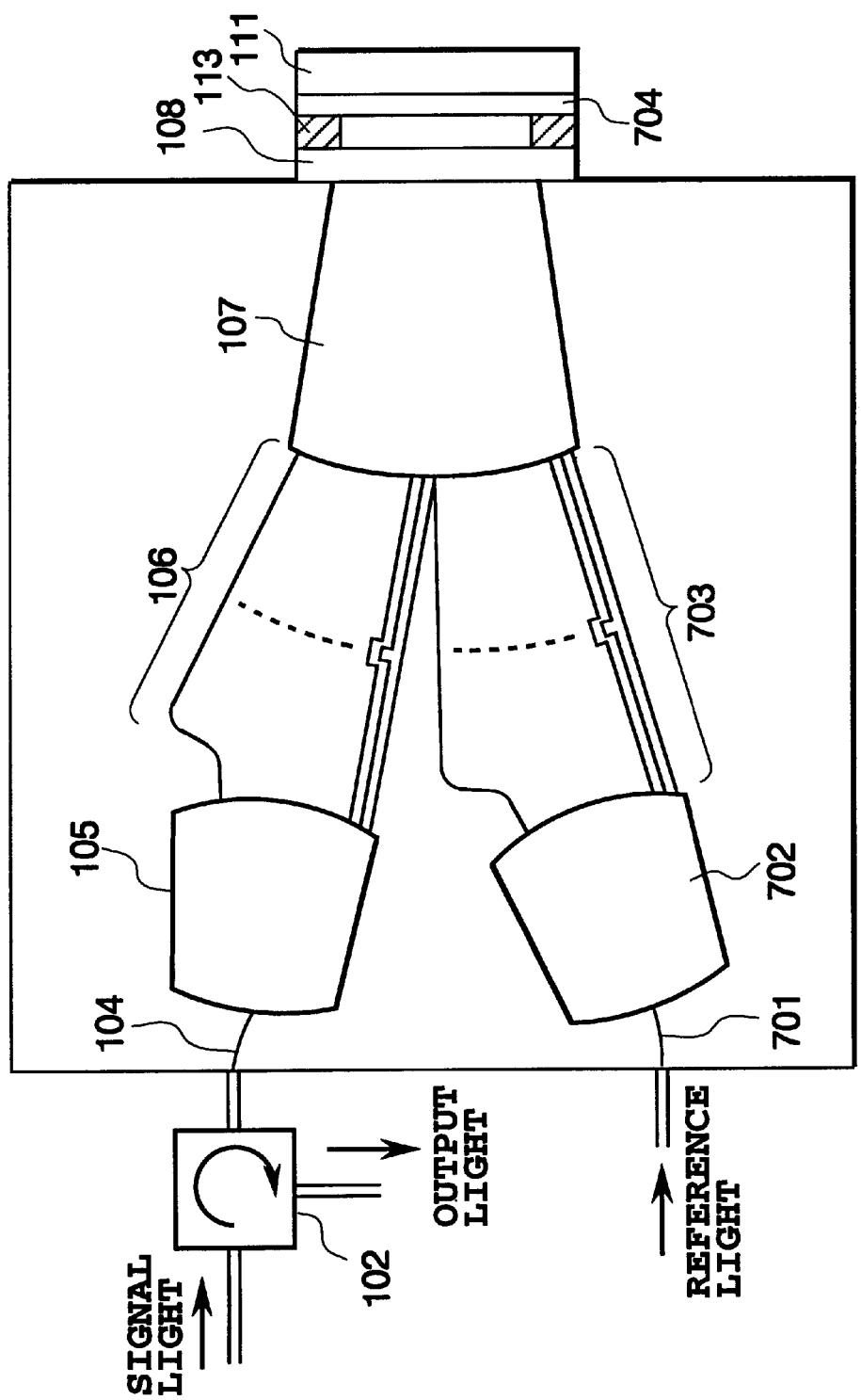
FIG. 32 is a schematic view showing the structure of the optical signal processing apparatus according to an embodiment 10 of the present invention.

FIG. 32 shows an example for hologram recording, in which 701 is a reference light input waveguide, 702 is a slab waveguide as distribution means, 703 is a second arrayed waveguide, and 704 is an optical recording medium. For 704, a photo refractive crystal such as semiconductor MQW or barium titanate, a thermoplastic can be used. In this case, optical system 104–106 of the signal light is the same in construction as optical system 701–703 of the reference light. When a signal light is input into the circulator 102 and a coherent short pulse reference light into the optical waveguide 701, the signal light and reference light are Fourier transformed and undergo interference on the medium 704, and hologram recorded. After the recording, when a coherent short pulse reference light is input again, phase conjugate light of signal light is output from the circulator 102. That is, the present embodiment has a function of recording high speed optical signal and generating phase conjugate light.

Embodiment 11

Figure 33:
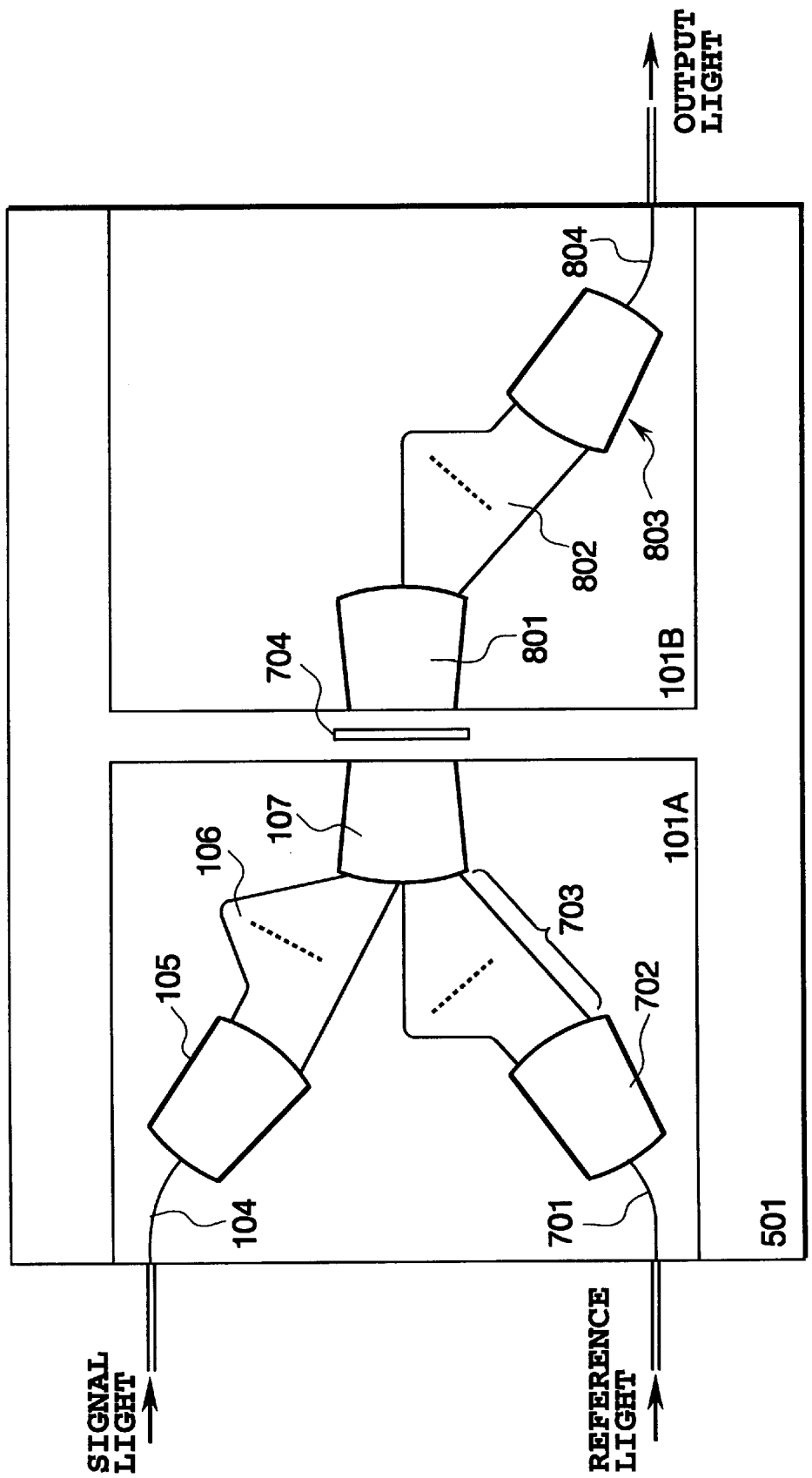
FIG. 33 is a schematic view showing the structure of the optical signal processing apparatus according to an embodiment 11 of the present invention.

FIG. 33 is another example of hologram recording, showing a transmission type. In the Figure, 801 is a slab waveguide as second focusing means, 802 is an arrayed waveguide, 803 is a slab waveguide as wave synthesis means, and 804 is an optical waveguide. As in the example of FIG. 32, when signal light is input into the first waveguide 104 and reference light into the waveguide 701, optical signal is hologram recorded on the waveguide 704. After the recording, when coherent short pulse reference light is input again, signal light is reproduced from the waveguide 804. When another signal light is input in place of the reference light, a correlated signal between the two signal light can be output.

Embodiment 12

Figure 34:
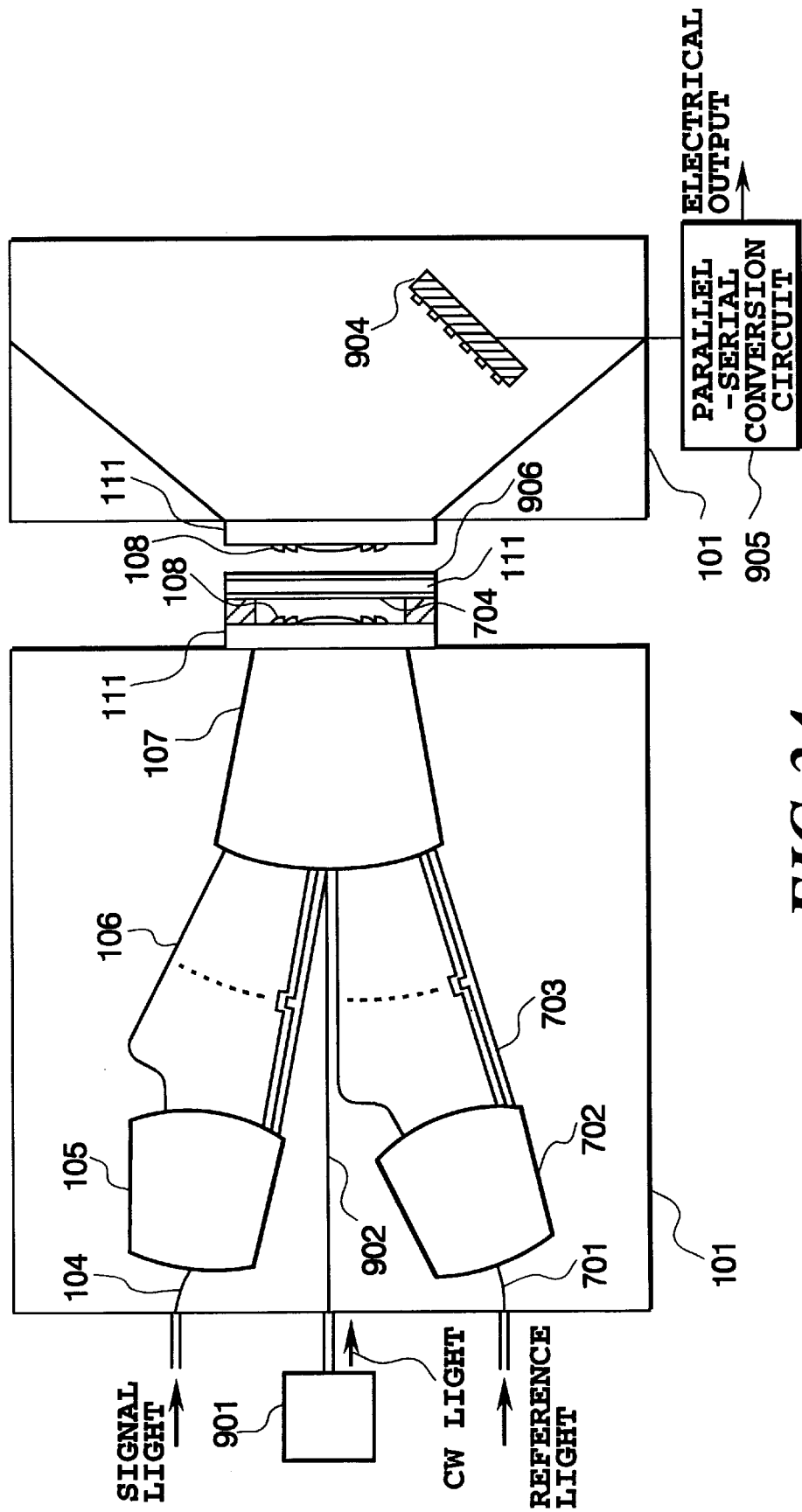
FIG. 34 is a schematic view showing the structure of the optical signal processing apparatus according to an embodiment 12 of the present invention.

FIG. 34 shows a waveform observation example of a very high speed optical signal, in which 901 is a CW light source of monochromatic light, 902 is an optical waveguide, 903 is a slab waveguide, and 904 is an optical receiver array. When signal light is input into the waveguide 104 and reference light into the waveguide 701, diffraction is made by hologram on the medium 704. When the diffracted light is focused on the array 904, temporal waveform is formed as a spatial optical amplitude distribution. By conversion into electrical signal by the array 904, and by conversion to time series signal by a parallel—serial conversion circuit 905, a very high speed optical signal can be observed. An optical filter 906 is to set the wavelength of the CW light source to a wavelength different from signal light and control light to block input of signal light and reference light into the array 904.

In the description of the above drawings, similar reference numerals indicate similar parts.

The slab waveguides 107 and 504 and the like as focusing means are to make the focal plane flat in combination with the Fresnel lens (kinoform), generally a large distortion occurs unless optical signal processing in frequency space is made on the focal plane, but the Fresnel lens and the like can be eliminated depending on the curvature of the focal plane.

Further, as described above, the spatial filter of phase filter or amplitude filter or both may be provided.

Still further, it is described that in the example of FIG. 20, the focal length of the Fresnel lens (kinoform) is equal to the focal length of the slab waveguide of the coupling means, however, it is not necessarily equal to each other, but can be determined according to whether dispersion is generated or dispersion compensation is made.

Yet further, the vertical direction bending means shown in FIG. 26B can be applied, for example, in FIG. 32, in this case, the spatial filter 109 and the mirror 110 shown in FIG. 26B are replaced with an optical recording medium.

As can be seen from the above examples, embodiments of the individual figures can be applied to each other as necessary.

Embodiment 13

Figure 35:
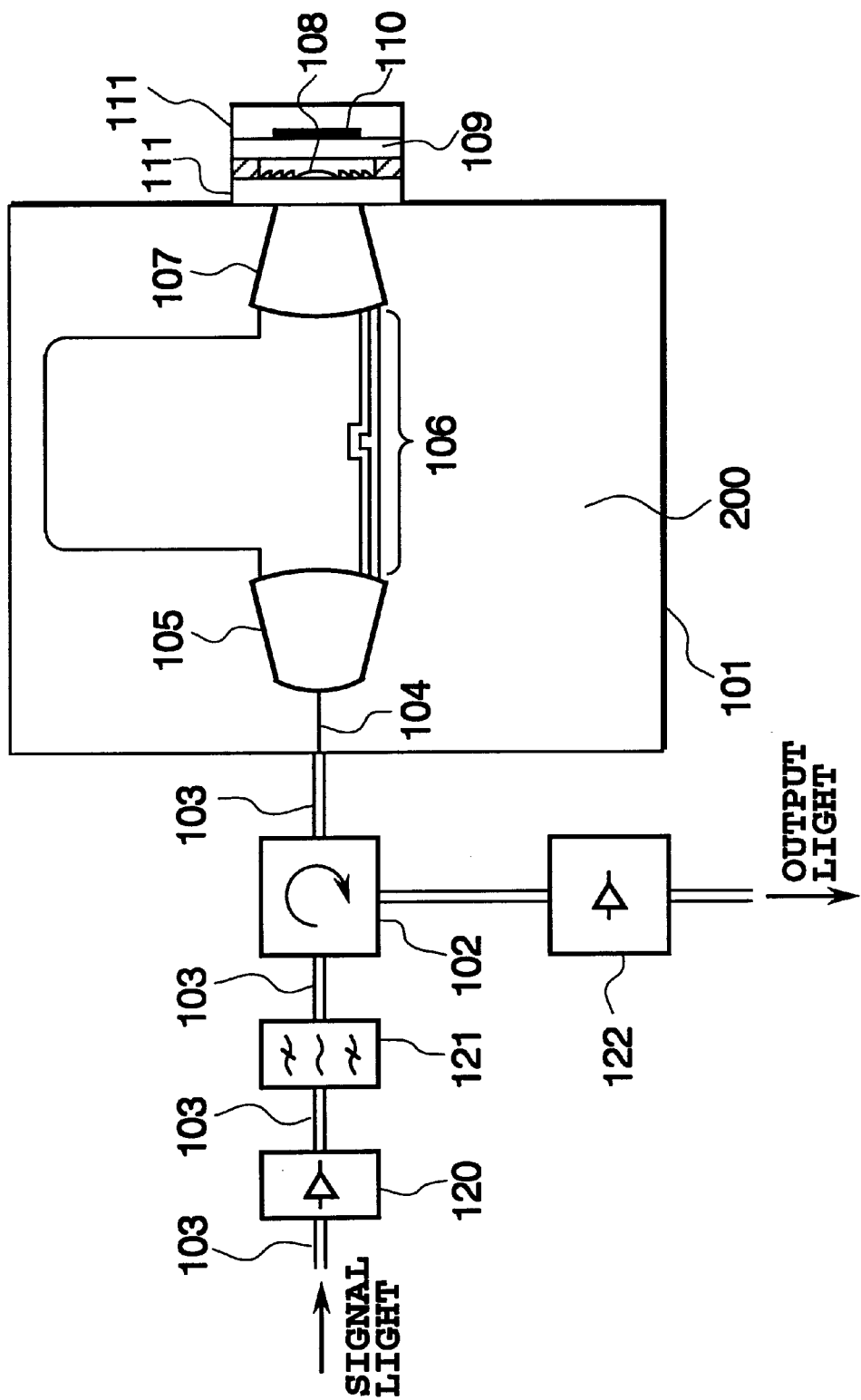
FIG. 35 is a schematic view showing the structure of the optical signal processing apparatus according to an embodiment 13 of the present invention.

An embodiment 13 of the present invention is shown in FIG. 35. The embodiment 13 is similar in basic structure to the apparatus of the embodiment 4, but differs in that an optical amplifier 120, an optical filter 121, and an optical amplifier 122 are provided at the light source side.

Figure 36:
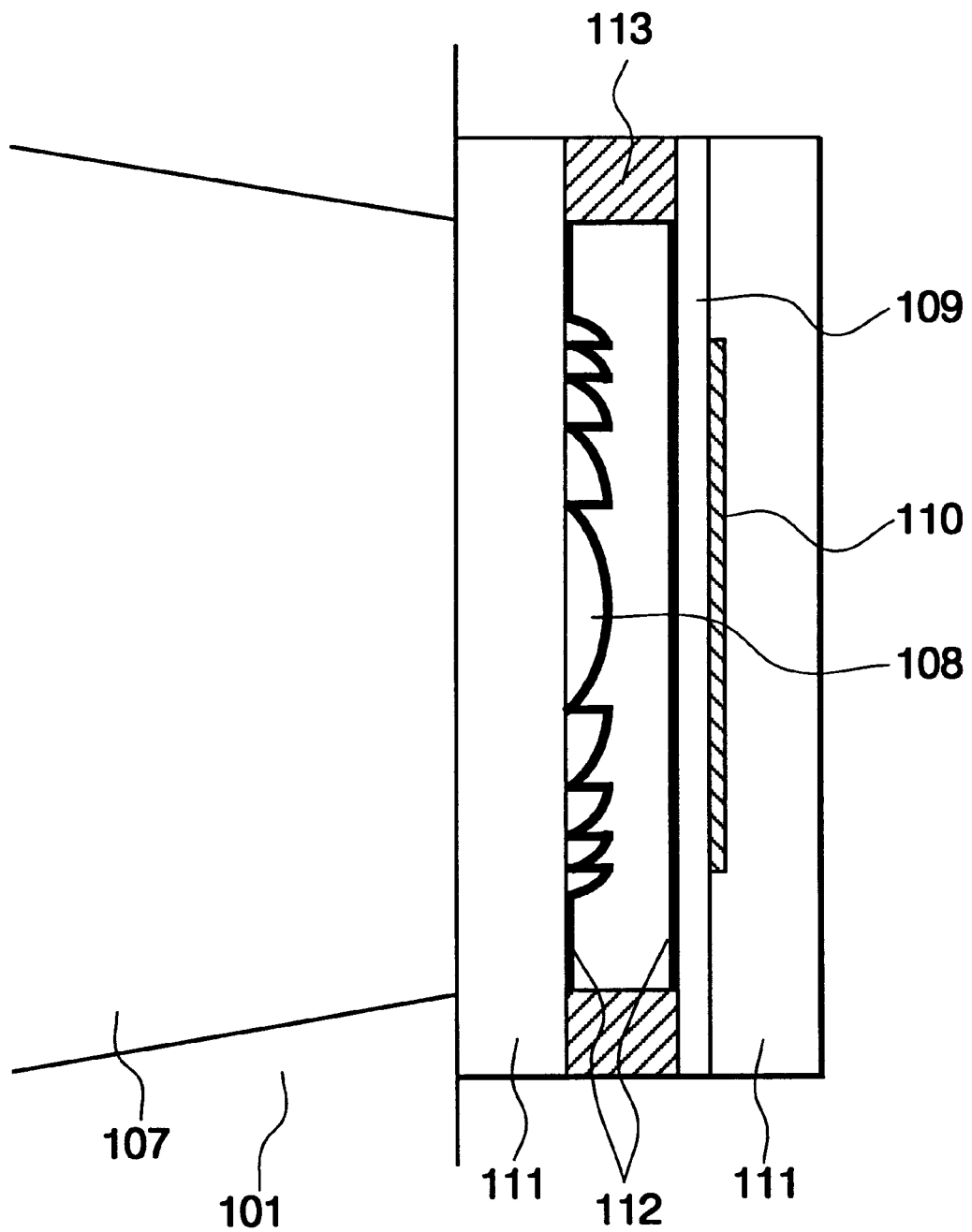
FIG. 36 is a schematic cross sectional view in the vicinity of Fresnel lens of the optical signal processing apparatus according to the embodiment 13 of the present invention.

A detailed construction in the vicinity of the Fresnel lens is shown in FIG. 36. In FIG. 36, the reference numeral 111 indicates a quartz substrate, 112 is a low reflection coating film, and 113 is a holding substrate.

The Fresnel lens 108 can be fabricated by etching a material which is transparent in the operating wavelength region. Contour of the Fresnel lens is elliptical. The curvature of the Fresnel lens 108 in the minor axis direction is set to have a focal length of optical length of the lens surface and the end surface of the slab waveguide 107. The curvature in the major axis direction of the Fresnel lens 108 is set equal to the focal length of the slab waveguide 107.

Signal light input into the optical fiber 103 is amplified by the optical amplifier 120, after removing unnecessary ASE light by the optical filter, passed through the circulator 121, and input into the optical waveguide 104. Then, the signal light is distributed by the first slab waveguide 105 to individual waveguides of the arrayed waveguide 106. The adjacent individual waveguides of the arrayed waveguide 106 differ in waveguide length by $\Delta L$. Therefore, wherein n is a refractive index of the waveguide, adjacent waveguides have a phase difference of $n\Delta L$. That is, the arrayed waveguide 106 has a wave division function same as a diffraction grating.

Therefore, the arrayed waveguide grating 200 comprising the first slab waveguide 105, the arrayed waveguide 106 and the second slab waveguide 107 has heretofore been used as a wavelength demultiplexer in a wavelength division multiplexing transmission apparatus.

Output end of the arrayed waveguide 106 is connected to the second slab waveguide 107, and disposed on a circle of a radius f. That is, the second slab waveguide 107 functions as a lens having a focal length of f.

Focal plane of the second slab waveguide 107 is located on a circle with the center at the output end of the arrayed waveguide 106 on the optical axis of the second slab waveguide 107.

Optical signal processing in frequency space according to the present invention generally produces a large distortion unless carried out on the focal plane. Therefore, the Fresnel lens 108 is disposed at the output side of the slab waveguide 107. The focal plane is converted to a flat plane by the Fresnel lens 108. Focal length in the waveguide surface of the Fresnel lens 108 is set equal to f.

Input light is passed through the spatial filter 109, reflected by the mirror 110, and again passed through the spatial filter 109.

Figure 37A:
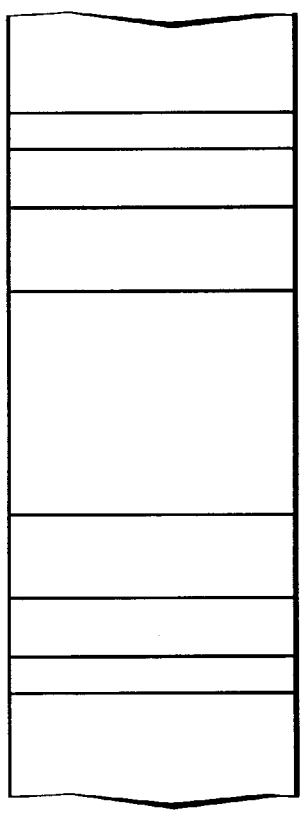
FIG. 37A is a schematic top view showing spatial filter of the optical signal processing apparatus according to the embodiment 13 of the present invention.
Figure 37B:
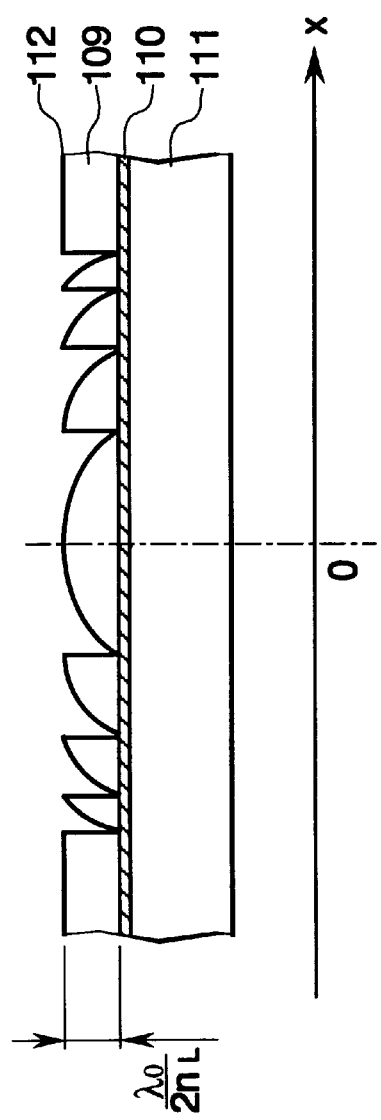
FIG. 37B is a schematic cross sectional view showing spatial filter of the optical signal processing apparatus according to the embodiment 13 of the present invention.
Figure 38B:
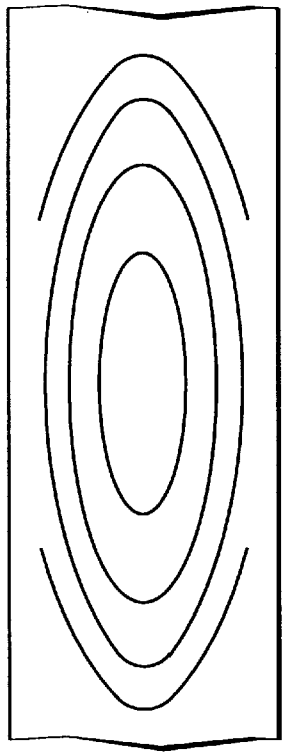
FIG. 38B is a schematic top view showing Fresnel lens of the optical signal processing apparatus according to the embodiment 13 of the present invention.
Figure 38A:
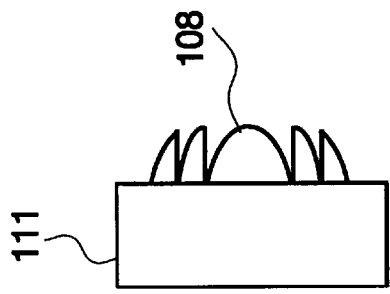
FIG. 38A is a schematic vertical cross sectional view showing Fresnel lens of the optical signal processing apparatus according to the embodiment 13 of the present invention.
Figure 38C:
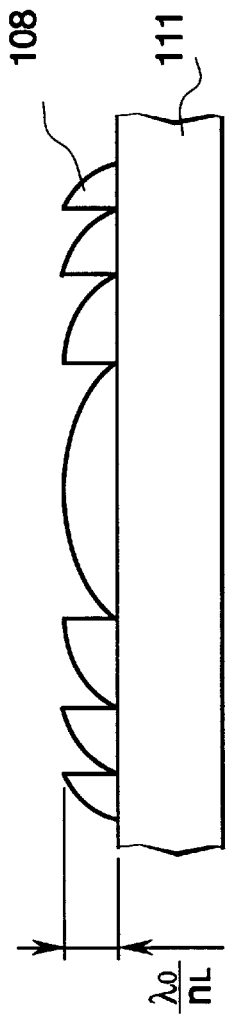
FIG. 38C is a schematic horizontal cross sectional view showing Fresnel lens of the optical signal processing apparatus according to the embodiment 13 of the present invention.

FIGS. 37 and 38 show details of the spatial filter 109 and the Fresnel lens 108. In this case, the spatial filter 109 and the Fresnel lens can be fabricated by the same process. Thickness of the spatial filter 109 is equal to $\lambda_0/(2n_L)$ because a maximum of phase difference 2π is necessary in the forward and reverse directions in a reflection type, wherein $\lambda_0$ is a tube center wavelength of the signal, and $n_L$ is a refractive index of the material of the spatial filter 109.

Further, since, in the Fresnel lens, light is output from the lens into the air, the lens thickness is designed to have a focal length equal to the second slab waveguide 107 in order to convert the focal plane of the second slab waveguide 107 into a flat plane.

Still further, the curvature in the direction (y) perpendicular to the waveguide substrate is set so that focal length in the quartz substrate 111 is equal to the thickness of the quartz substrate 11, in order to convert output light from the lens into parallel light. Where curvatures in x direction and y direction are Rx and Ry, elliptical ring of the Fresnel lens 108 is shown by the following formula (1).

m=1, 2, . . . (integer) corresponds to discontinuity of the curved surface.

$$\frac{R_y}{R_x} x_m^2 + y_m^2 = 2m \frac{\lambda_0}{n_L} R_y \tag{1}$$

Further, the curvature R and the focal length f are converted by the following formula (2).

$$R = (n_L - 1) f \tag{2}$$

The spatial filter 109 and the Fresnel lens 108 can be fabricated, for example, by exposing PMGI (PolyMethiGlutarImide) by means of an electron beam exposure apparatus, followed by developing.

Figure 39:
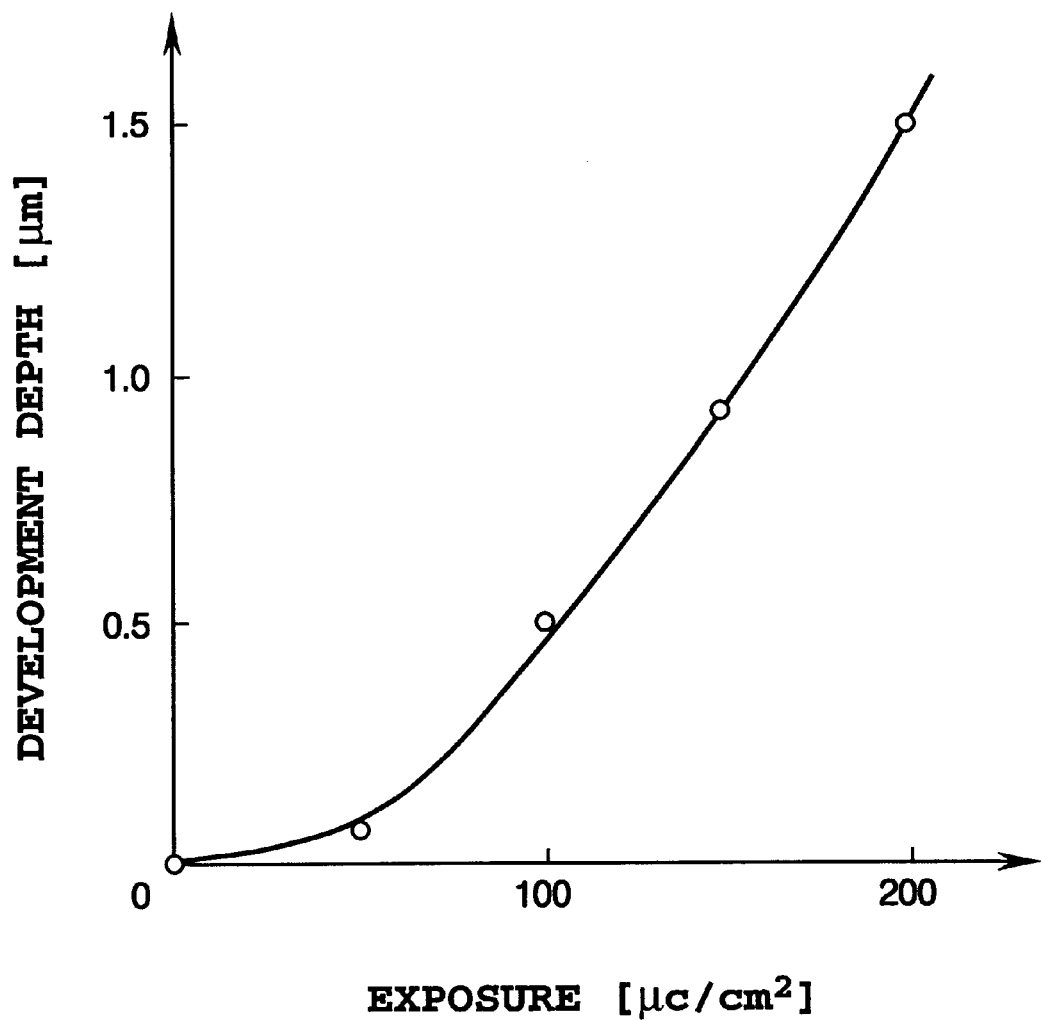
FIG. 39 is a diagram showing exposure dependence of development depth of PMGI used in spatial filter and Fresnel lens of the optical signal processing apparatus according to the embodiment 13 of the present invention.

FIG. 39 shows a graph of exposure dependence of developing depth of PMGI.

Figure 40:
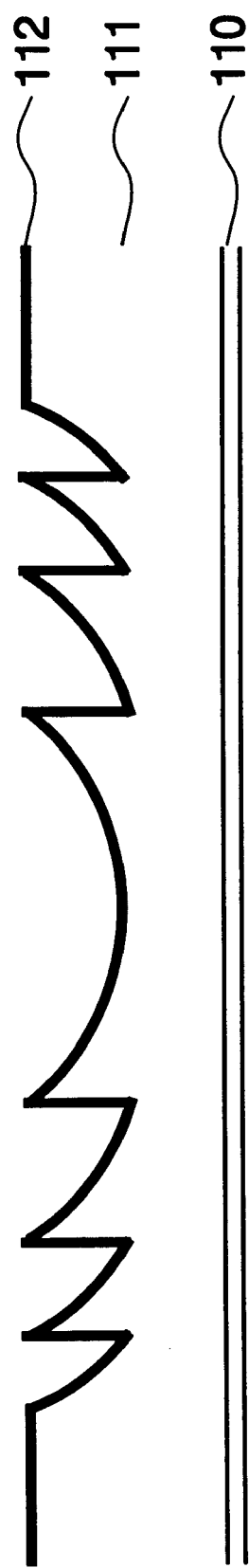
FIG. 40 is a schematic cross sectional view showing Fresnel lens formed by etching a quartz substrate using PMGI as a mask in the optical signal processing apparatus according to the embodiment 13 of the present invention.

Further, fabrication is also possible using PMGI as a mask by etching the quartz substrate 111. This is shown in FIG. 40.

It is needless to say that a replica may be made based on the quartz substrate 111.

For representing by mathematical formulae, incident signal light is assumed as u(t), and a transmission function (forward and reverse) of the spatial filter 109 as h(x).

Wherein, f is time, and x is a position on the spatial filter 109.

The signal light u(t) is divided by the arrayed waveguide 106, and focused at a different position x on the spatial filter 109. The divided frequency spectral image is represented as U((ω(x)) using Fourier transformation U of u. Spectrum after passing of the spatial filter 109 where the central frequency of the signal corresponds to x=0 is shown as the following formula (3)

$$U(\omega(x)) \cdot (x) \tag{3}$$

The reflected light is again passed through the arrayed waveguide 106 and inverse Fourier transformed.

When light passes through a medium having a group velocity dispersion, input/output relation in the frequency space is shown by the following formulae (4) and (5).

$$U_{out}(\omega) = U_{in}(\omega) \cdot \text{Exp}(i\phi(\omega)) \tag{4}$$

$$\phi(\omega) \cong \phi_0 + \phi_1(\omega - \omega_0) + \frac{\phi_2(\omega - \omega_0)^2}{2} + \ldots \tag{5}$$

wherein ω is an angular frequency, ωo is a central angular frequency, the first term of the phase term shows an absolute phase, the second term is a position on the time base, and the third term and after indicate a high order dispersion effect. Pulse broadening is generated mainly by the effect of the third term.

However, since, when a phase filter shown by the following formula (6) is provided, and passed through the phase filter after Fourier transformation by the optical circuit of the present embodiment, the third term can be canceled from the formula (3), waveform degradation due to group velocity dispersion can be equalized.

$$h(\omega(x)) = \text{Exp}\left(-i\frac{\phi_2\{\omega(x)\}^2}{2}\right) \tag{6}$$

The phase filter, as shown in FIG. 40, can be fabricated by etching a material which is transparent in the operation wavelength region. Since fabrication of a filter of a large phase difference is difficult, in the construction of reflection type, the filter may be fabricated by folding with a phase difference π. In the case of reflection type, since light is passed two times, the characteristic formula of the dispersion compensation filter is shown by the following formula (6').

$$h(\omega(x)) = \text{Exp}\left(-i\frac{\phi_2\{\omega(x)\}^2}{4}\right) \tag{6'}$$

Approximation of formulae (6) and (6') is effective for light of pulse width of more than 100 fs. It is needless to say that a filter having a thickness equal to the phase difference may be fabricated.

Figure 41:
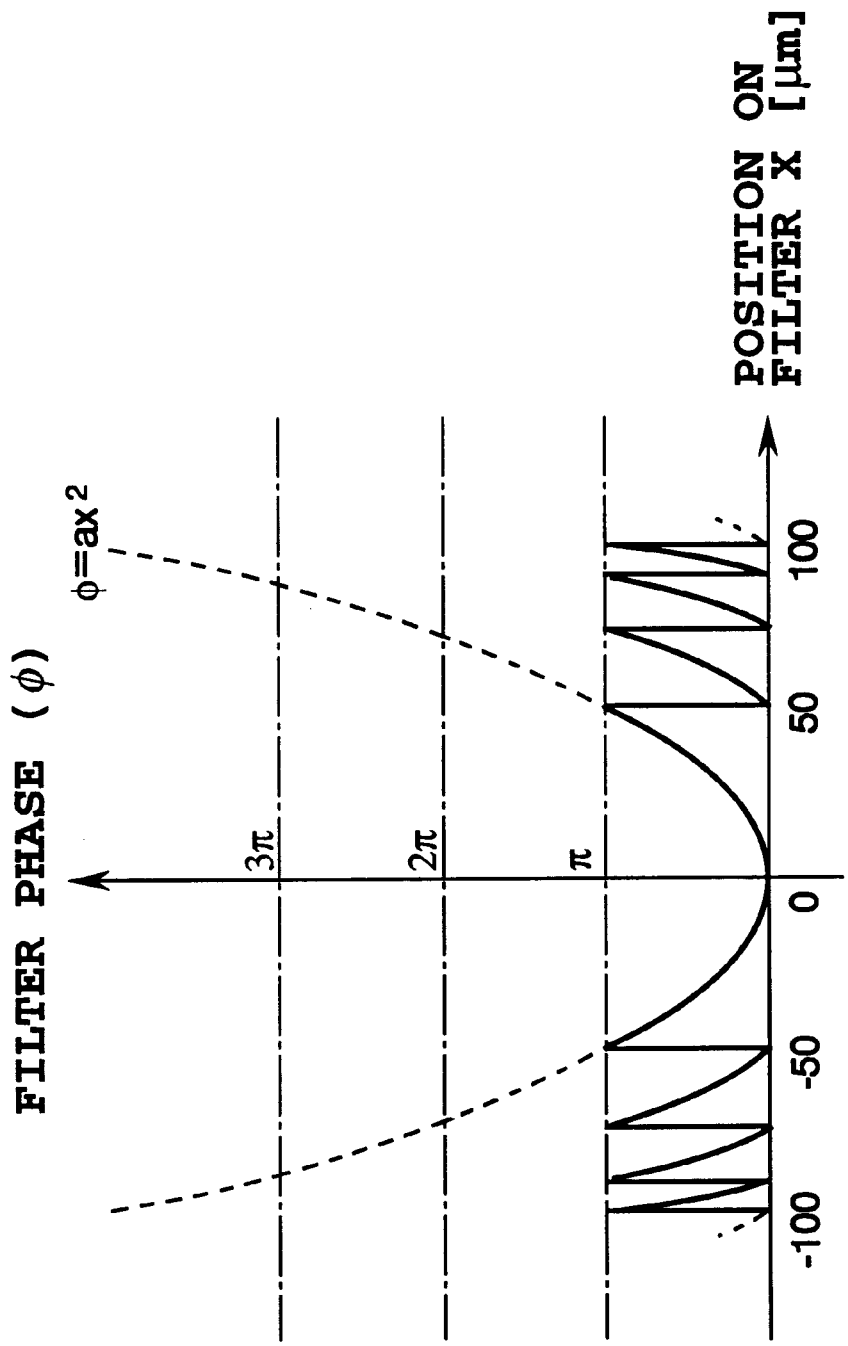
FIG. 41 is a diagram showing filter characteristic (positive dispersion) of the optical signal processing apparatus according to the embodiment 13 of the present invention.
Figure 42:
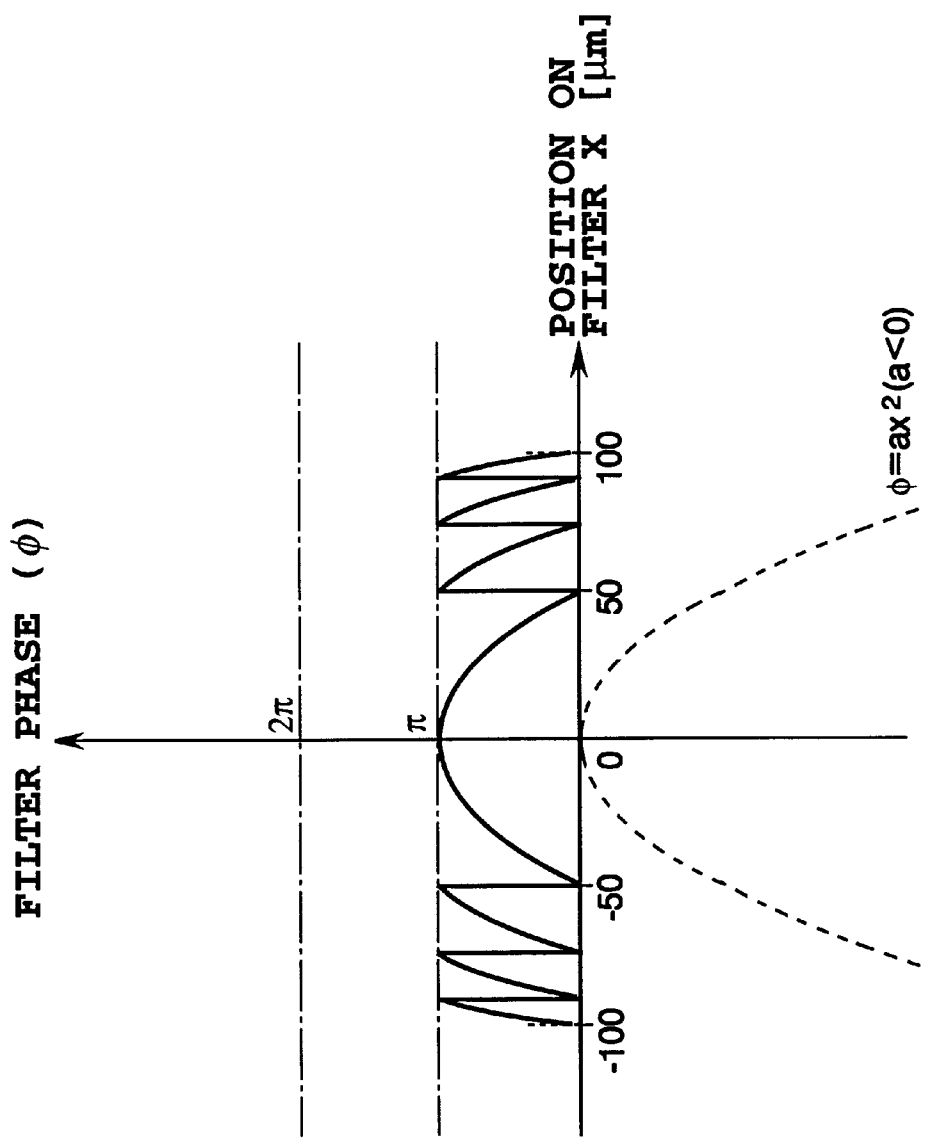
FIG. 42 is a diagram showing filter characteristic (negative dispersion) of the optical signal processing apparatus according to the embodiment 13 of the present invention.

FIGS. 41 and 42 show an example of filter characteristics of embodiment 13. In this case, it is assumed that characteristic of dispersion compensation filter for compensating a change in Fourier phase in the medium having a group velocity dispersion is $ax^2$ in the Fourier transformation plane.

FIG. 41 and FIG. 42 correspond positive and negative of dispersion.

As a result, for the case of relative phase φ being position (x) on the spatial filter, it is possible to fabricate an optical circuit having a characteristic approximating φ(x)=Mod [$ax^2$, π] (a: constant) (wherein Mod[u, v] indicates a remainder using v as a modulus.).

While the present embodiment can only compensate a fixed dispersion value, when a filter for compensating up to higher order term of the formula (5) is provided, higher order dispersion can be compensated from the formula (3) to formula (6').

Embodiment 14

An embodiment 14 of the present invention will be described with reference to FIG. 25A, FIG. 25B, and FIG. 35. The spatial filter of the apparatus of the present embodiment is shown in FIG. 25A and FIG. 25B. Other parts are similar to those in the embodiment 1 shown in FIG. 35, and detailed description thereof is omitted.

The quarter-wave plate is necessary, when using a spatial filter having a polarization dependence, for making it polarization independent. The liquid crystal can be homogeneously oriented parallel or perpendicular to the waveguide facet (A-A' line in FIG. 25A). f axis and s axis of the quarter-wave plate 305 are slanted by 45 degrees to the waveguide surface.

As shown in FIG. 25B, the transparent electrode 301-a is a strip-formed electrode, and each strip electrode can be applied with an optional voltage. When a voltage is applied, orientation of the liquid crystal is changed, and phase difference between the transparent electrodes 301-*a* and 301-*b*. Since the electrode is provided in strips, a desired spatial phase filter can be achieved. That is, in the present embodiment, by adjusting the phase filter, it is possible to change the central wavelength of dispersion compensation, change the dispersion compensation amount, or make dispersion compensation according to the requirement.

Embodiment 15

Figure 43:
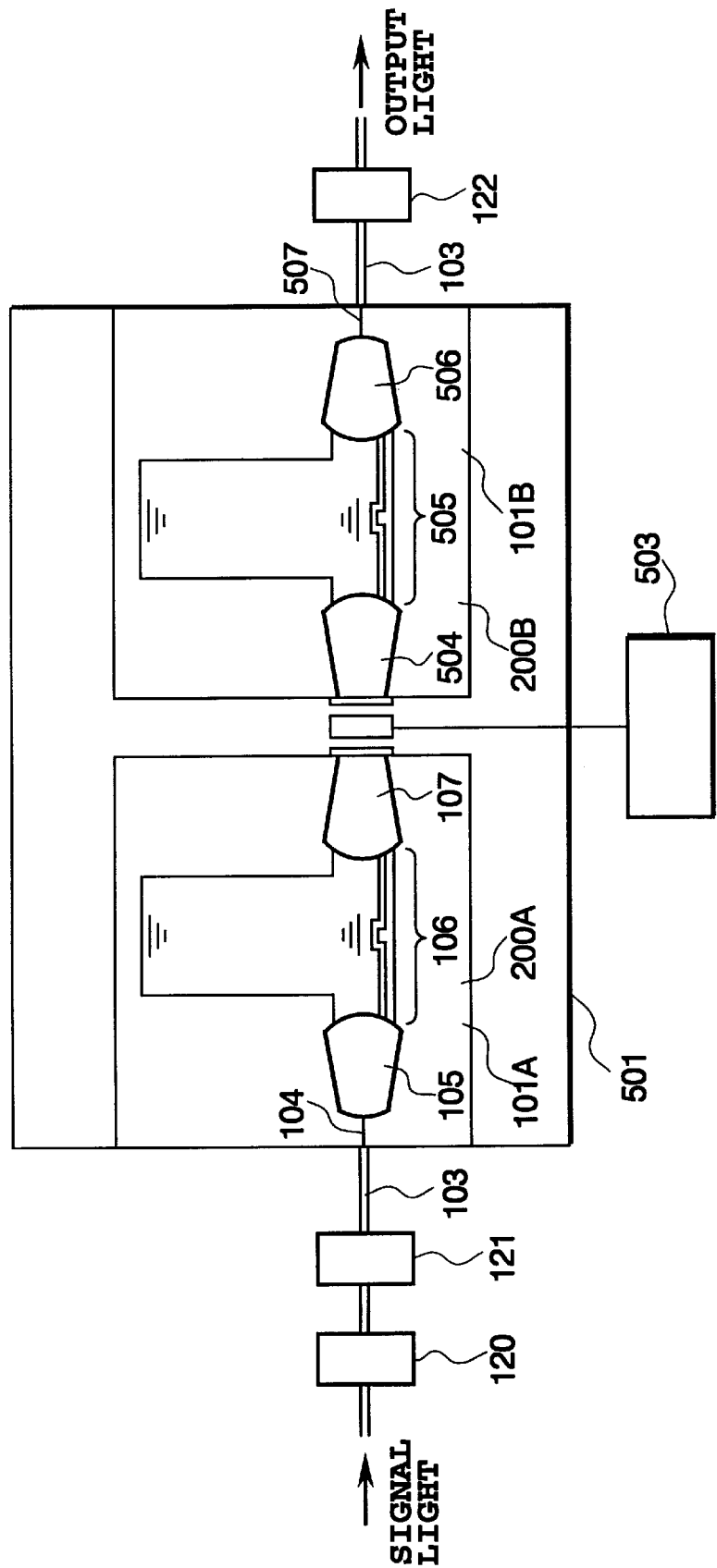
FIG. 43 is a schematic view showing the structure of the optical signal processing apparatus according to an embodiment 15 of the present invention.

An embodiment 15 of the present invention will be described with reference to FIG. 43 and above-shown FIG. 28. In FIG. 43, 200A is a first arrayed waveguide grating, 200B is a second arrayed waveguide grating, 501 is a heat sink, 503 is a filter control unit, 504 is a slab waveguide as second focusing means, 505 is a second arrayed waveguide, 506 is a slab waveguide as wave synthesis means, and 507 is a second optical waveguide.

The optical waveguide 104, the first slab waveguide 105, the arrayed waveguide 106 and second slab waveguide 107; and the first slab waveguide 404, the arrayed waveguide 505, the second slab waveguide 506, and the optical waveguide 507 are symmetrical in construction.

While the spatial filter (FIG. 28) is a filter same as used in the embodiment 14, since it is a transmission type, it is required to obtain twice the phase difference (2π). Further, the mirror and the quarter-wave plate are omitted since they are unnecessary. Since this construction has a polarization dependence, to make it polarization independent, the filters for obtaining phase difference may be connected perpendicularly in two stages. The transmission type construction of the present embodiment is equivalent in operation to the reflection type construction shown in the embodiments 13 and 14.

Embodiment 16

Figure 44:
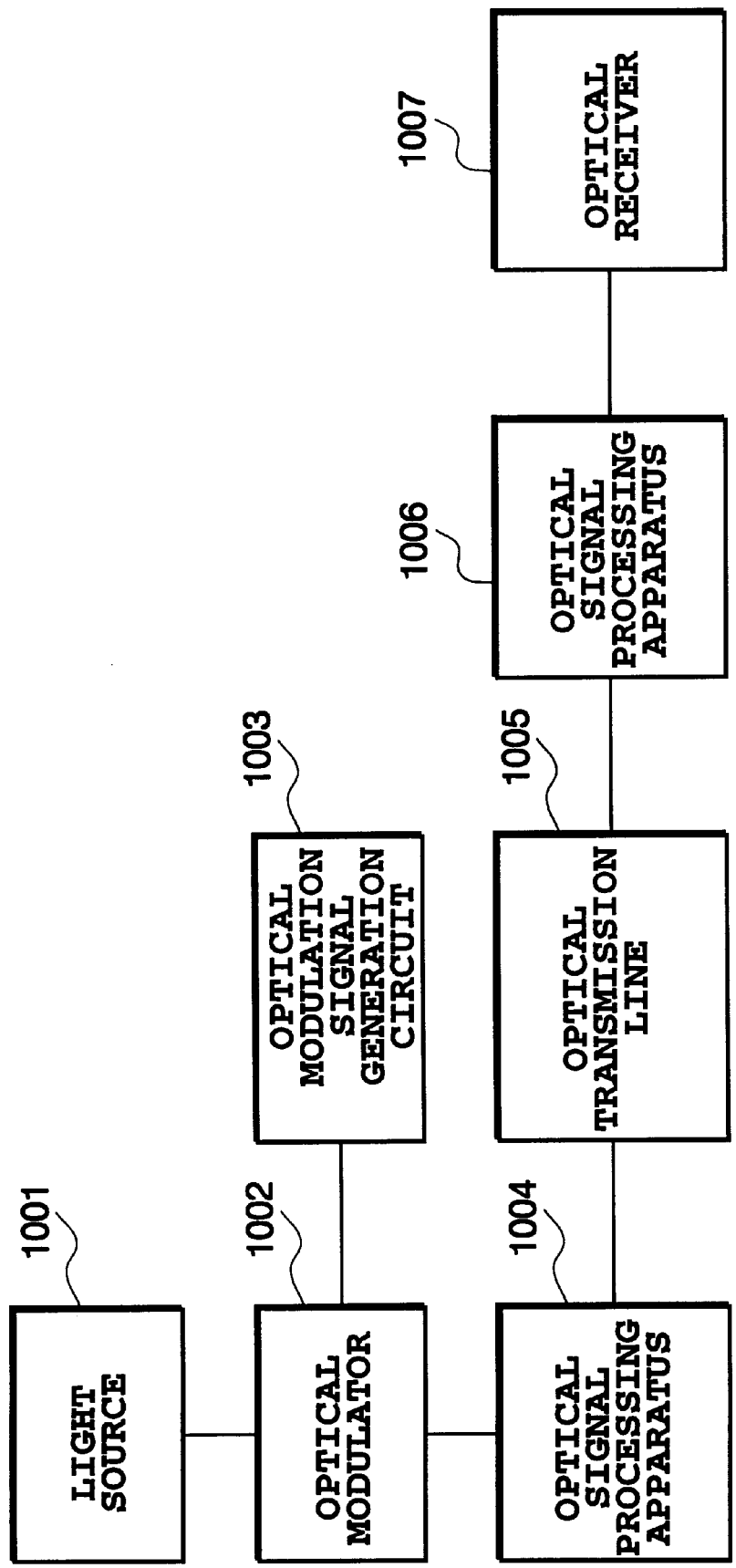
FIG. 44 is a block diagram showing a broad sense optical signal processing apparatus in the present invention, according to an embodiment 16.

FIG. 44 shows an embodiment 16 of the present invention.

In FIG. 44, 1001 is a light source, 1002 is an optical modulator, 1003 is an optical modulation signal generator, 1004 is an optical signal processing apparatus as one of those shown in the embodiment 13 to embodiment 15, 1005 is a transmission line comprising an optical fiber, and optical filter, an optical amplifier, and the like, 1006 is an optical signal processing apparatus as one of those shown in the embodiment 13 to embodiment 15, and 1007 is an optical receiver.

Self-phase modulation which is a major factor of signal degradation in the transmission line is generated nearly in proportion to the optical pulse peak power. The pulse width can be increased to reduce the peak power while maintaining the average power, thereby reducing the self-phase modulation.

In the present embodiment, phase modulation is made in the optical signal processing apparatus 1004 to scramble the waveform to flatten the optical power, thereby reducing the peak power of the optical signal.

Figure 45:
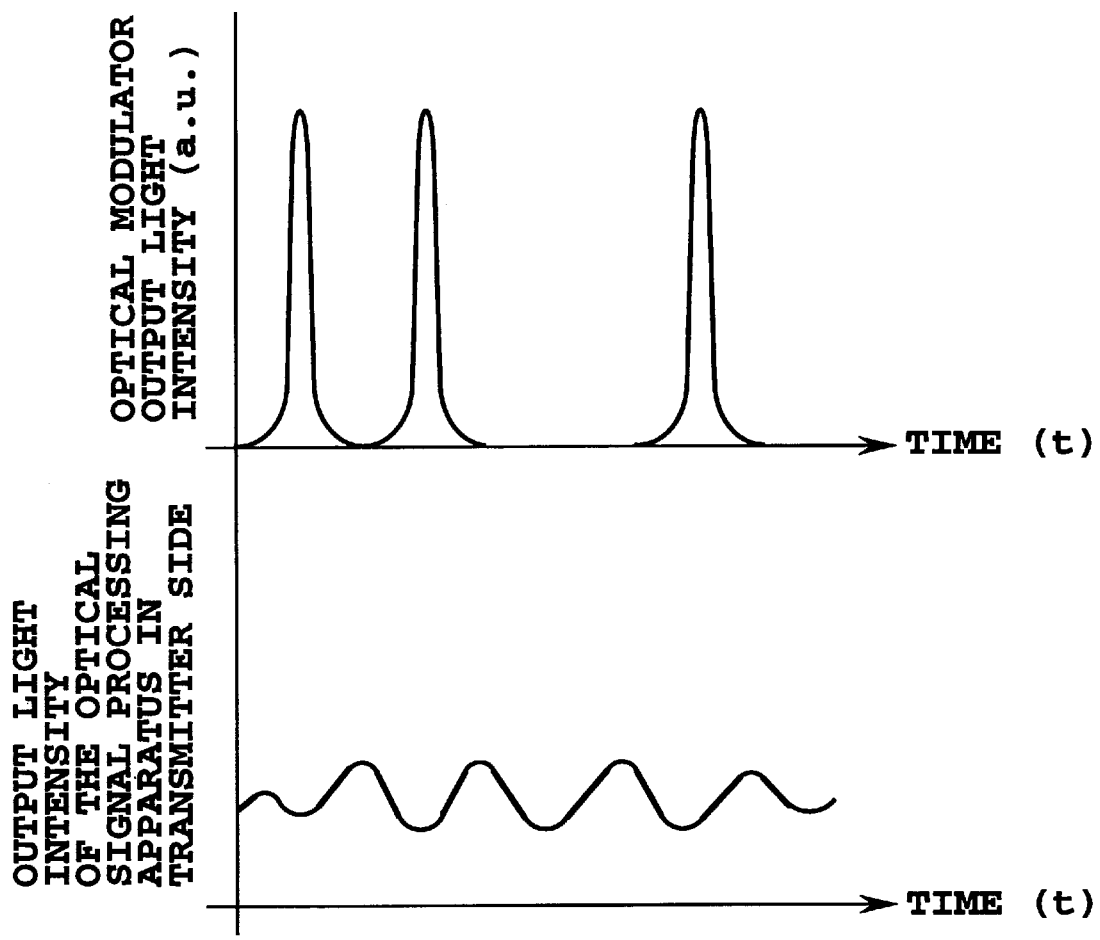
FIG. 45 is a diagram showing a time-waveform of output light amplitude of modulator of the optical signal processing apparatus according to the embodiment 16 of the present invention, and an output waveform after passing through the optical signal processing apparatus as one of subject matter of the present apparatus.

FIG. 45 shows examples of a time waveform of modulator output optical amplitude and an output waveform after passing through the optical signal processing apparatus 1004.

Dispersion in the transmission line is mainly a group velocity dispersion of the third term of the formula (3) which is a square term with respect to the frequency.

When scramble by phase filter of the optical signal processing apparatus is made mainly by the square term, compensation is made with the dispersion characteristic of the transmission line in the course of the transmission line to reproduce the waveform, considerable self-phase modulation may occur resulting in uncompensatable degradation of waveform. Therefore, the phase filter characteristic is adapted to generate dispersion of the same sign as the dispersion of the transmission line for the square term. Or, tertiary or higher term is used, or a filter having a quite random phase changes is used.

Figure 46:
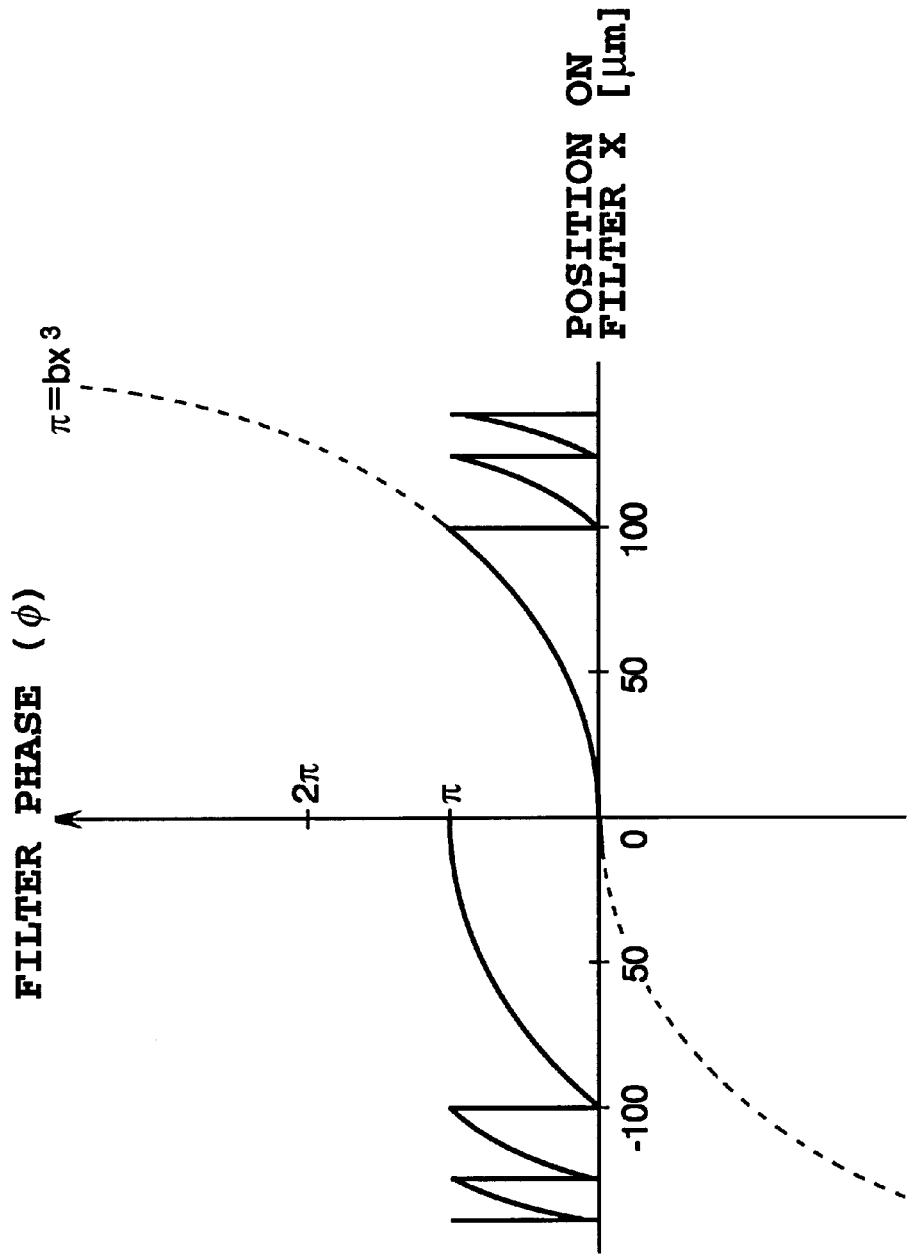
FIG. 46 is a diagram showing characteristic of spatial filter (using third and higher order terms) when using the apparatus of the embodiment 13 as the optical signal processing apparatus of subject matter in the embodiment 16 of the present invention.
Figure 47:
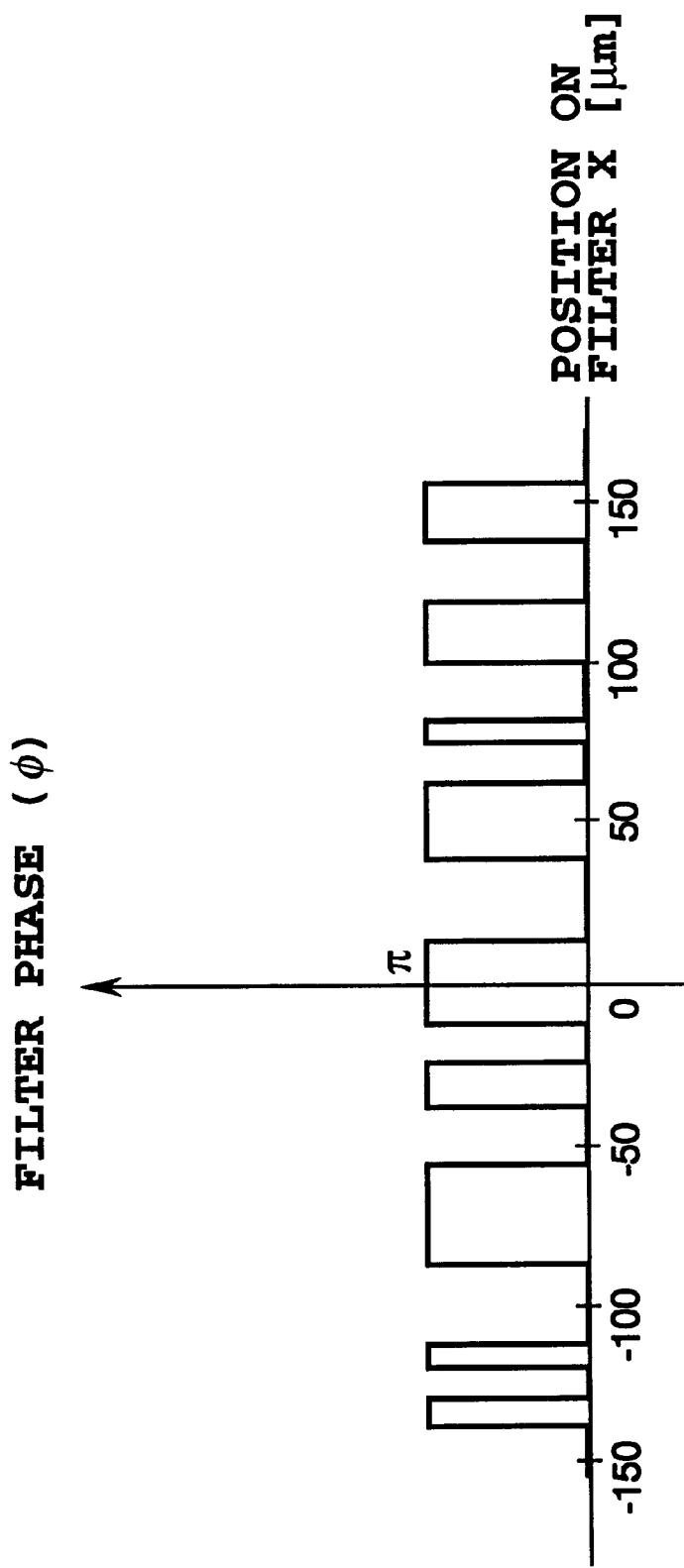
FIG. 47 is a diagram showing characteristic of spatial filter (completely random phase changes) when using the apparatus of the embodiment 13 as the optical signal processing apparatus of subject matter in the embodiment 15 of the present invention.

For the case using the optical signal processing apparatus of the embodiment 13, examples of phase filter are shown in FIG. 46 (using tertiary or higher term) and FIG. 47 (quite random phase change). The phase filter of the reception side optical signal processing apparatus is designed to compensate dispersion by the transmission line and phase scramble previously given by the optical signal processing apparatus 1004. To represent by mathematical formulae, signal light output from the optical modulator 1002 is assumed as u(t), phase filter characteristic of the optical signal processing apparatus (forward and reverse for reflection type) as h$_1$(ω) (x)), Fourier transformation as H$_1$(t)), and waveform distortion generated by dispersion of the transmission line as J(t), signal light s(t) incident to the optical signal processing apparatus 1006 is approximated by the following formula (7), wherein * means convolution.

$$s(t)=u(t)*H_1(t)*J(t) \quad (7)$$

To reproduce the original waveform, phase filter characteristics of the optical signal processing apparatus 506 may be set as the following formula (8).

$$h_2(\omega(x)) = \frac{h_1(\omega(x))^* \cdot j(\omega(x))^*}{|h_1(\omega(x))|^2 |j(\omega(x))|^2} \quad (8)$$

Further, there may be a case in which modulation at the transmitter side of optical spectral amplitude can optical S/N at the receiver side. That is, since S/N is not uniform to the frequency, the optical signal processing apparatus 504 emphasizes low s/N frequency signal using an amplitude filter and makes transmission, a phase filter for compensating dispersion of the transmission line at the receiver side, and an amplitude filter having the reverse characteristics to the transmission side are used to equalize S/N with respect to the frequency, thereby enhancing the receiver sensitivity.

Figure 48:
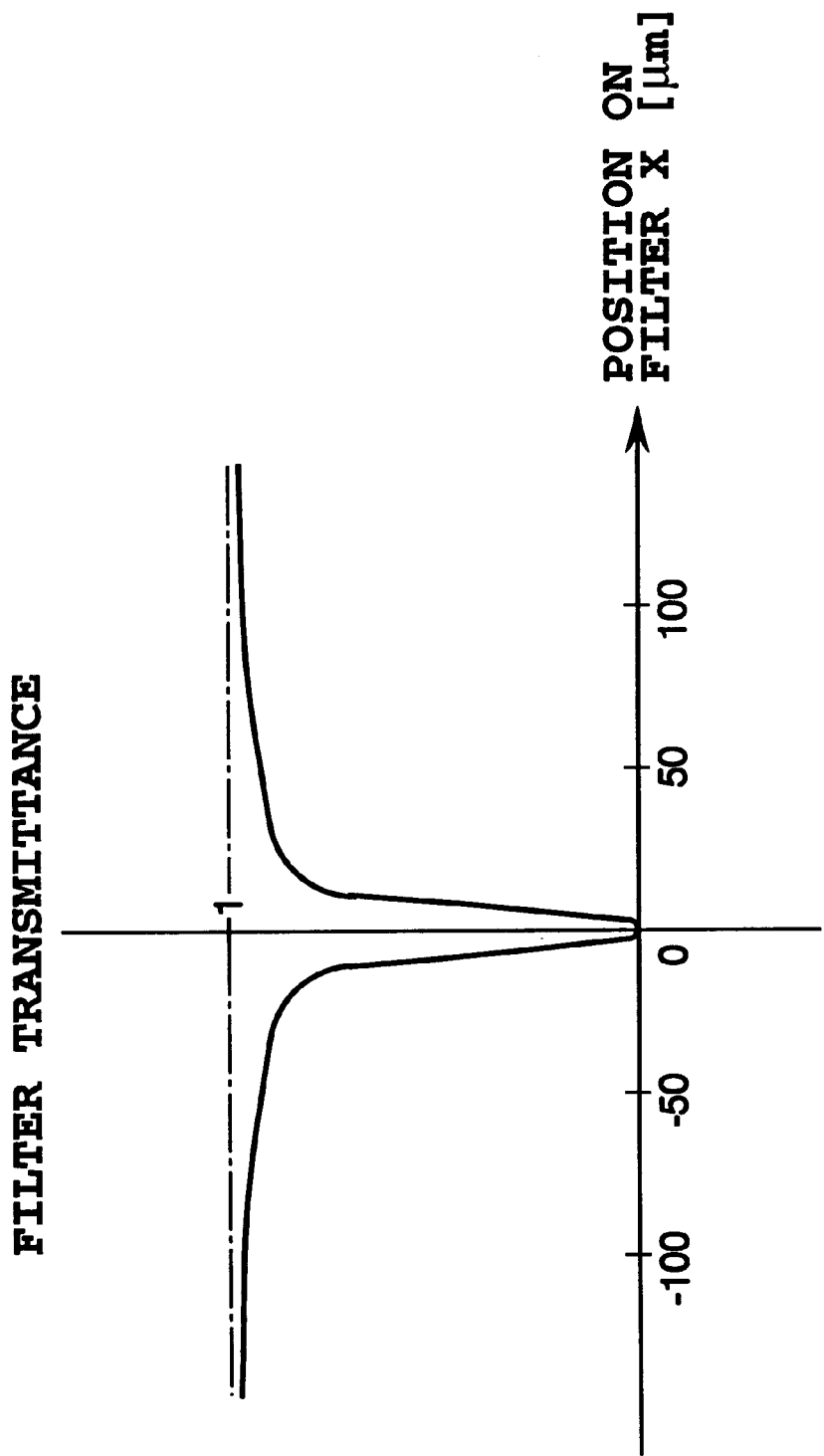
FIG. 48 is a diagram showing characteristic of amplitude filter when using a filter for reducing only the vicinity of the central frequency as the amplitude filter of the reception side optical signal processing apparatus of subject matter in the embodiment 16 of the present invention.

Still further, a filter for reducing only the vicinity of the central frequency is used as the amplitude filter of the receiver side optical signal processing apparatus 1006 to attenuate the low frequency component of time waveform, and interference between codes generated due to nonlinear effect and the like is reduced, thereby enhancing the reception sensitivity. Characteristics of such an amplitude filter are shown in FIG. 48.

Embodiment 17

Figure 50A:
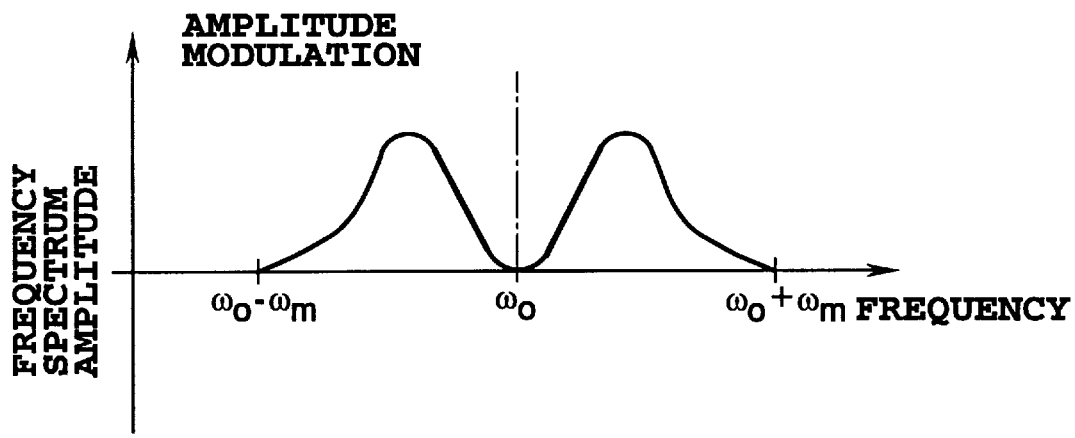
FIG. 50A is a diagram showing frequency spectrum amplitude of amplitude modulation signal in the embodiment 17 of the present invention.
Figure 50B:
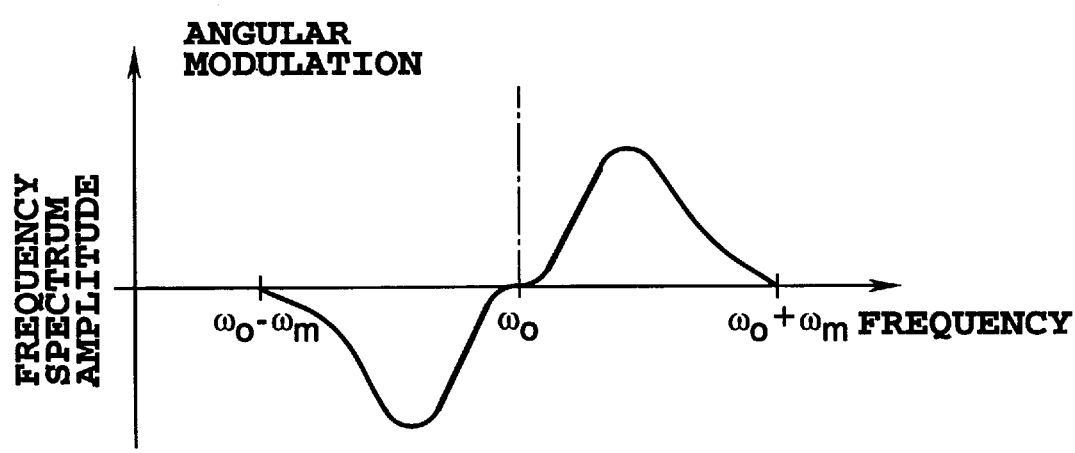
FIG. 50B is a diagram showing frequency spectrum amplitude of angular modulation signal in the embodiment 17 of the present invention.

Characteristics of phase filter of an embodiment 17 of the present invention is shown in FIG. 49A and FIG. 49B for reflection type configuration. Configuration other than the filter is the same as the embodiments 13 to 14. Input signal light is assumed to be an amplitude modulated signal light. Spectral amplitude of the amplitude modulated signal is shown in FIG. 50A and FIG. 50B. There are side bands above and below the carrier frequency. On the other hand, spectral amplitude of angular modulated signal light has the shape as shown in FIG. 20B. A difference from the frequency spectral amplitude of amplitude modulation is that the upper and lower side bands are reverse in phase.

That is, as shown in FIG. 50A and FIG. 50B, when phase filter characteristics are as follows in the case of reflection type:

φ(x)=π/2 (x>0) and φ(x)=0 (x<0), or

φ(x)=0 (x>0) and φ(x)=π/2 (x<0)

conversion of modulation mode is made from amplitude modulation to angular modulation. It is needless to say that inverse conversion is achieved by using a phase inversed filter. Further, a transmission type filter has twice the phase change amount, it may be set as φ(x)=π (x>0) and φ(x)=0 (x<0), or φ(x)=0 (x>0) and φ(x)=π (x<0).

Since angular modulated light is nearly constant in optical average amplitude, it is hard to generate a nonlinear effect, and the transmission distance can be increased.

Yet further, as in the embodiment 16, it is possible that also using an amplitude filter, low S/N frequency signal is emphasized and transmitted, an amplitude filter having the reverse characteristics to the transmission side is used at the receiver side to enhance the receiver sensitivity.

Embodiment 18

Figure 51:
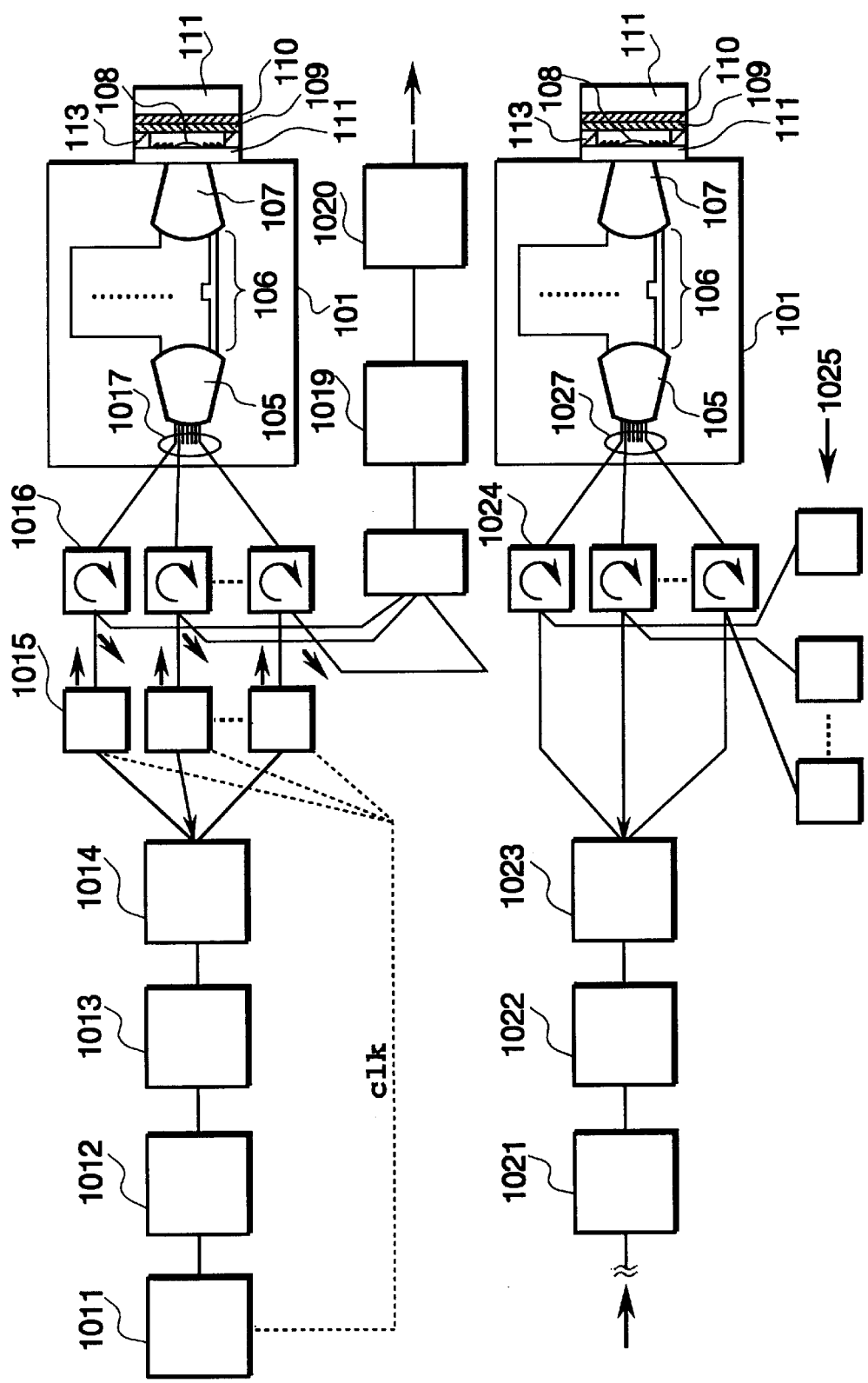
FIG. 51 is a schematic view showing the structure of the optical signal processing apparatus according to an embodiment 18 of the present invention.

An embodiment 18 of the present invention is shown. In FIG. 51, 1011 is a short pulse light source, 1012 is an optical amplifier, 1013 is an optical wavelength filter, 1014 is an optical splitter, 1015 is n units of optical modulation circuits, 1016 is n units of optical circulators, 1017 is n units of input waveguides, 1018 is an optical combiner, 1019 is an optical amplifier, 1020 is an optical transmission line, 1021 is an optical amplifier, 1022 is an optical wavelength filter, 1023 is an optical splitter, 1024 is n units of optical circulators, and 1025 is n units of optical receiver circuits.

This arrangement differs from the above described embodiment 17 in that the present embodiment mainly makes multiplexing of optical signal.

In optical communications using a short pulse, optical band width is mainly determined by the pulse width.

If the minimum pulse interval can be narrowed to about the pulse width, the band width can be efficiently utilized.

However, since operation speed of the modulation circuit is as high as 50 Gbit/s, the band width (about 400 GHz for Gaussian waveform) of pulse width 1 ps cannot be efficiently utilized. Therefore, in the present embodiment, to make it within the operation speed range of the modulation circuit, the pulse is divided into n units of modulation circuit to achieve modulation.

In the present embodiment, each modulation signal is differently phase modulated in frequency regions, and synthesized and multiplexed.

In this case, it is arranged so that phase modulation to each modulation signal is reduced in correlation with each other.

For such phase modulation, for example, different or shifted PN (Pseudorandom Noise) sequence or M (Maximum Length code) sequence may be used.

In the reflection type construction, spatial filter phase is changed in relative phase of [0, π/2] according to [1, 0] of the sequence.

Figure 52:
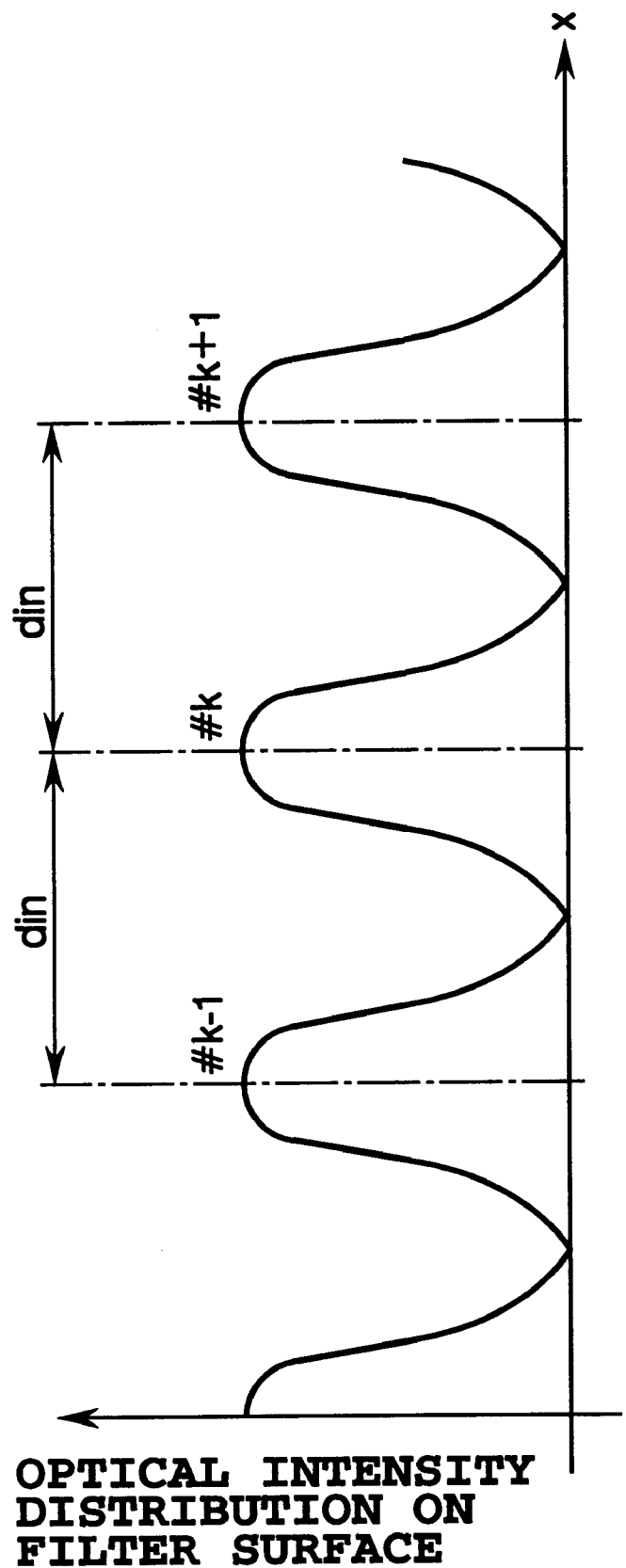
FIG. 52 is a diagram showing average optical amplitude distribution on filter plane in the embodiment 18 of the present invention.

An envelope of average optical amplitude distribution on the filter plane is shown in FIG. 52.

Although the central frequencies of the individual modulation signals are the same, on the filter plane, focused at different positions reflecting different positions of the input waveguides.

The envelope of optical intensity distributions corresponding to k−1, k, and k+1'th channel are separated at intervals equal to the interval $d_{in}$ at the connection of the input optical waveguide to the slab waveguide 105.

Therefore, it is possible to make different phase modulation to each modulation signal in the frequency region. Phase modulated light is waveguided by the optical circulator 1016 to the optical synthesis device 1018.

At the reception side, while the optical signal is divided into n units, each divided signal is demodulated in the frequency region using a spatial filter which is phase conjugate with the transmission side optical signal processing apparatus.

When correlation is small between individual phase modulations, other signal waveform is not reproduced, only an average background noise is present.

To determine the presence of a pulse from background noise, the receiver circuit is required to have a high performance for sufficiently responding the pulse. For very high speed discrimination, a nonlinear device, a nonlinear optical receiver, or a high speed opto-electric conversion device and a flip-flop circuit is used.

Figure 53:
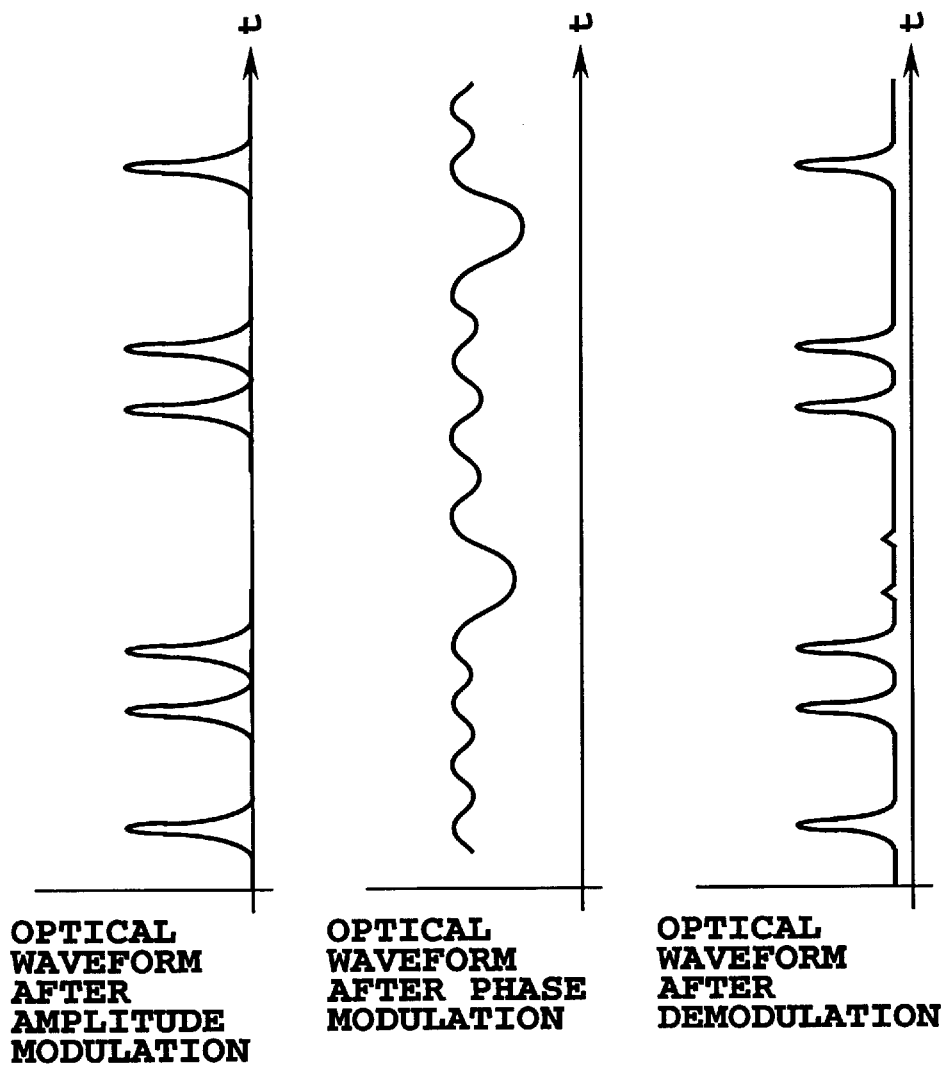
FIG. 53 is a diagram showing waveforms of modulation signal, phase modulated signal, and demodulated signal after reproduction in the embodiment 18 of the present invention.

FIG. 53 shows waveforms of modulation signal, after phase modulation, and demodulated signal after reproduction. That is, the present embodiment functions as a spectrum spread transmission apparatus in the optical frequency region. Since, as the number of multiplexing increases, it becomes difficult to reduce correlation of phase modulation for all combinations, background noise increases, and multiplexing becomes difficult, however, it is possible to utilize a band width corresponding to the pulse width with an efficiency of about 50%.

For example, using a pulse of 1 ps, it is possible to construct a transmission apparatus having 4 channels at a channel modulation velocity of 50 Gbit/s, totally about 200 Gbit/s.

Embodiment 19

Figure 54:
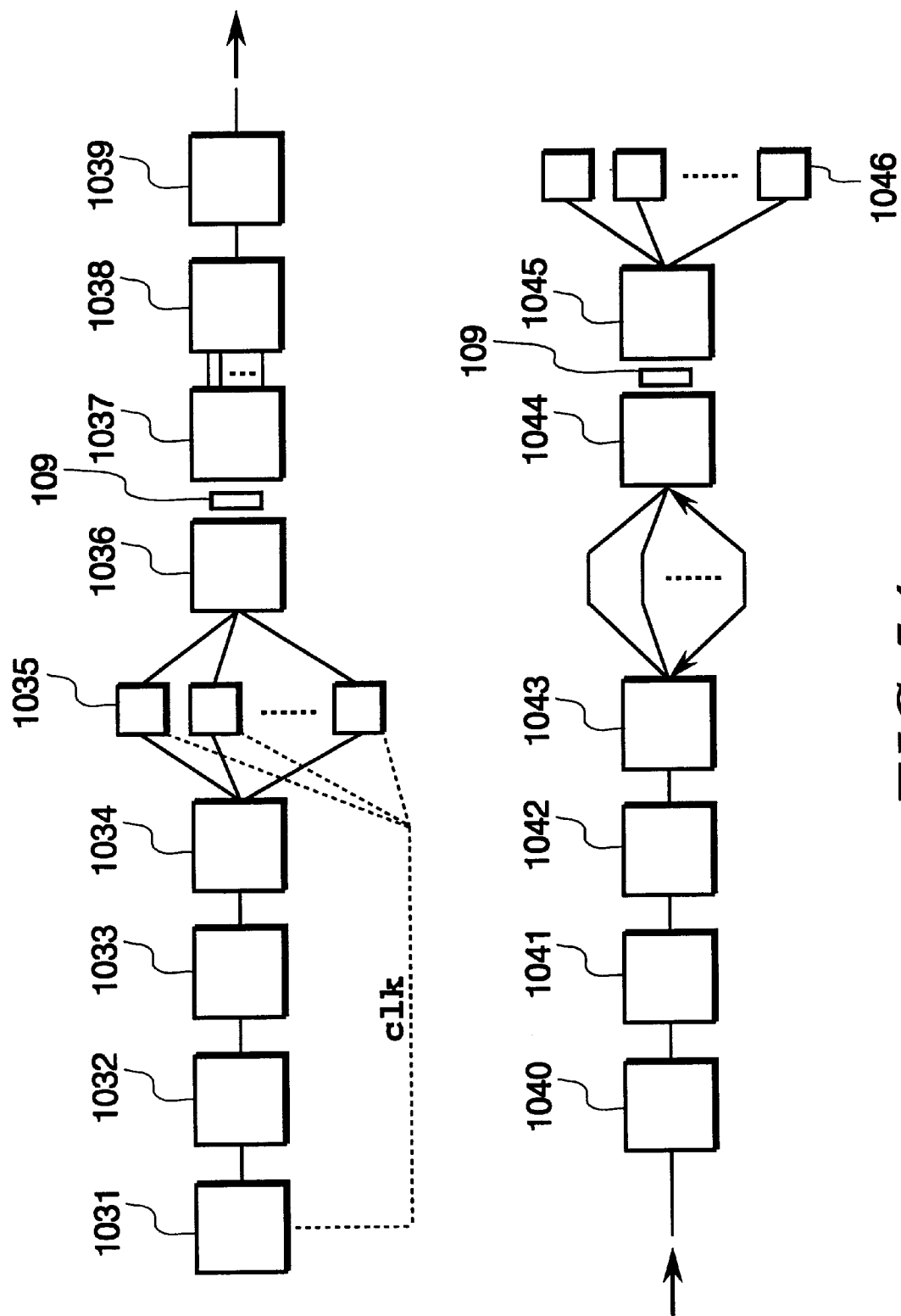
FIG. 54 is a schematic view showing the structure of the optical signal processing apparatus according to an embodiment 19 of the present invention.

An embodiment 19 of the present invention is shown. In FIG. 54, 1031 is a short pulse light source, 1032 is an optical amplifier, 1033 is an optical splitter, 1034 is an optical division device, 1035 is n units of optical modulation circuits, 1036, 1037, and 109 are the same transmission type optical signal processing apparatus as shown in FIG. 43, increasing the input/output waveguides to n units, 1038 is an optical combiner, 1039 is an optical amplifier, 1040 is an optical transmission line, 1041 is an optical amplifier, 1042 is an optical wavelength filter, 1043 is an optical splitter, 1044, 1045, and 109 are the same transmission type optical signal processing apparatus as shown in FIG. 43 as described above, and 1046 is n units of optical receiver circuits.

In the present embodiment, the embodiment 18 is constructed with a transmission type phase modulation circuit, and the operation is the same as the embodiment 18.

However, since it is transmission type, relative phase of the spatial filter is changed at [0, π].

Embodiment 20

Figure 5:
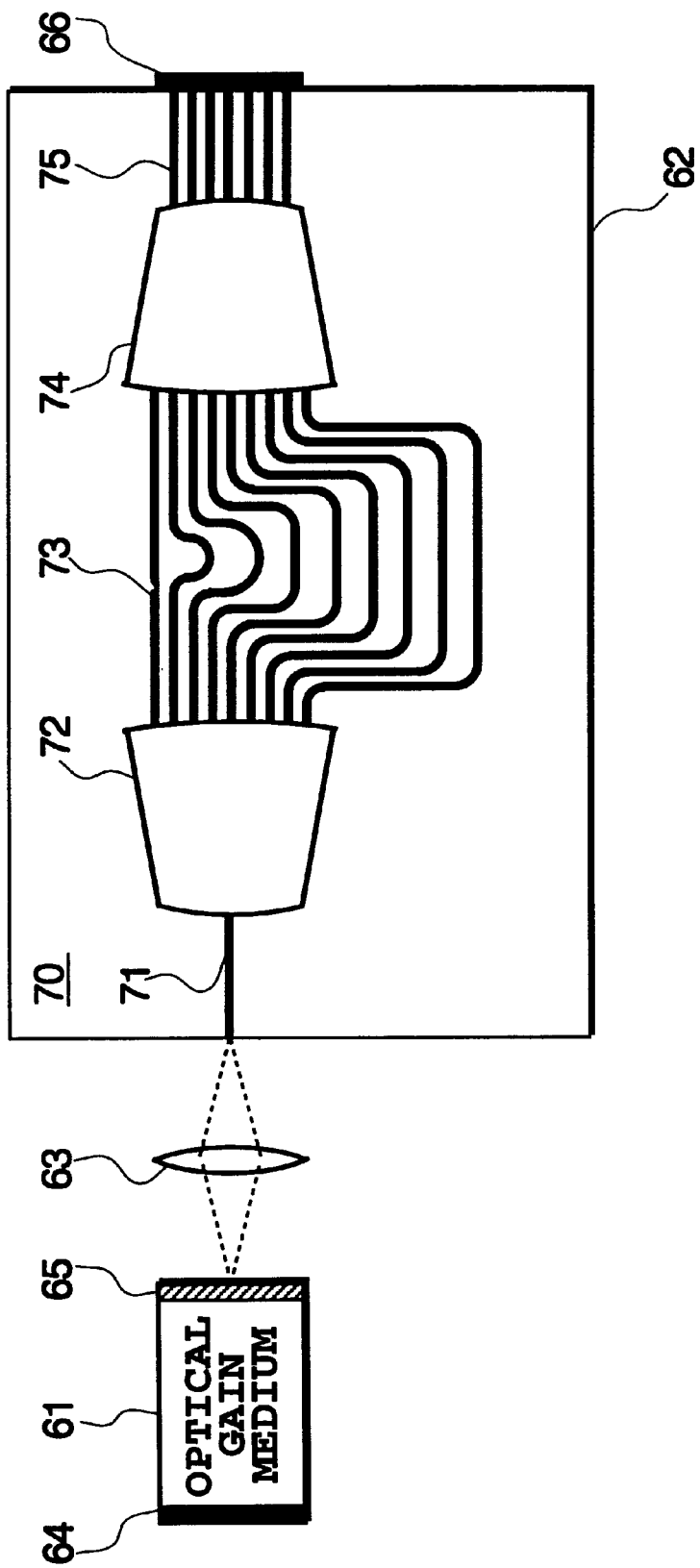
FIG. 5 is a schematic view showing a prior art multi-wavelength light source for simultaneously oscillating light of multiple wavelengths.
Figure 6:
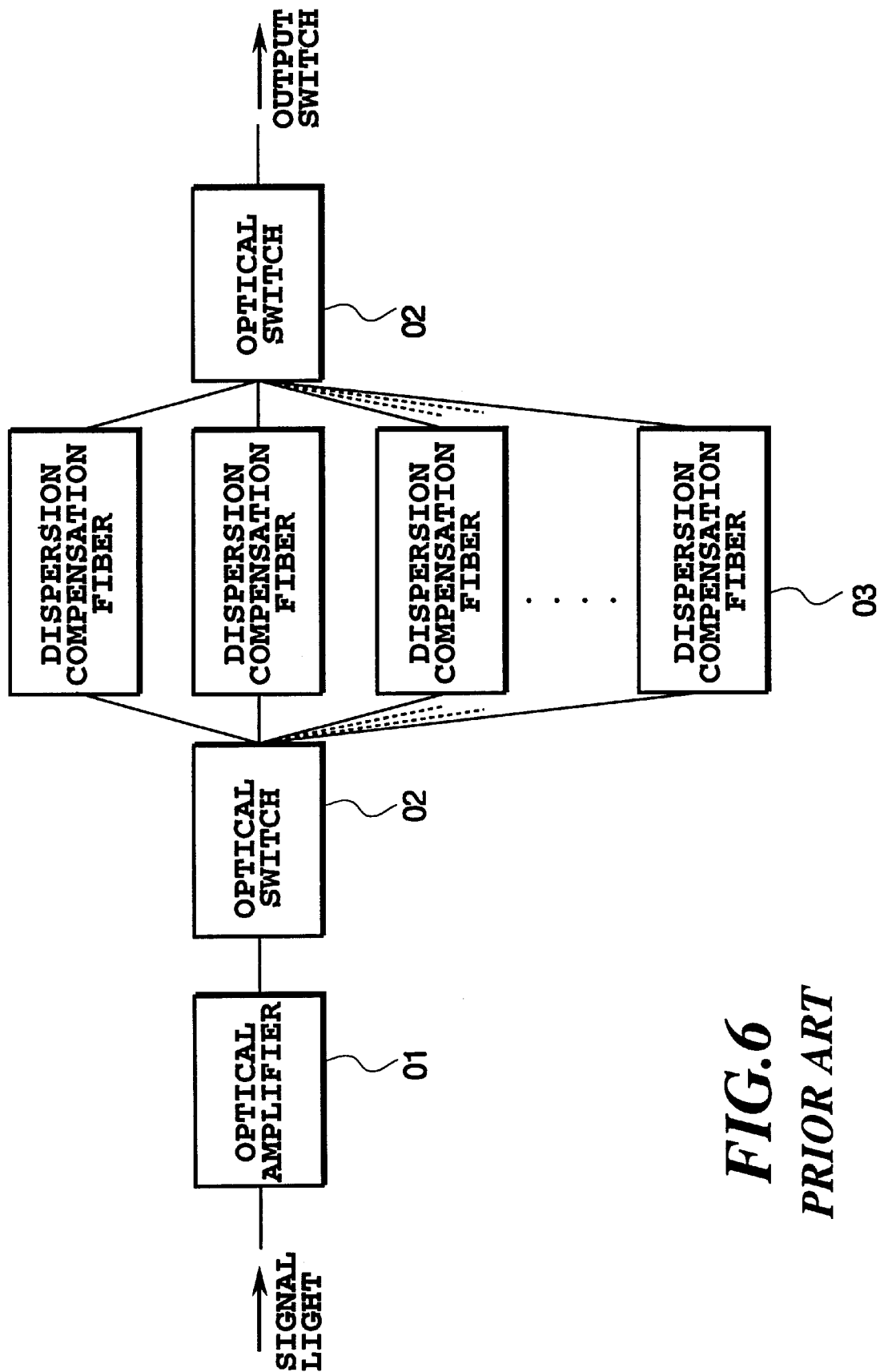
FIG. 6 is a schematic view showing the structure of a prior art dispersion compensatable optical signal processing apparatus.
Figure 7:
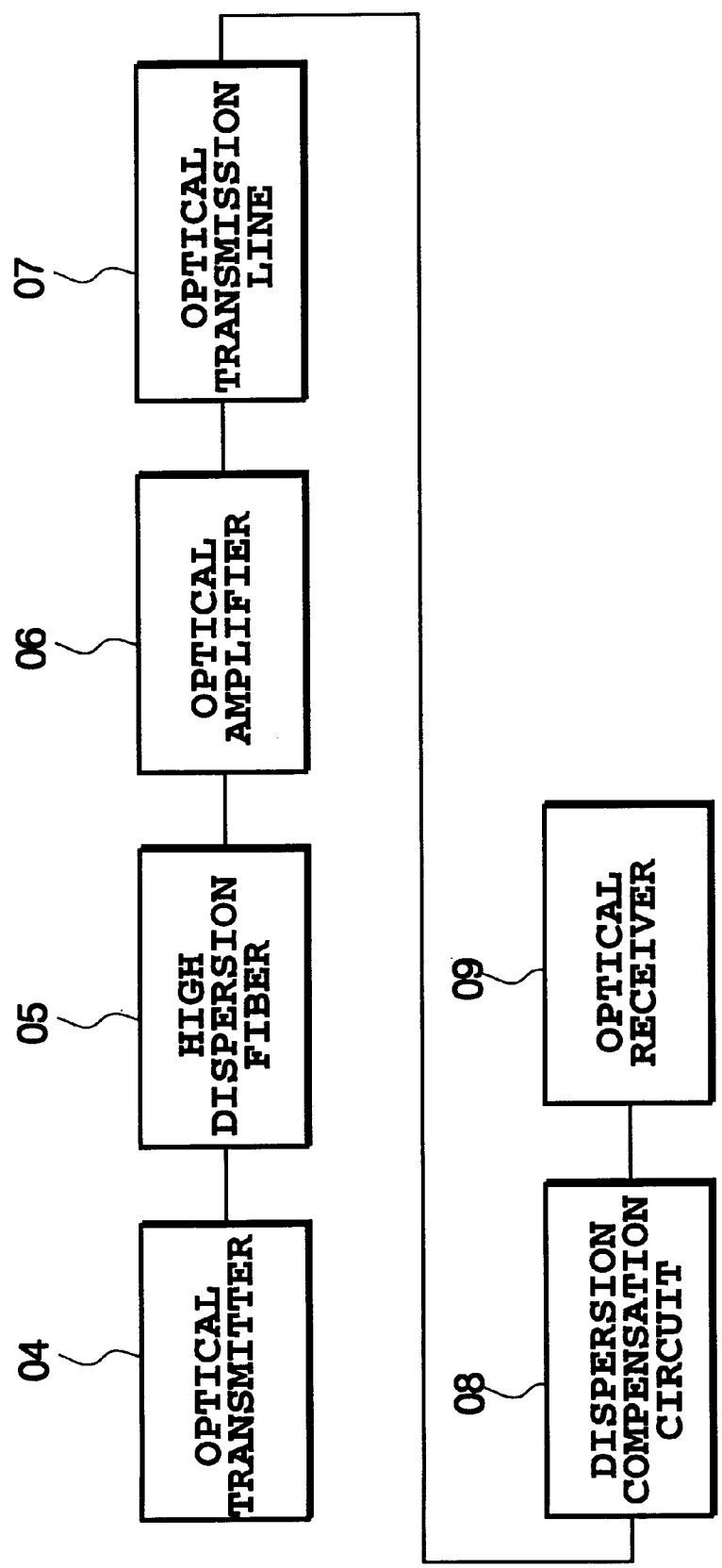
FIG. 7 is a schematic view showing the structure of another prior art dispersion compensatable optical signal processing apparatus.
Figure 55:
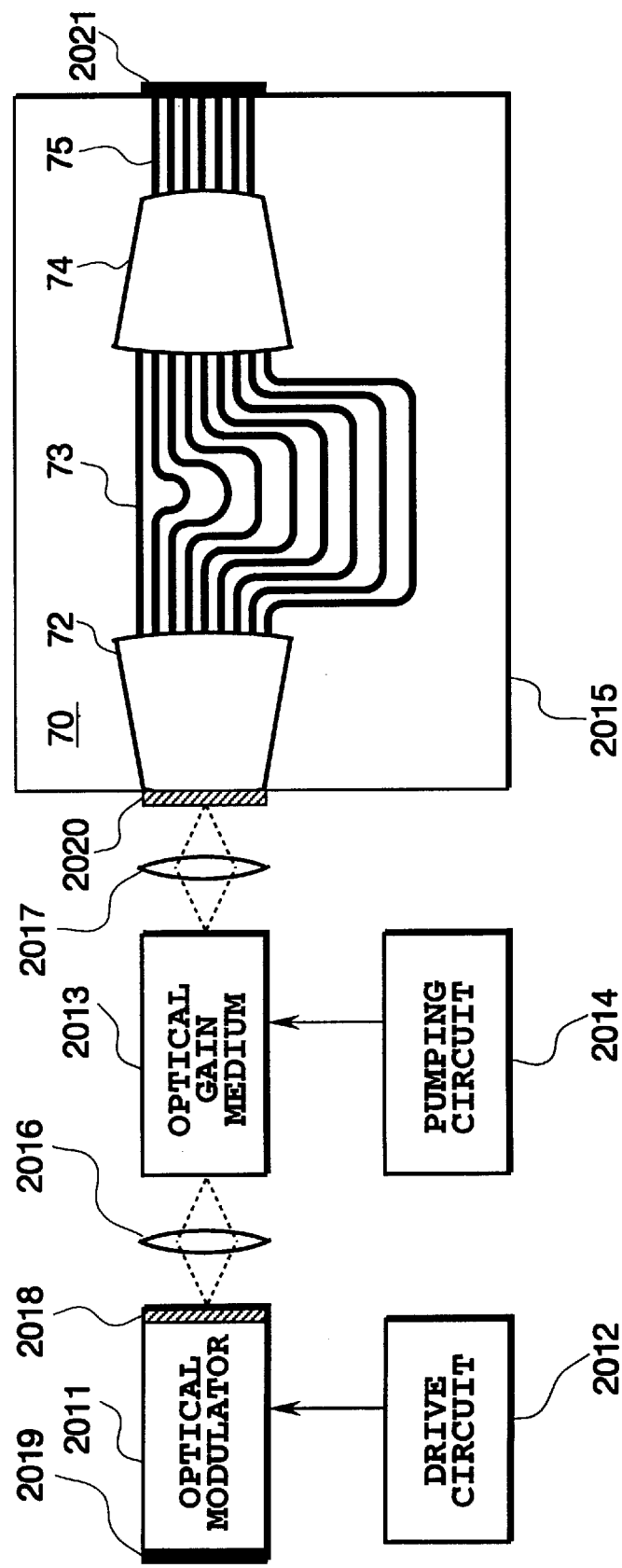
FIG. 55 is a schematic view showing the structure of the optical signal processing apparatus (short pulse light source) according to an embodiment 20 of the present invention.

FIG. 55 shows an embodiment 20 of the present invention, which is a short pulse light source. In the Figure, the short pulse light source according to the present invention comprises an optical modulator 2011, a drive circuit 2012 for driving the optical modulator 1011, an optical gain medium 2013, an pumping circuit 2014 for forming population inversion on the optical gain medium 2013, an arrayed waveguide grating 2015 with eliminated the input waveguide 71 from the arrayed waveguide grating 62 shown in FIG. 5, optical coupling means 2016 for coupling the optical modulator (optical modulation means) 2011 and the optical gain medium (optical gain means) 2013, and optical coupling means 2017 for coupling the optical gain medium 2013 and the arrayed waveguide grating 2015. The optical coupling means 2016 side of the optical modulator 2011 is provided with a low reflection coating 2018, and a high reflection mirror 2019 is disposed at the opposite side (outside). The optical coupling means 2017 side of the arrayed waveguide grating 2015 is provided with a low reflection coating 2020, and a high reflection mirror 2021 is disposed at the opposite side (outside).

The optical modulator 2011 can be an MQW modulator, an LN modulator, or the like. The optical gain medium 2013 can be a traveling wave type semiconductor optical amplifier, rare earth doped optical fiber amplifier, or the like. The pumping circuit 1014 is a current source when the optical gain medium 1013 is a traveling wave type semiconductor optical amplifier, and an pumping light source for the case of the rare earth doped optical fiber amplifier. Further, the substrate 70 of the arrayed waveguide grating 2015 can be a semiconductor substrate such as InP or GaAs in addition to quartz substrate.

The arrayed waveguide grating 2015 comprises a slab waveguide 72, an arrayed waveguide 73 comprising a plurality of waveguides gradually increasing in length by waveguide length difference ΔL, a slab waveguide 74, and a plurality of output waveguides, formed on the substrate 70.

Wherein ns is a refractive index of the slab waveguides 72 and 74, nc is a refractive index of the arrayed waveguide 73, d is a spacing of the arrayed waveguide 73 on the slab waveguide end surface, θ is a focusing direction with respect to the central axis of the slab waveguide 74, $f_s$ is a focal length, and λ is wavelength of light, the focusing position is given by:

$$n_s \cdot d \sin\theta + n_c \Delta L = m\lambda \quad (m=1, 2, \ldots)$$

Figure 56:
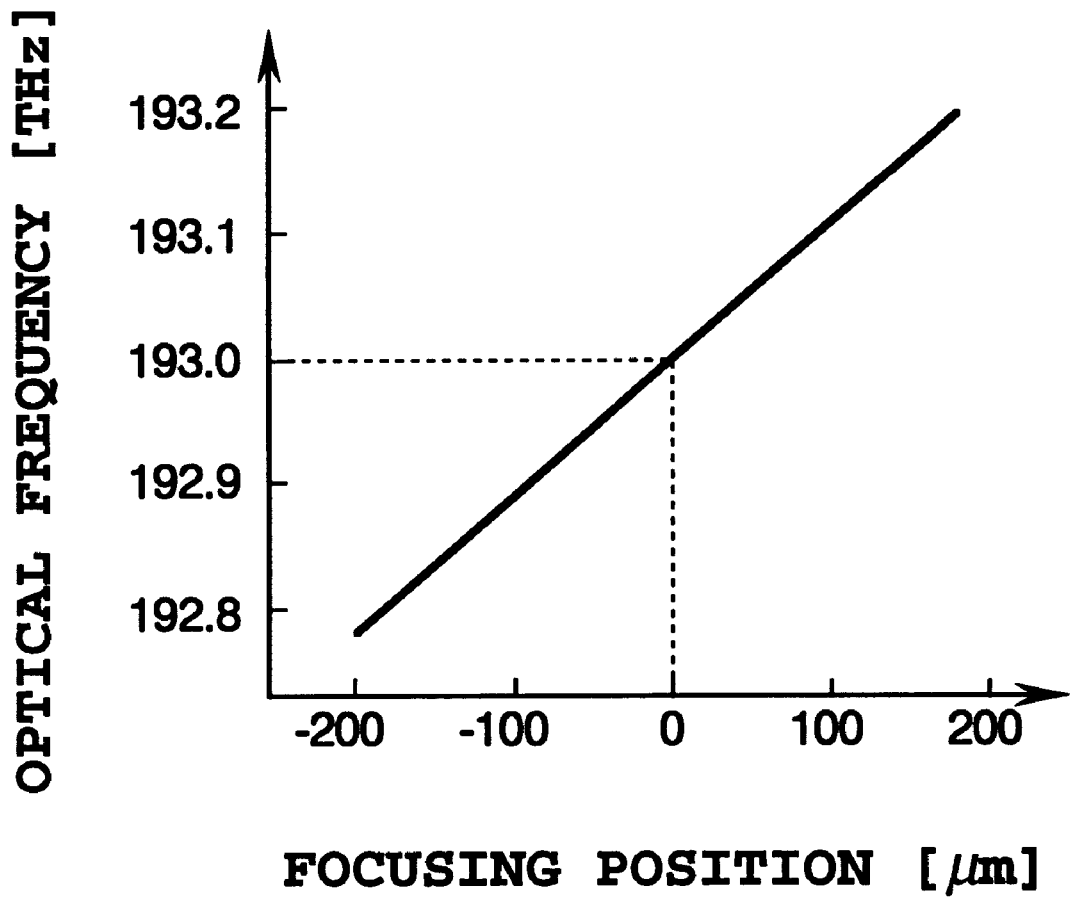
FIG. 56 is a diagram showing the relationship between frequency of incident light to slab waveguide 72 and focusing position x on focal plane of slab waveguide 74 in the optical signal processing apparatus according to an embodiment 20 of the present invention.

The value of m is generally several tens to several hundreds. The relationship between the optical frequency incident to the slab waveguide and the focusing position x on the focal plane of the slab waveguide is as shown in FIG. 56. Linear dispersion (dx/df=fs·dθ/df) is 1 [μm/GHz].

Figure 57:
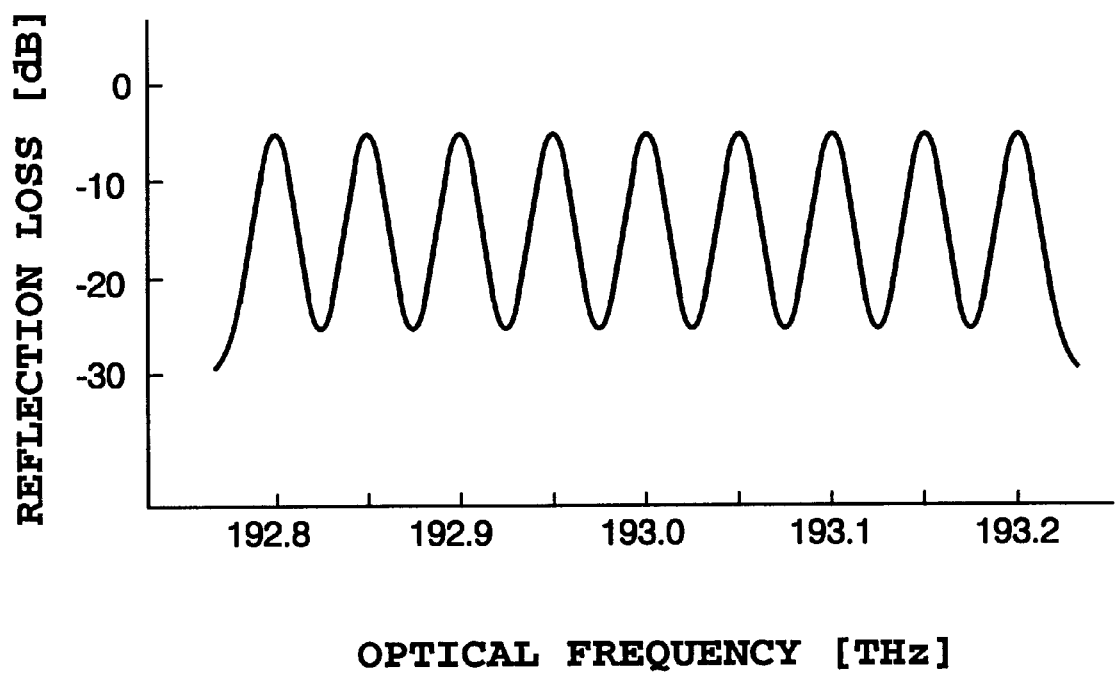
FIG. 57 is a diagram showing reflection spectrum when spacing of output waveguide 75 is set to 50 $\mu$m and core width to 10 $\mu$m in the embodiment 20 of the present invention.

Light incident to the slab waveguide 72 is reflected by the high reflection mirror 2021 through the output waveguide 75 connected at an interval of Δx to the end surface of the slab waveguide 74, and again output in the reverse direction from the slab waveguide 72. The reflection spectrum of such an arrayed waveguide grating 2015 is according to the interval Δx and the core width of the output waveguide 75. For example, a reflection spectrum when Δx is 50 μm and the core width is 10 μm is shown in FIG. 57. According to the position of the output waveguide 75, a comb-formed reflection spectrum having reflection peaks at every 50 GHz is obtained.

Figure 58:
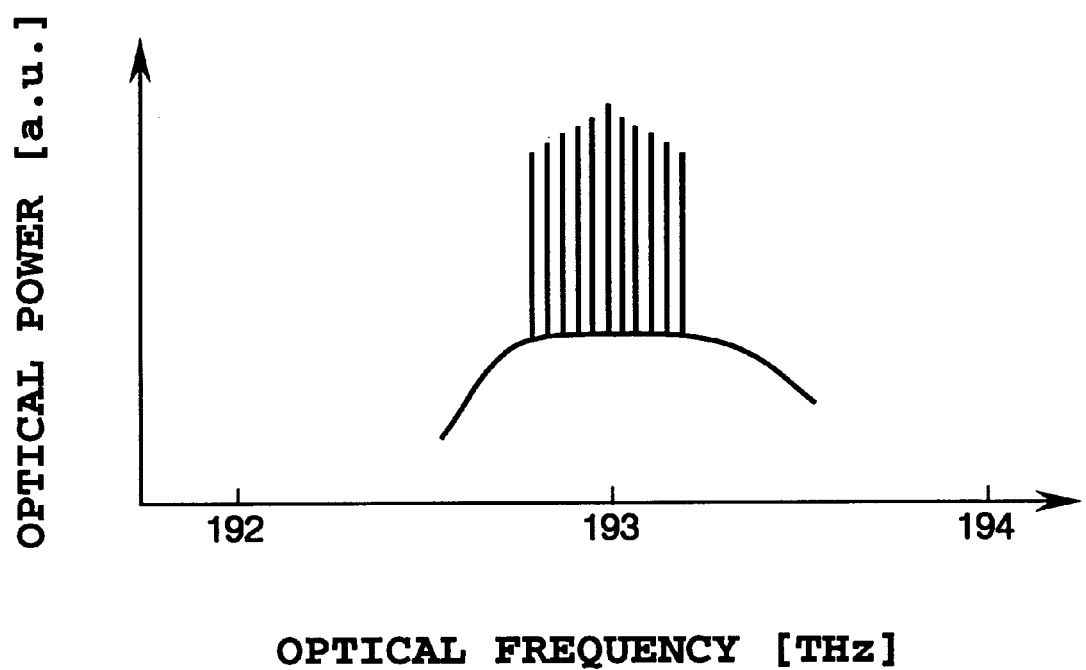
FIG. 58 is a diagram showing oscillation wavelength spectrum of the optical signal processing apparatus according to the embodiment 20 of the present invention.
Figure 59:
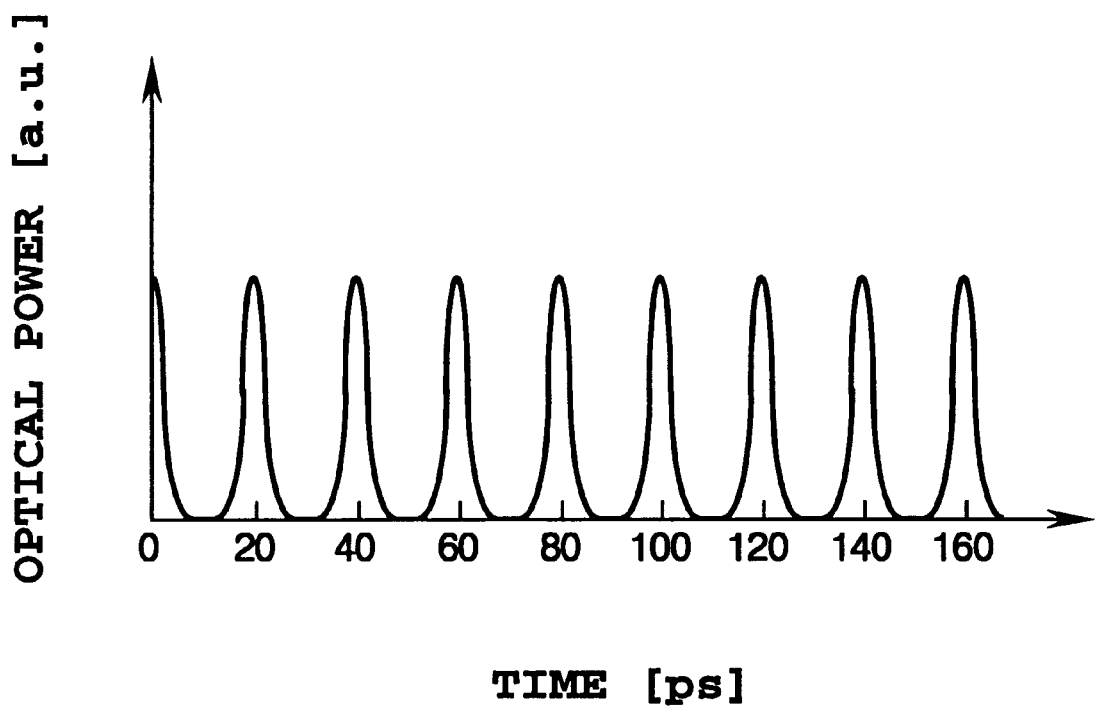
FIG. 59 is a diagram showing oscillation pulse wavelength of the optical signal processing apparatus according to the embodiment 20 of the present invention.

In the construction of the present embodiment, an optical resonator is formed between the high reflection mirror 2017 and the high reflection mirror 2021, thereby simultaneously oscillating light of a plurality of wavelengths when the gain of the optical gain medium is sufficiently high. Further, when a sufficiently deep modulation is applied by driving the optical modulator with a sine wave of frequency f by the drive circuit 2012, coupling occurs between oscillation modes to make mode locked oscillation. The driving frequency f is represented as $$f = k \cdot c/(2 \cdot L_{eff}) = \Delta x/(dx/df)$$

wherein Leff is an equivalent optical distance between the high reflection mirror 2019 and the high reflection mirror 2021, and k is an integer. In this case, phase relation of each vertical mode is maintained constant, an optical short pulse sequence of a repetition frequency f is generated. The oscillation spectrum is shown in FIG. 58 and the oscillation pulse waveform is shown in FIG. 59.

The prior art mode locked type laser has been difficult to set the frequency of each mode. However, in the construction of the present embodiment, since frequency of each mode is determined by the interval Δx of the output waveguide 75 of the arrayed waveguide grating 2015, frequency of each mode can be set in detail. Further, when the arrayed waveguide grating 2015 is formed on a quartz substrate, oscillation is possible at a frequency stable to temperature changes.

Figure 60:
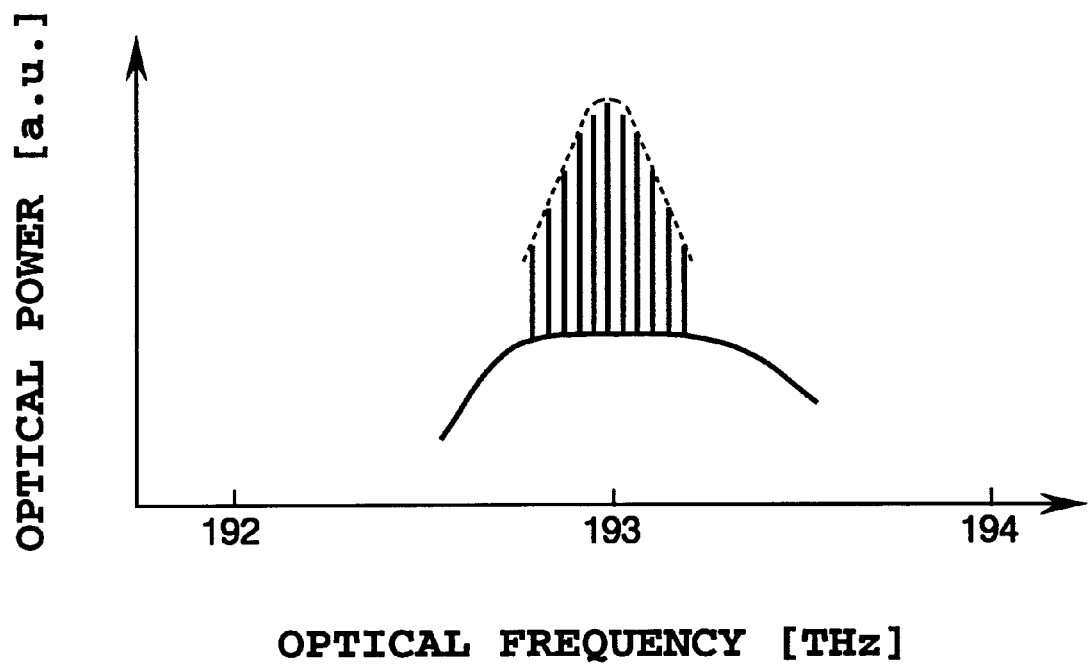
FIG. 60 is a diagram showing an example of oscillation frequency spectrum that can be achieved by the optical signal processing apparatus according to the embodiment 19 of the present invention.

Still further, the prior art mode locked laser has been difficult to set the pulse width. However, in the construction of the present embodiment, by controlling the number of output waveguides 75 of the arrayed waveguide grating 15 and the reflectivity of the high reflection mirror 2021, that is, by setting the oscillation pulse width, the pulse width can be previously set. For example, a Gaussian type envelope spectrum as shown in FIG. 60 can be achieved. In this case, the pulse waveform on the time base is also Gaussian type.

Embodiment 21

Figure 61:
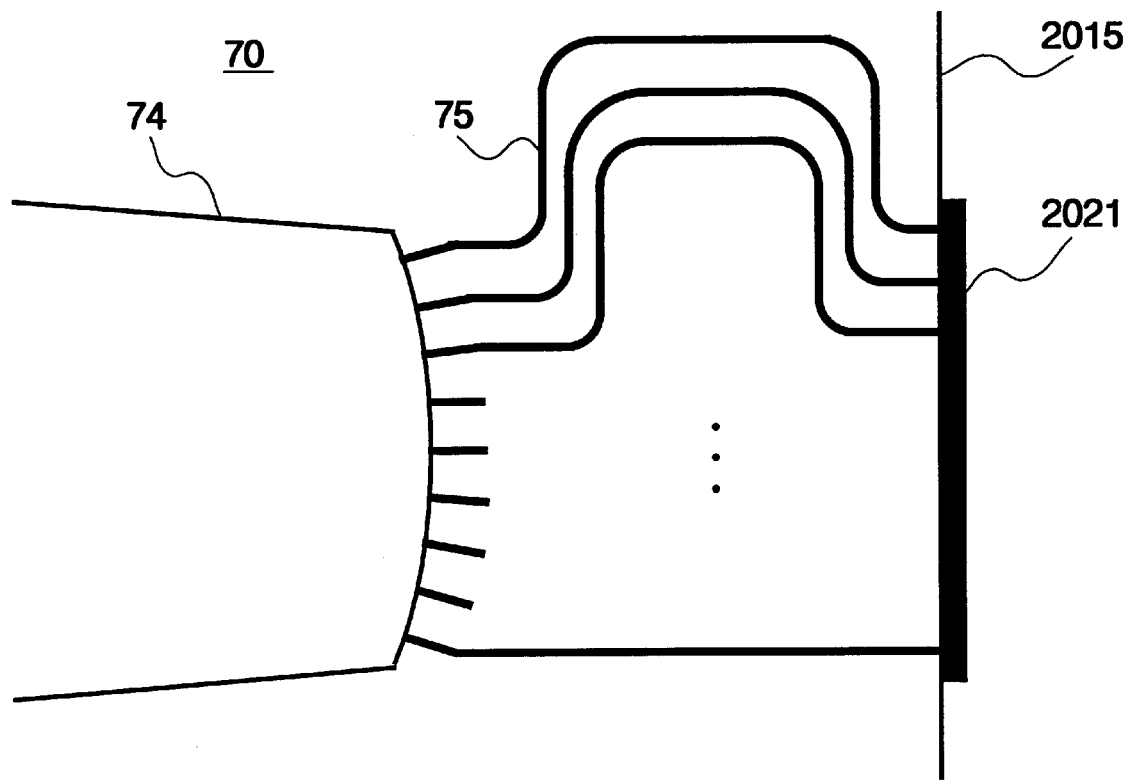
FIG. 61 is a schematic enlarged view showing part of the optical signal processing apparatus (short pulse light source) according to an embodiment 21 of the present invention.

FIG. 61 shows an embodiment 21 of the present invention, which is a short pulse light source.

The basic structure is the same as the embodiment 20 shown in FIG. 55. Here, an enlarged view of the slab waveguide 74 and the output waveguide 75 part of the arrayed waveguide grating 2018 is shown.

The present embodiment is characterized in that lengths of individual waveguides of the output waveguide 75 are changed so that dispersion in the optical resonator can be compensated.

In general, a semiconductor material has a large dispersion, most of dispersion in the optical resonator of the present invention is considered to be semiconductor material dispersion in the optical modulator 2011 and the optical gain medium 2013. The dispersion is about 0.005 ps/nm. When the output waveguide 75 is disposed with an interval of 50 μm to the arrayed waveguide 73 having a linear dispersion of 1 μm/GHz, if the adjacent waveguide length difference is 0.4 μm, it is possible to compensate the dispersion in the optical resonator. In this case, each waveguide length can be set so that a phase difference in the resonator to each mode is 2mπ(m=1, 2, ... ).

So, adjacent waveguide length difference can be set as follows;

$$0.4 \ \mu m \pm m\lambda_k/2n_{eff}$$

wherein $\lambda_k$ is the wavelength of k's mode and $n_{eff}$ is the effective refractive index of the output waveguide.

This generates a pulse close to the transform limit. When the arrayed waveguide grating 2015 having a high free spectral range is used, a very short pulse sequence of sub-picosecond can be generated.

Embodiment 22

Figure 62A:
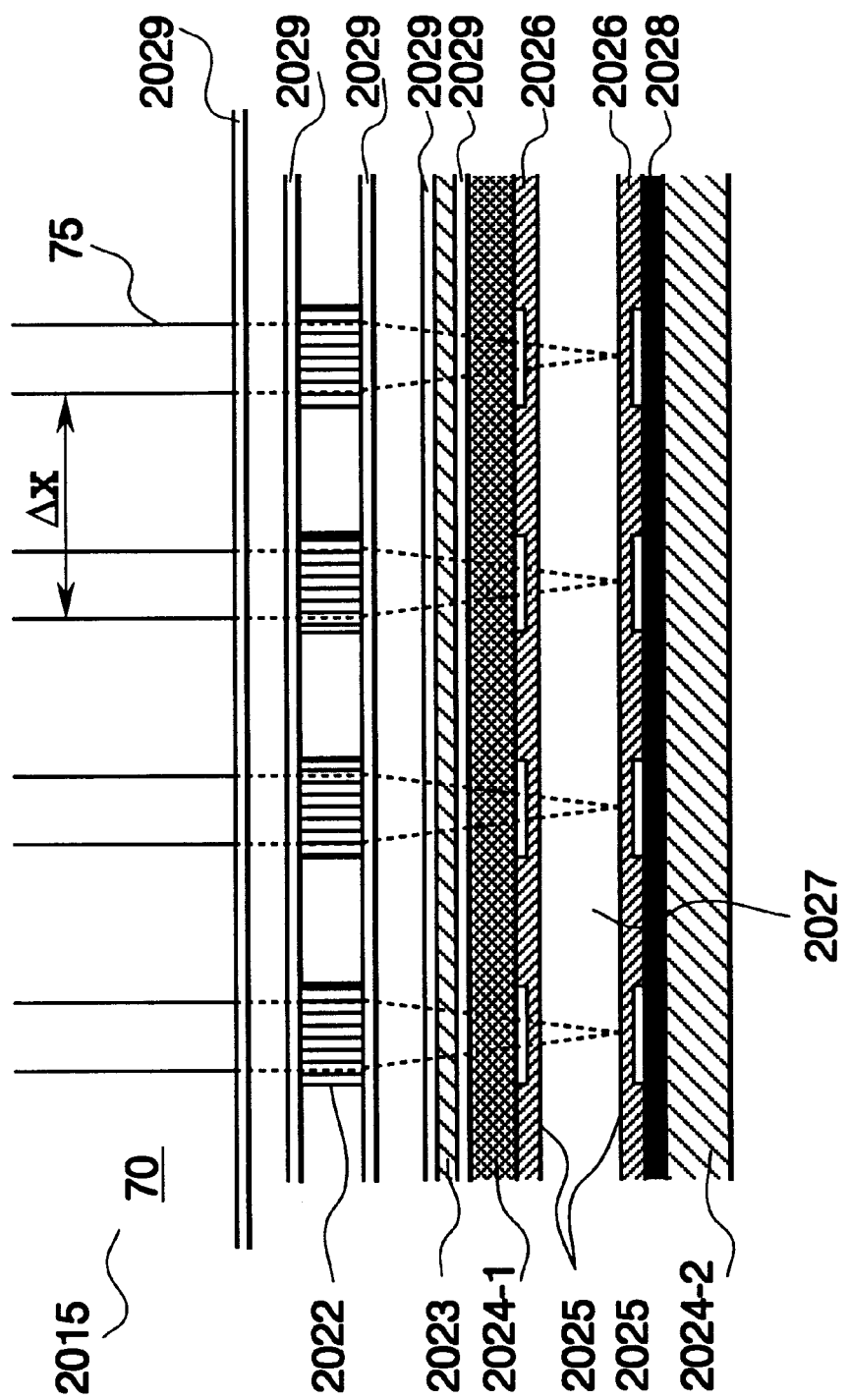
FIG. 62A is a schematic enlarged view showing part of the optical signal processing apparatus (short pulse light source) according to an embodiment 22 of the present invention.

FIG. 62 shows an embodiment 22 of the present invention, which is a short pulse optical light source.

The basic structure is the same as the embodiment 20 shown in FIG. 55. Here, an enlarged view of the output waveguide 75 part of the arrayed waveguide grating 2015 in the embodiment 20 is shown.

The present embodiment is characterized by a lens array and a liquid crystal spatial modulator having a high reflection mirror on one side in place of the high reflection mirror 2021 at the end surface of the output waveguide 75. The lens array comprises a gradient refractive index lens 2022 disposed at spacings of Δx. The liquid crystal spatial modulator comprises a polarizer plate 2023, a glass substrate 2024-1, a twist nematic liquid crystal 2027 placed between a transparent electrode 2025 and a polarizer plate 2026 disposed at a spacing of Δx, a high reflection mirror 2028, and a glass substrate 2024-2, which are stacked. End surface of the output waveguide 75, and both surfaces of the gradient refractive index lens 2022 and the polarization plate 2023 are provided with a low reflection coating 2029.

The liquid crystal spatial modulator can control the reflectivity from the high reflection mirror 2028 to the output waveguide 75 by applying a voltage between opposing transparent electrode 2025. This enables mode control dynamically, and can change the pulse waveform as necessary.

The spatial modulator in this case is not limit to the liquid crystal spatial modulator, but another modulator such as an MQW modulator, a modulator by Franz-Keldysh effect, an LN modulator, or a modulator by a nonlinear material can be utilized.

Figure 62B:
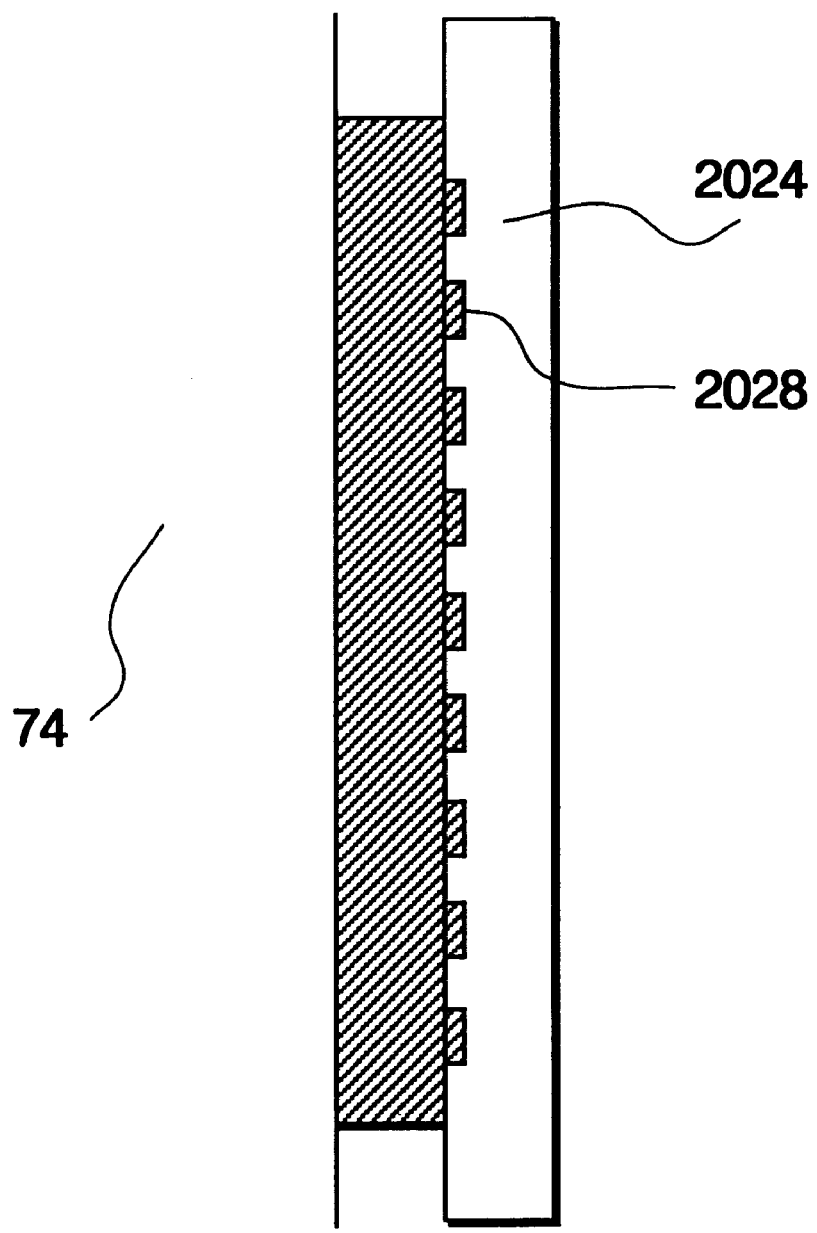
FIG. 62B is a schematic view showing the structure in the vicinity of phase filter used for making dispersion compensation in resonator in the optical signal processing apparatus (short pulse light source) according to the embodiment 22 of the present invention.

Further, it is needless to say that, to make dispersion compensation in the resonator, the above described dispersion compensation phase filter may be used. A cross sectional structure in this case is shown in FIG. 62B. In the Figure, 74 is a slab waveguide, 2024 is a holding substrate, 2028 is a high reflection mirror, and 3000 is a dispersion compensation phase filter.

Embodiment 23

Figure 63:
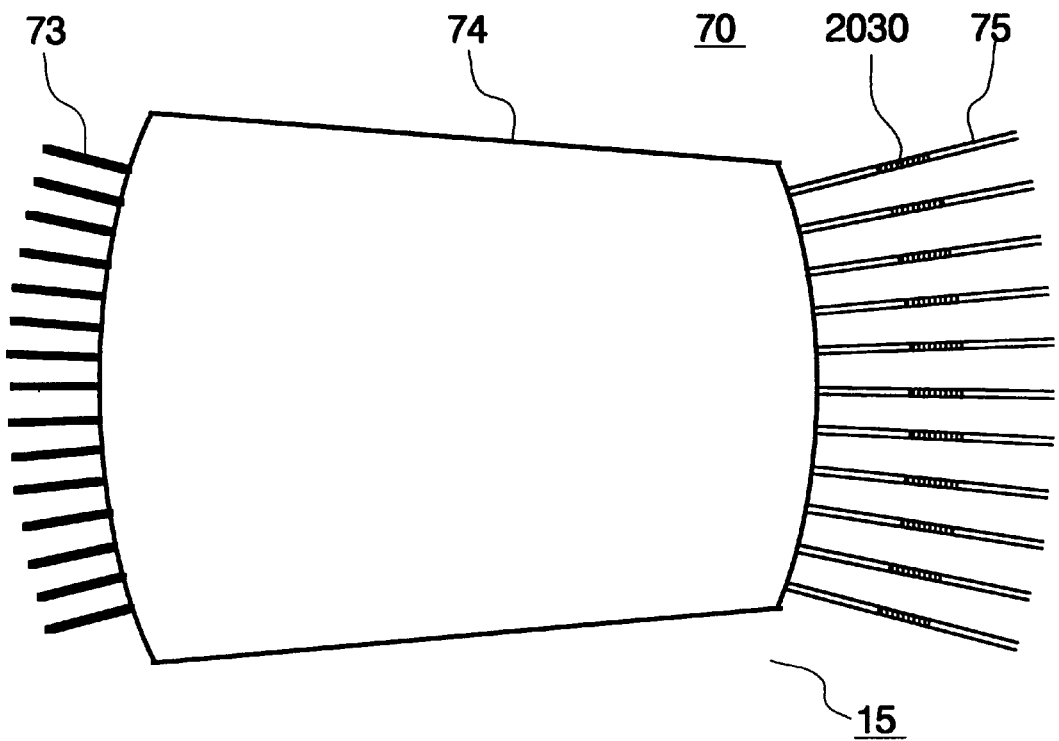
FIG. 63 is a schematic enlarged view showing part of the optical signal processing apparatus (short pulse light source) according to an embodiment 23 of the present invention.

FIG. 63 shows an embodiment 23 of the present invention (short pulse light source).

Basic construction of the present embodiment is the same as embodiment 20 shown in FIG. 55. Here, an enlarge view of the slab waveguide 74 of the arrayed waveguide grating 2015 and the output waveguide 75 part is shown.

The present embodiment is characterized in that a diffraction grating 2030 is formed in the output waveguide instead of using the high reflection mirror 2021. This diffraction grating 2030 can be functioned as a very narrow band high reflection mirror. Since it has a spectroscopic characteristic, it enables very detailed mode wavelength setting. Further, by disposing the diffraction grating at an appropriate position, dispersion compensation in the optical resonator is possible as in the embodiment 20, and can generate a pulse close to the transform limit.

Embodiment 24

Figure 64:
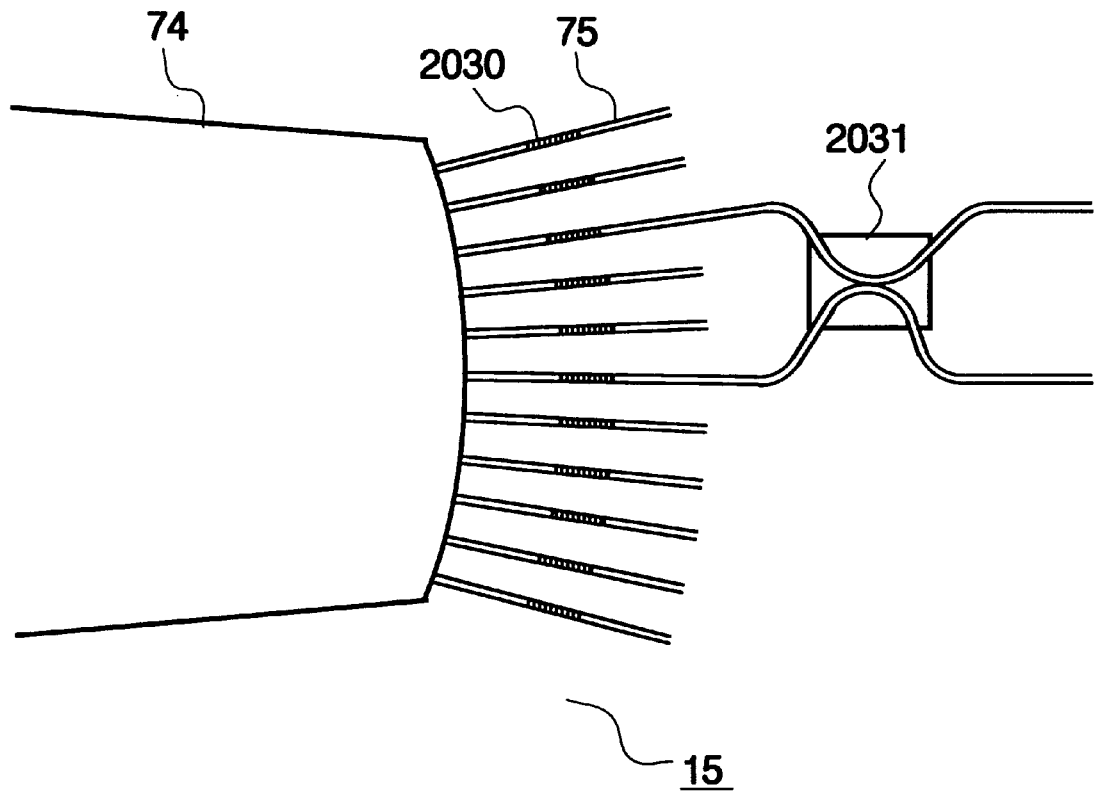
FIG. 64 is a schematic enlarged view showing part of the optical signal processing apparatus (short pulse light source) according to an embodiment 24 of the present invention.

FIG. 64 shows an embodiment 24 of the present invention (short pulse light source).

Basic construction of the present embodiment is the same as embodiment 19 shown in FIG. 55. Here, an enlarge view of the slab waveguide 74 of the arrayed waveguide grating 2015 and the output waveguide 75 part is shown.

The present embodiment is characterized in that two or three or more units of the output waveguides provided with the diffraction grating 2030 as in the embodiment 22 are connected to an optical coupler 2031. By coupling light from the predetermined waveguides of the output waveguide 75 by the optical coupler 2031, it is possible to couple a predetermined mode when mode locked oscillation is being made, thereby generating various pulse waveforms. For example, when coupling only an odd or even numbered mode to be output, an optical short pulse sequence of twice the repetition frequency of mode locked frequency can be generated.

Embodiment 25

Figure 65:
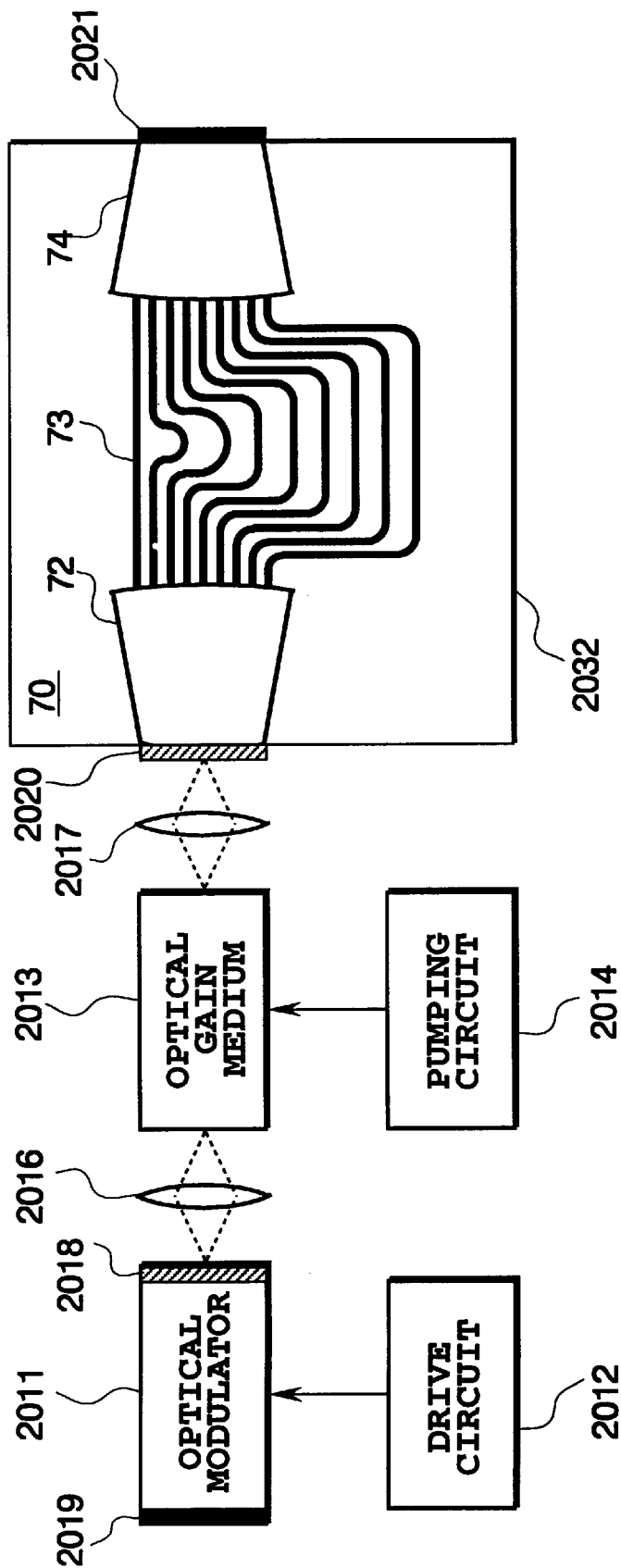
FIG. 65 is a schematic view showing the structure of the optical signal processing apparatus (short pulse light source) according to an embodiment 25 of the present invention.

FIG. 65 shows an embodiment 25 of the present invention (short pulse light source).

In the Figure, an arrayed waveguide grating 2032 has a construction in which the output waveguide 75 is eliminated from the arrayed waveguide grating in the embodiment 20, and a plurality of high reflection mirrors 2021 are disposed at spacings of Δx on the focal plane of the slab waveguide 74. Other construction is the same as the embodiment 20.

Figure 66:
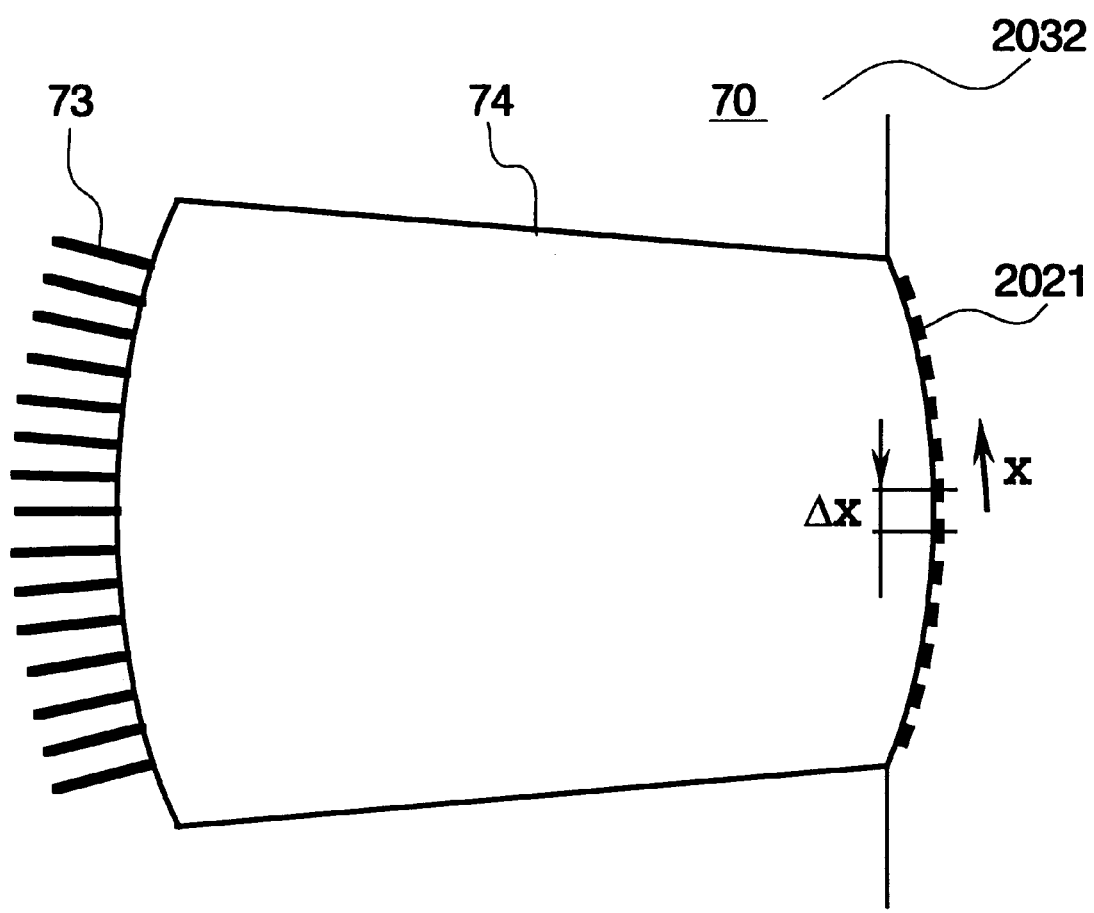
FIG. 66 is a schematic enlarged view showing the apparatus shown in FIG. 65.

FIG. 66 shows an enlarged view of the slab waveguide 74 part of the arrayed waveguide grating 2032.

In the Figure, end surface of the substrate 70 of the arrayed waveguide grating 2032 is cut along the focal plane of the slab waveguide 74, and a plurality of high reflection mirrors 2021 are disposed at spacings of Δx on the end surface. Further, to reduce end surface reflection from parts other than the high reflection mirrors 2021, the entire end surface of the substrate 70 is provided with a low reflection coating.

Embodiment 26

Figure 67:
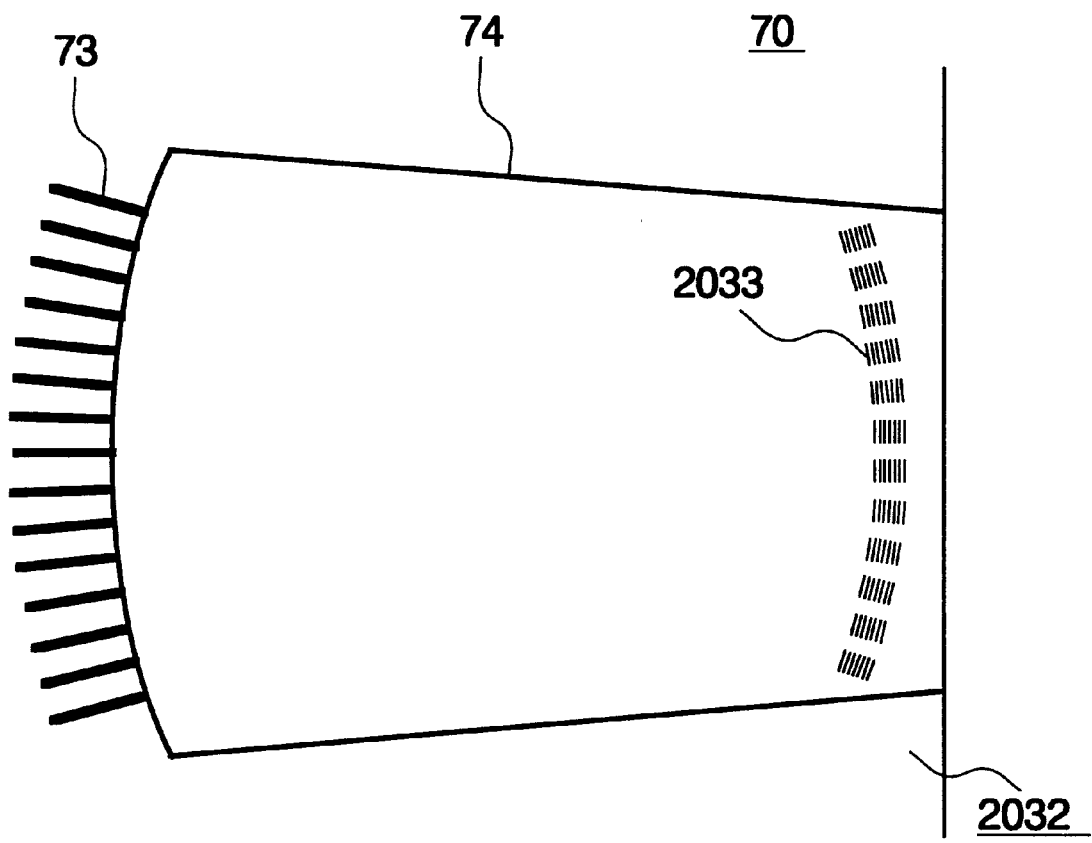
FIG. 67 is a schematic enlarged view showing part of the optical signal processing apparatus (short pulse light source) according to an embodiment 26 of the present invention.

FIG. 67 shows an embodiment 26 of the present invention (short pulse light source).

Basic construction of the present embodiment is the same as embodiment 25 shown in FIG. 65. Here, an enlarged view of the slab waveguide 74 part of the arrayed waveguide grating 2032 is shown.

The present embodiment is characterized in that a diffraction grating 2033 is formed on the focal plane of the slab waveguide 74 instead of using the high reflection mirror 2021.

The diffraction grating can be written by using ultraviolet light as in a diffraction grating formed in an optical fiber. Since a quartz substrate is small in coupling constant of diffraction grating and small in loss, the diffraction grating can be functioned as a very narrow band high reflection mirror. Further, in addition to the spectroscopic function of the arrayed waveguide grating, since the high reflection mirror by the diffraction grating 2033 in the slab waveguide 74 has a spectroscopic characteristic, a very detailed mode wavelength can be set. Still further, by dislocating individual positions of the diffraction grating 2033 on the normal line of the focal plane, dispersion compensation in the optical resonator as in the embodiment 20, thereby generating a pulse close to the transform limit.

Embodiment 27

FIG. 68 shows an embodiment 27 of the present invention (short pulse light source).

Figure 68A:
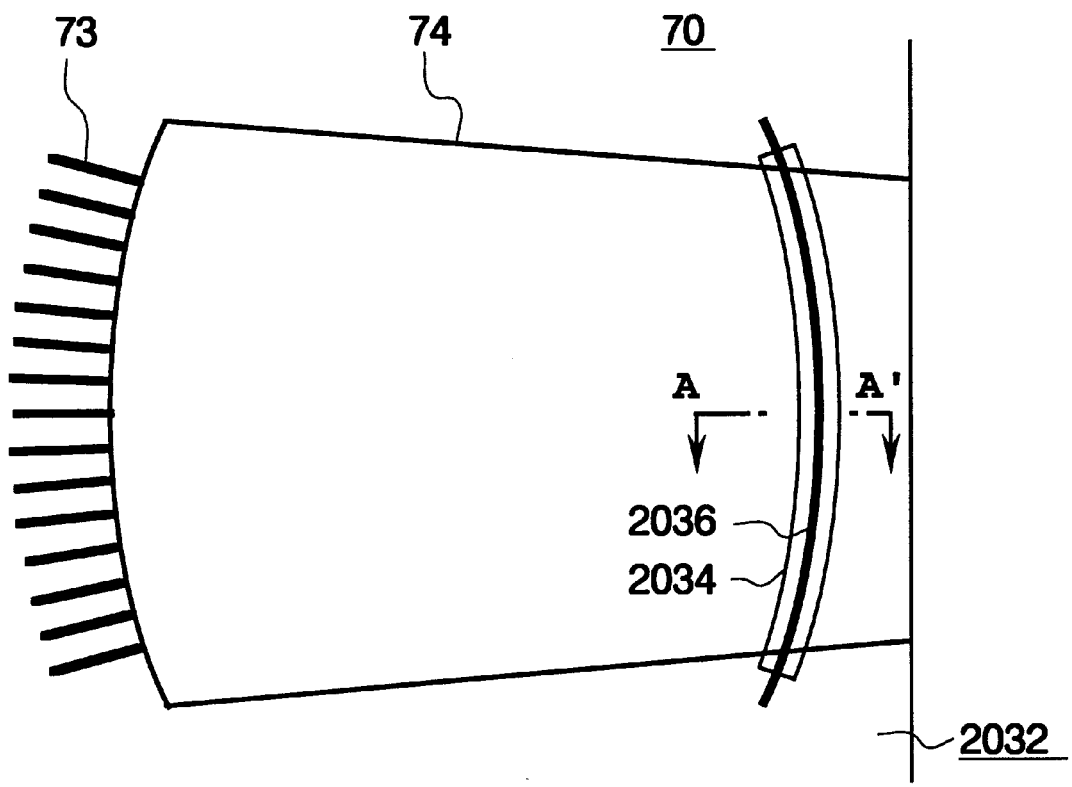
FIG. 68A is a schematic enlarged view showing part of the optical signal processing apparatus (short pulse light source) according to an embodiment 27 of the present invention.
Figure 68B:
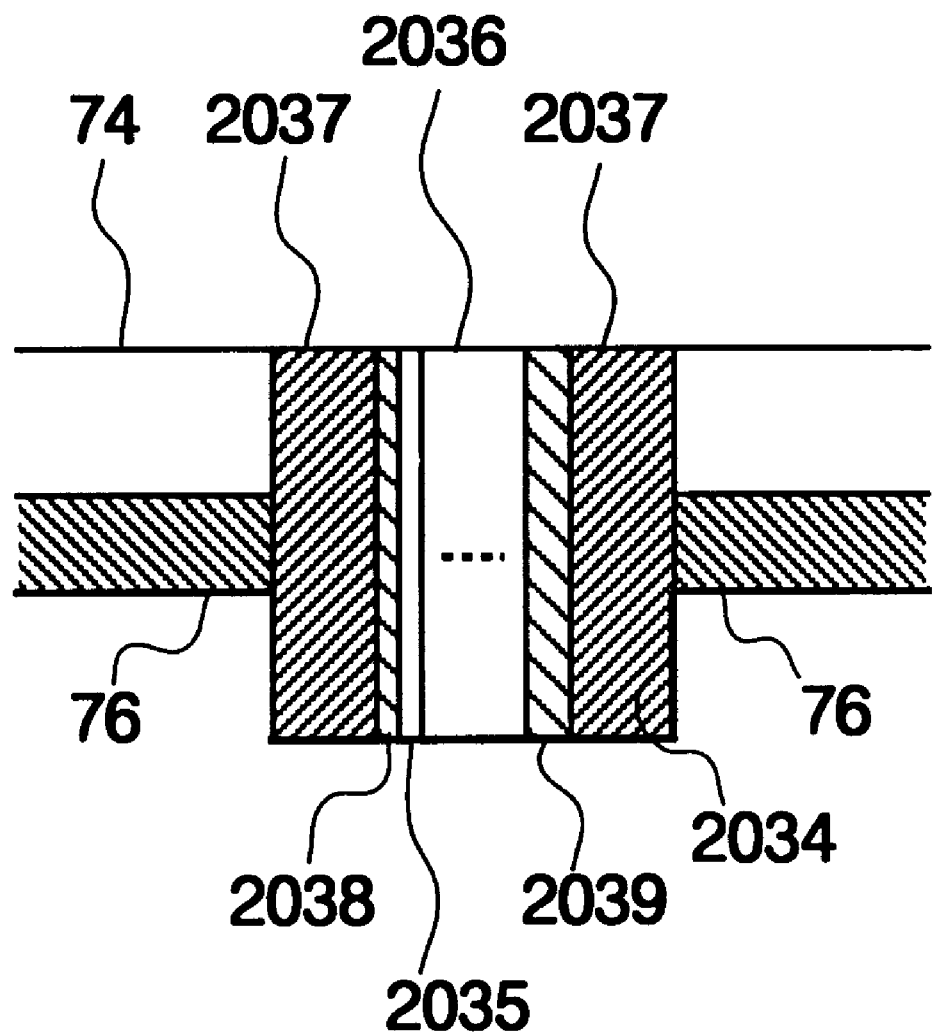
FIG. 68B is a schematic cross sectional view taken along line A-A' of FIG. 68A.

Basic construction of the present embodiment is the same as embodiment 26 shown in FIG. 67. Here, an enlarged view of the slab waveguide 74 part of the arrayed waveguide grating 2032 is shown. FIG. 68A is a plan view, and FIG. 68B is a cross sectional view of FIG. 68A along line A-A'. The reference numeral 76 indicates a waveguide core.

The present embodiment is characterized in that, instead of using the high reflection mirror 2021, a groove 2034 perpendicular to the substrate 70 is formed along the focal plane of the slab waveguide 74, and a polyimide film 2036 formed with a plurality of mirrors 2035 is inserted in the groove.

The polyimide film 2036, to eliminate unnecessary reflected light from the waveguide end surface, is fixed with an adhesive which is transparent in the operating wavelength and small in refractive index difference from the equivalent refractive index of the waveguide. Further, to eliminate reflected light from part without the mirror 2035 of the polyimide film 2036, the surface is provided with a low reflection coating 2038. Still further, to avoid reflection from the back surface, the back side is laminated with a light absorption film 2039. Yet further, in the present embodiment, various films can be used other than polyimide film.

Yet further, the arrayed waveguide gratings in the embodiments 20 to 26 are set in a short pulse light source, the arrayed waveguide grating of these embodiments can also be applied in other applications such as waveform shaping and dispersion compensation Embodiment 28

Figure 69:
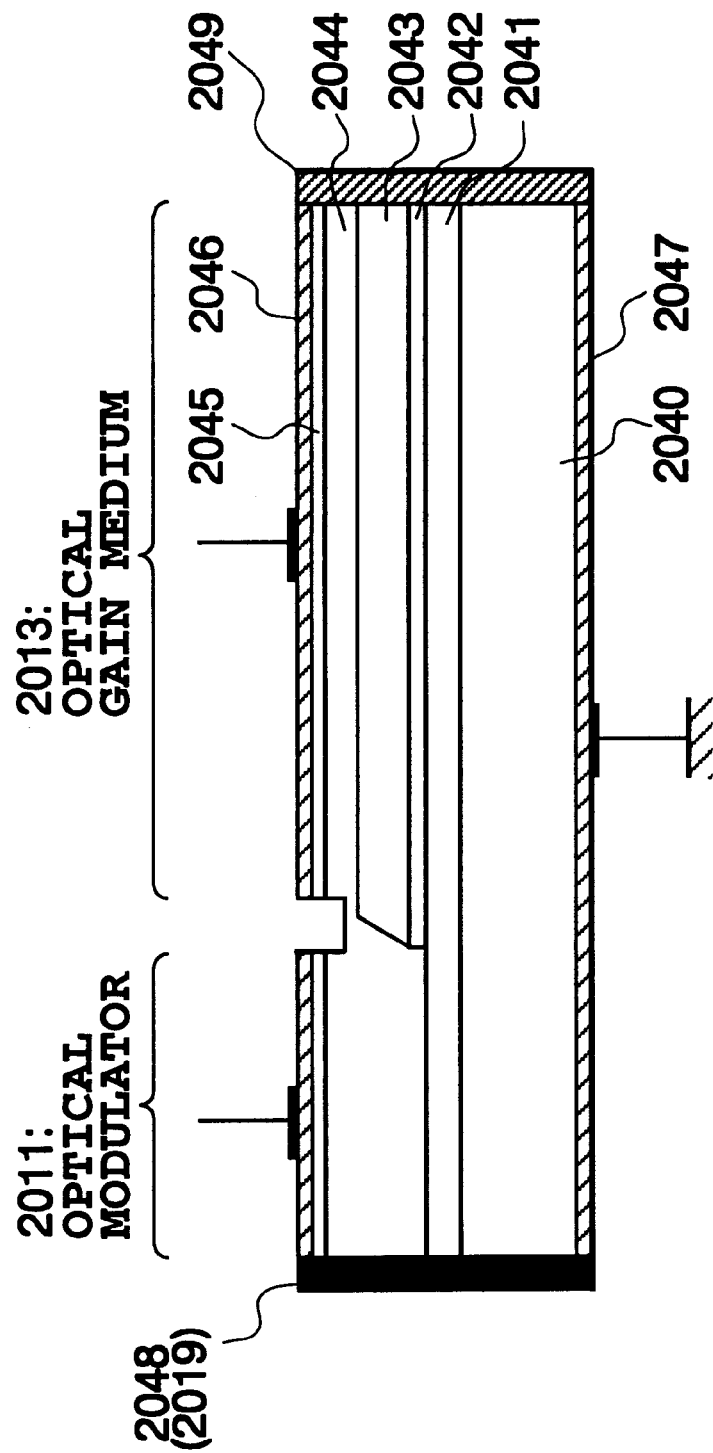
FIG. 69 is a schematic enlarged view showing part of the optical signal processing apparatus (short pulse light source) according to an embodiment 28 of the present invention.

FIG. 69 shows an embodiment 28 of the present invention (short pulse light source).

The present embodiment shows a construction in which the optical modulator 2011 and the optical gain medium 2013 are integrated. An n-InP substrate 2040 is stacked with an optical modulation MQW layer 2041, an i-etch stop layer 2042, a laser MQW layer 2043, an n-InP layer 2044, an n-InGaAsP layer 2045, and an AuZnNi electrode 2046, and an AuGeNi electrode 2047 is mounted on the backside of the n-InP layer 2040. End surface at the optical modulator 2011 side is provide with a high reflection mirror 2048 (2019), and end surface of the optical gain medium 2013 is provided with a low reflection coating 2049. By such integration, the number of parts of the pulse light source is reduced, optical coupling means is sufficient at only one position between the arrayed waveguide gratings 2015 and 2032, thereby achieving an economical and reliable short pulse light source.

Embodiment 29

Figure 70:
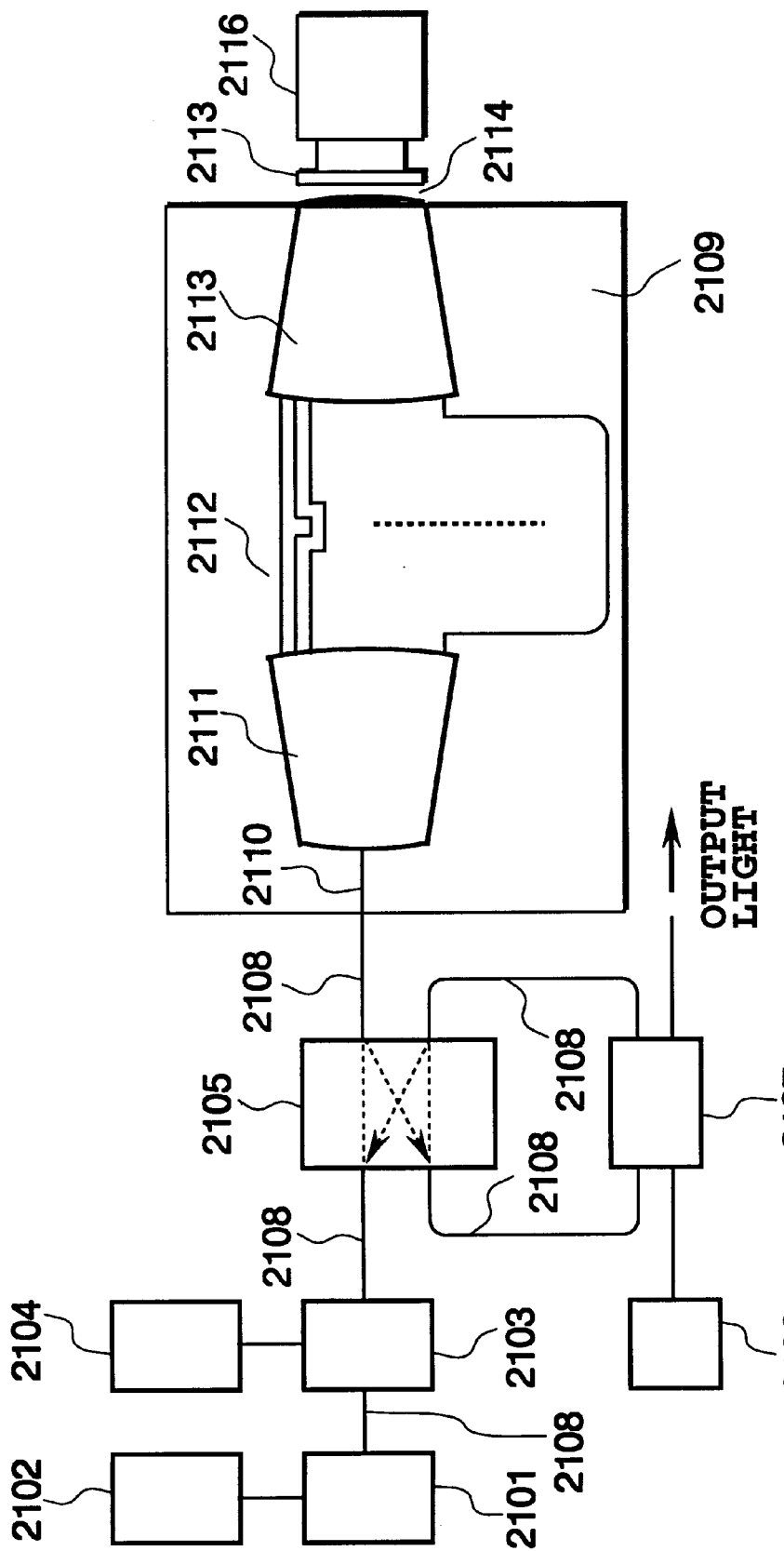
FIG. 70 is a schematic view showing the structure of the optical signal processing apparatus according to an embodiment 29 of the present invention.

In FIG. 70, 2011 is a fiber output type optical modulator provided with a low reflection structure at the output surface and with a high reflection structure on the opposite surface, 2102 is a modulator drive circuit, 2103 is a fiber output type optical gain medium, 2104 is a gain medium pumping circuit, 2105 is a 4-terminal type optical circulator, 2106 is a non-reflection terminator, 2107 is an optical coupler, 2108 is a polarization maintaining optical fiber, 2109 is an arrayed waveguide grating, 2110 is an optical waveguide, 2111 is a first slab waveguide, 2112 is a waveguide array, 2113 is a second slab waveguide, 2114 is a lens, 2115 is a high reflection mirror, and 2116 is a fine movement table.

Figure 71:
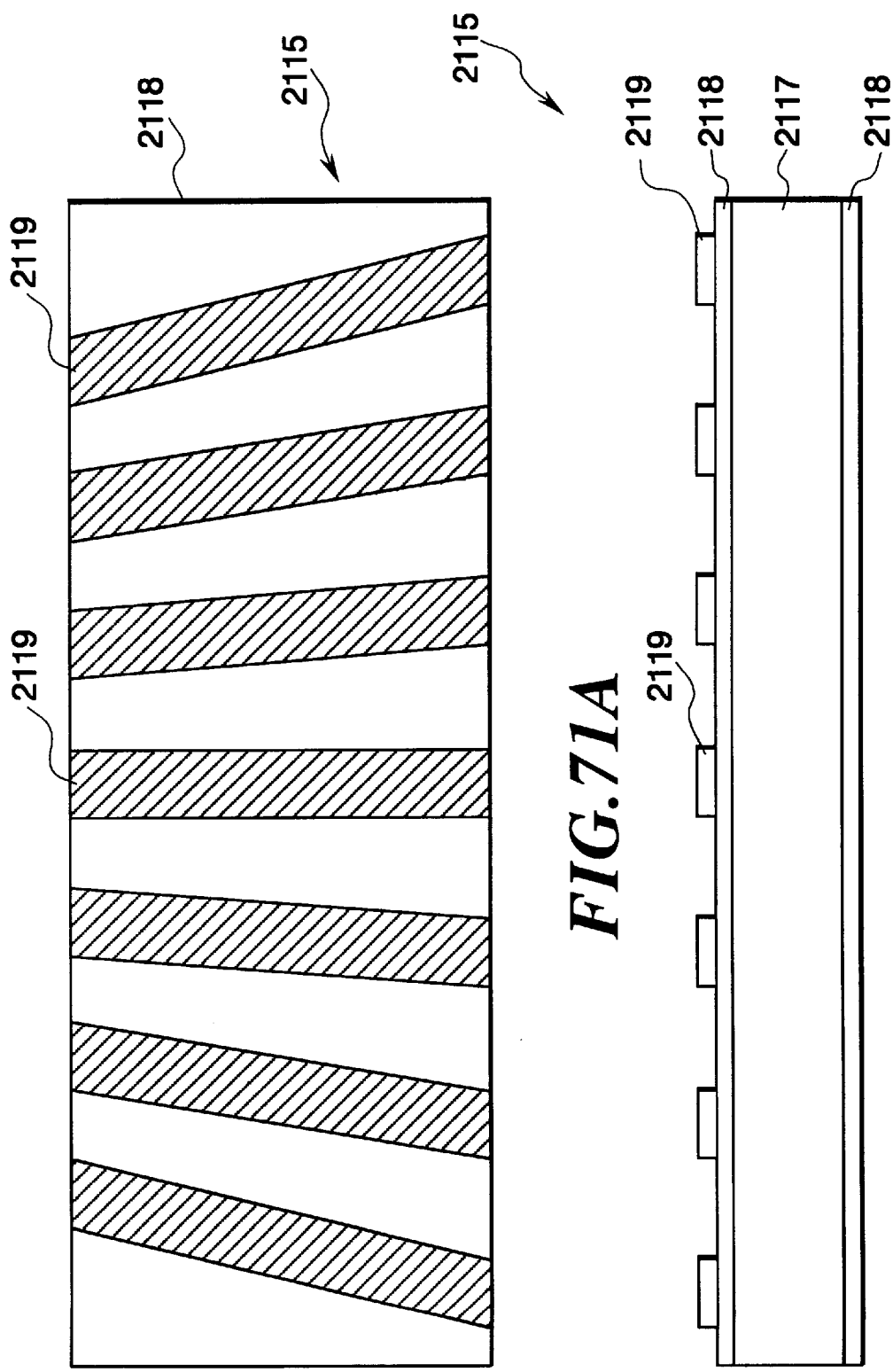
FIG. 71A is a schematic plan view showing the structure of high reflection mirror of the optical signal processing apparatus according to the embodiment 29 of the present invention.
FIG. 71B is a schematic cross sectional view showing the structure of high reflection mirror of the optical signal processing apparatus according to the embodiment 29 of the present invention.

An enlarged view of the high reflection mirror 2115 of FIG. 70 is shown in FIG. 71. FIG. 71A is a structural plan view, FIG. 71B is an end surface view. Here, 2117 is a quartz substrate, 2118 is a point reflection coating, 2119 is a high reflection mirror such as Au/Cr. Each mirror is constant in width, adapted to change the adjacent mirror spacing in y-direction of FIG. 71A.

Figure 72:
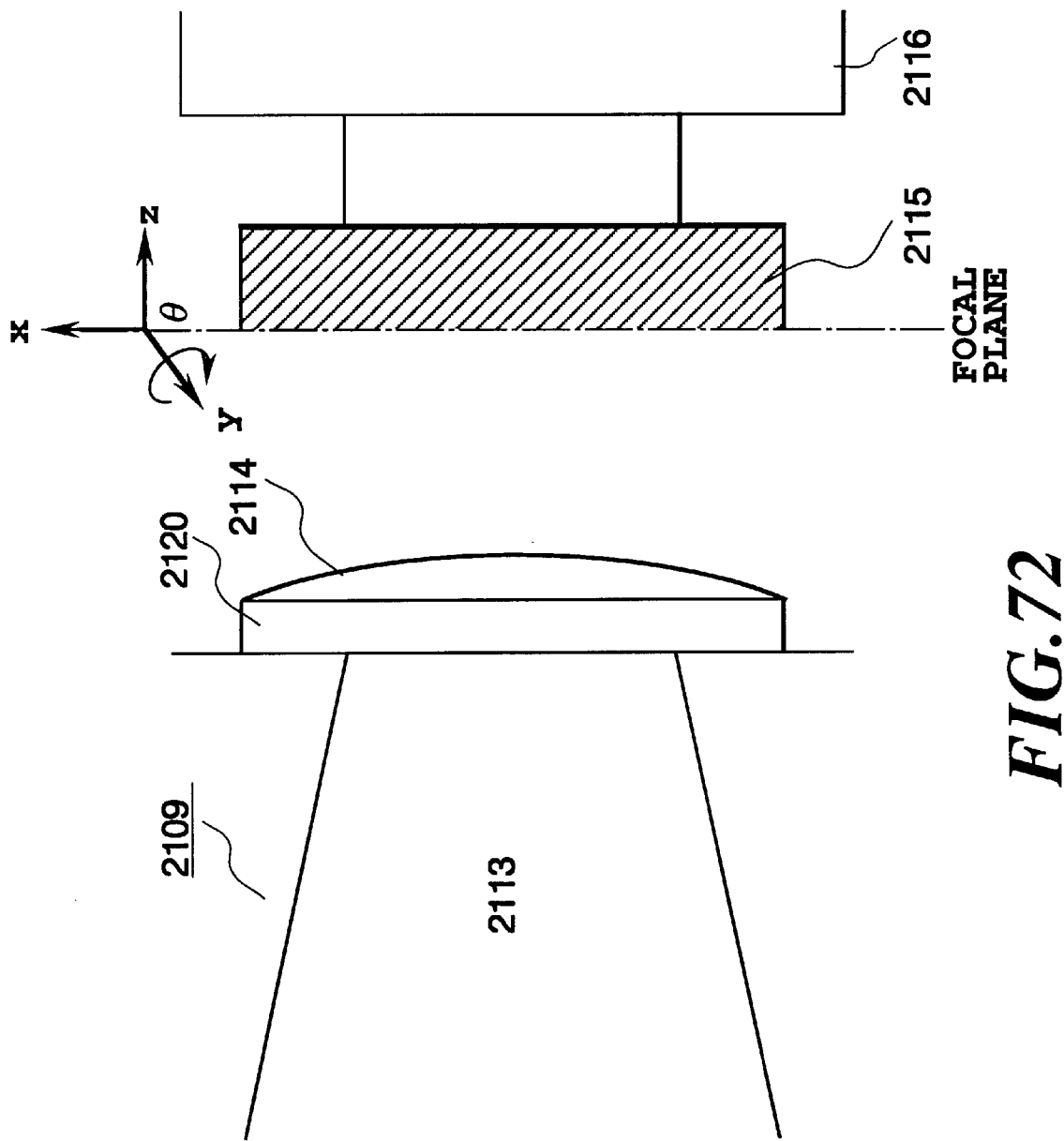
FIG. 72 is a schematic view showing layout in the vicinity of high reflection mirror of the optical signal processing apparatus according to the embodiment 29 of the present invention.

FIG. 72 shows layout in the vicinity of the mirror 2115. In the Figure, 2120 is a lens substrate, 2114 is a lens, having a function to convert the cylindrical focusing plane of 2109 into a flat plane. The surface having the mirror 2115 is disposed to be in line with the focusing plane. In the figure, a direction vertical to the paper surface is y-direction, and rotation angle about the y-axis is θ. By the fine movement table 2116 connected to the mirror 2115, the mirror can be finely moved in the x and y-directions and θ-direction. In the present embodiment, by moving the mirror 2115 in the x-direction, central frequency during mode locked oscillation and oscillation frequency of each mode can be controlled. By moving in the y-direction, since the spacing of the mirror 2119 is changed, mode interval, that is, repetition period of the pulse can be controlled. Further, to facilitate generation of mode locked state, the θ-direction is controlled so that the delay time in the resonator is an integer multiple or inverse thereof of the repetition period of the pulse.

The present embodiment 29 is characterized in that the repetition period and central frequency of the pulse sequence can be easily controlled. While individual parts are shown to be connected to the optical fiber, it is needless to say that they may be connected to the lens as in other embodiments. Further, in other embodiments, the parts may be connected to the optical fiber as in the present embodiment.

Embodiment 30

FIG. 73 shows an embodiment 30 of the present invention. The present embodiment relates to an optical signal processing apparatus which can provide observation of real-time waveform of optical signal.

In FIG. 73, 3101 is a signal light input waveguide for inputting signal light. 3102 is a slab waveguide, which has a function to distribute output light of the signal light input waveguide to an arrayed waveguide 3103. The arrayed waveguide 3103 has a function for time—space conversion of incident signal light.

Further, 3104 is a reference light input waveguide for inputting reference light. 3105 is a first slab waveguide for the reference light, and has a function of distributing the output light of the reference light input waveguide 3104 to an arrayed waveguide 3106. The arrayed waveguide 3106 has a function of time—space conversion of incident reference light.

3107 is a second slab waveguide, which has a function of Fourier transformation of output light individually from the arrayed waveguide 3103 and the arrayed waveguide 3106. 3108 is an photo diode (PD) array, which detects electrical field amplitude distribution of Fourier transform hologram formed on the focal plane of the second slab waveguide 3107 by interference of the signal light Fourier transformed by the second slab waveguide 3107 with the reference light. 3109 is an optical signal restoration circuit for restoring the input signal light from the electrical field strength distribution of the Fourier transformed hologram detected by the PD array 3108. Further, 200 is an arrayed waveguide grating comprising the waveguides 3101 and 3104, the slab waveguides 3102, 3105, and 3107, and the arrayed waveguides 3103 and 3106. In this case, when making time—space conversion of the signal light by the arrayed waveguide 3103 and the arrayed waveguide 3106, since a hologram is not obtained if the spatial base is inversed to each other with respect to the time base, the two arrayed waveguides 3103 and 3106 are bent in the same direction as shown in FIG. 73, thereby aligning the sign of the spatial base to the time base on the output surface of the arrayed waveguides.

Yet further, in the present embodiment 30, while the PD array 3108 is nearly close contacted with the focal plane of the second slab waveguide 3107, a lens may further be provided on the focal plane of the second slab waveguide 107 to make phase compensation. Yet further, when designing the two waveguide arrays, as shown in FIG. 73, the signal light arrayed waveguide 3103 is provided at the output side, the reference light arrayed waveguide is provided at the input side individually with a straight arrayed waveguide of about 1 cm, thereby preventing the arrayed waveguides from being overlapped with each other.

Figure 73A:
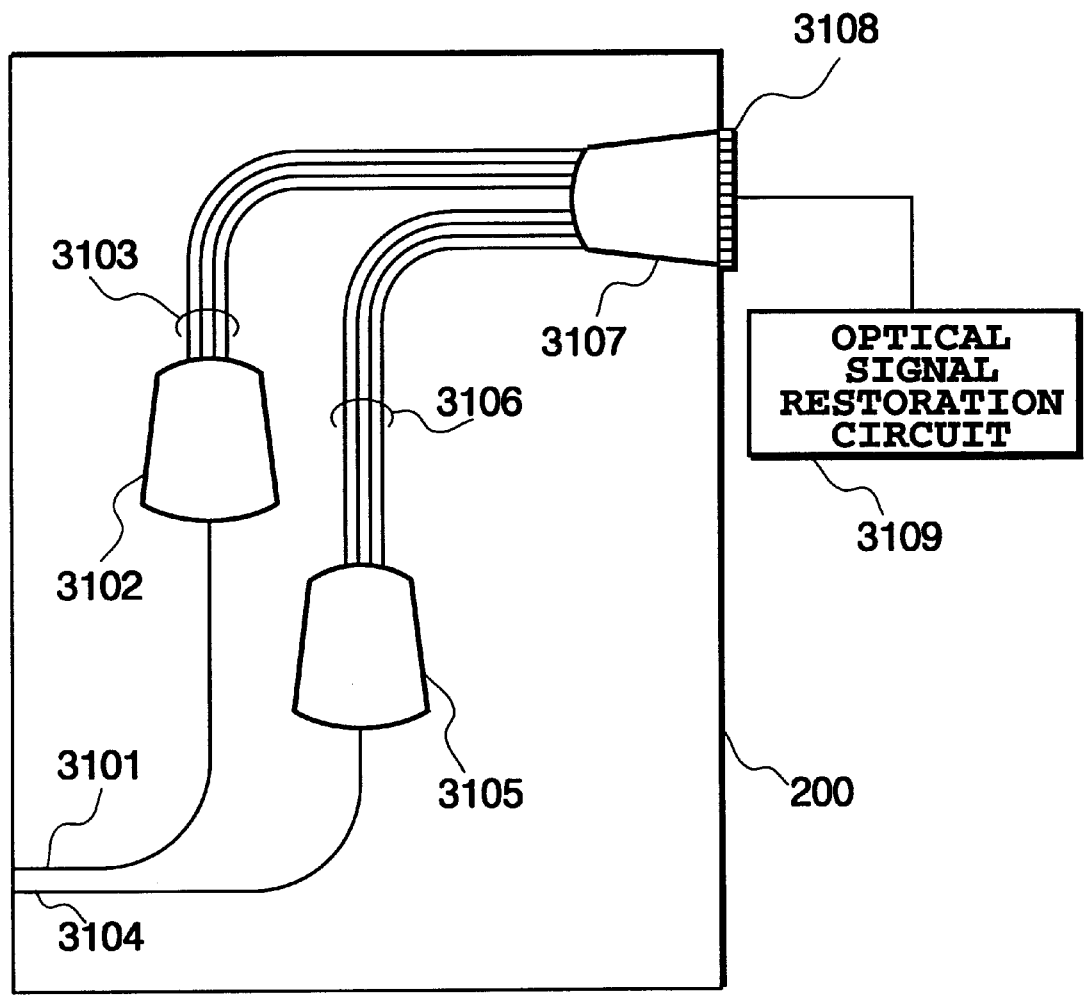
FIG. 73A is a schematic view showing the structure of the optical signal processing apparatus according to an embodiment 30 of the present invention.
Figure 73B:
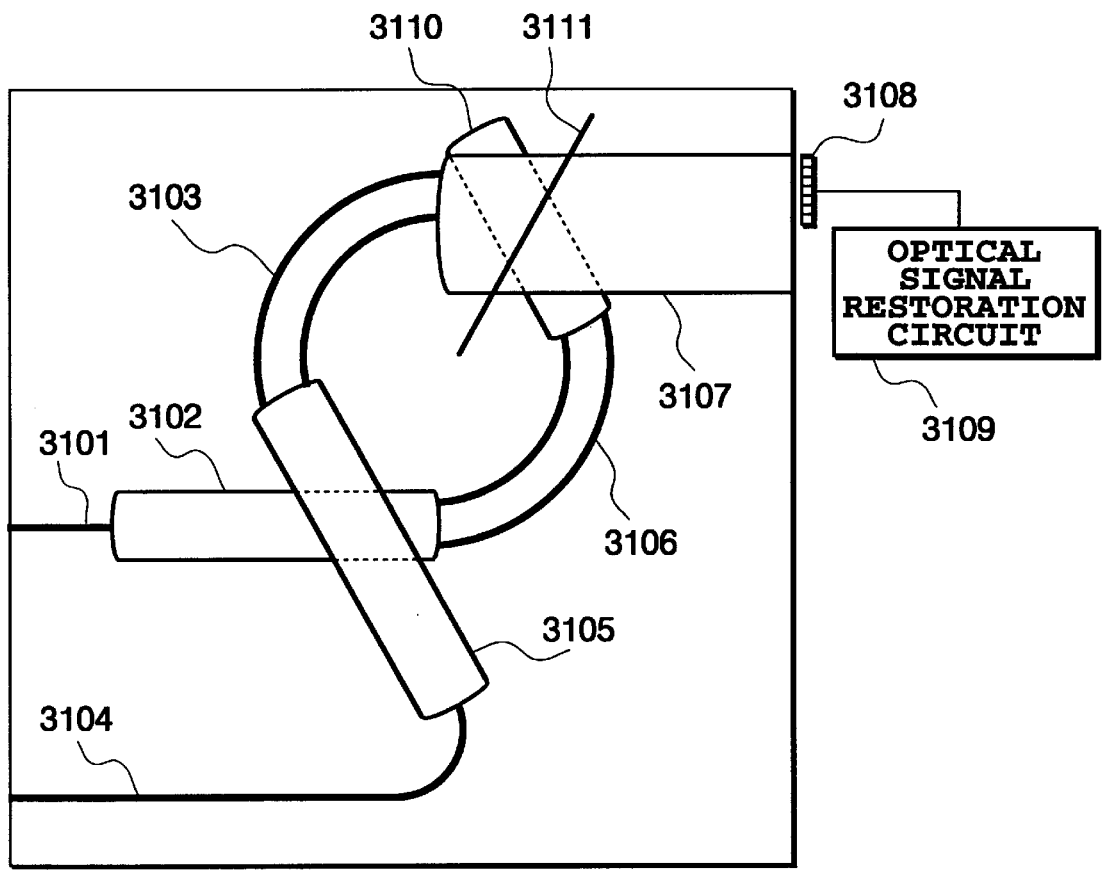
FIG. 73B is a schematic view showing the structure of a modification example of the optical signal processing apparatus according to the embodiment 30 of the present invention.
Figure 73C:
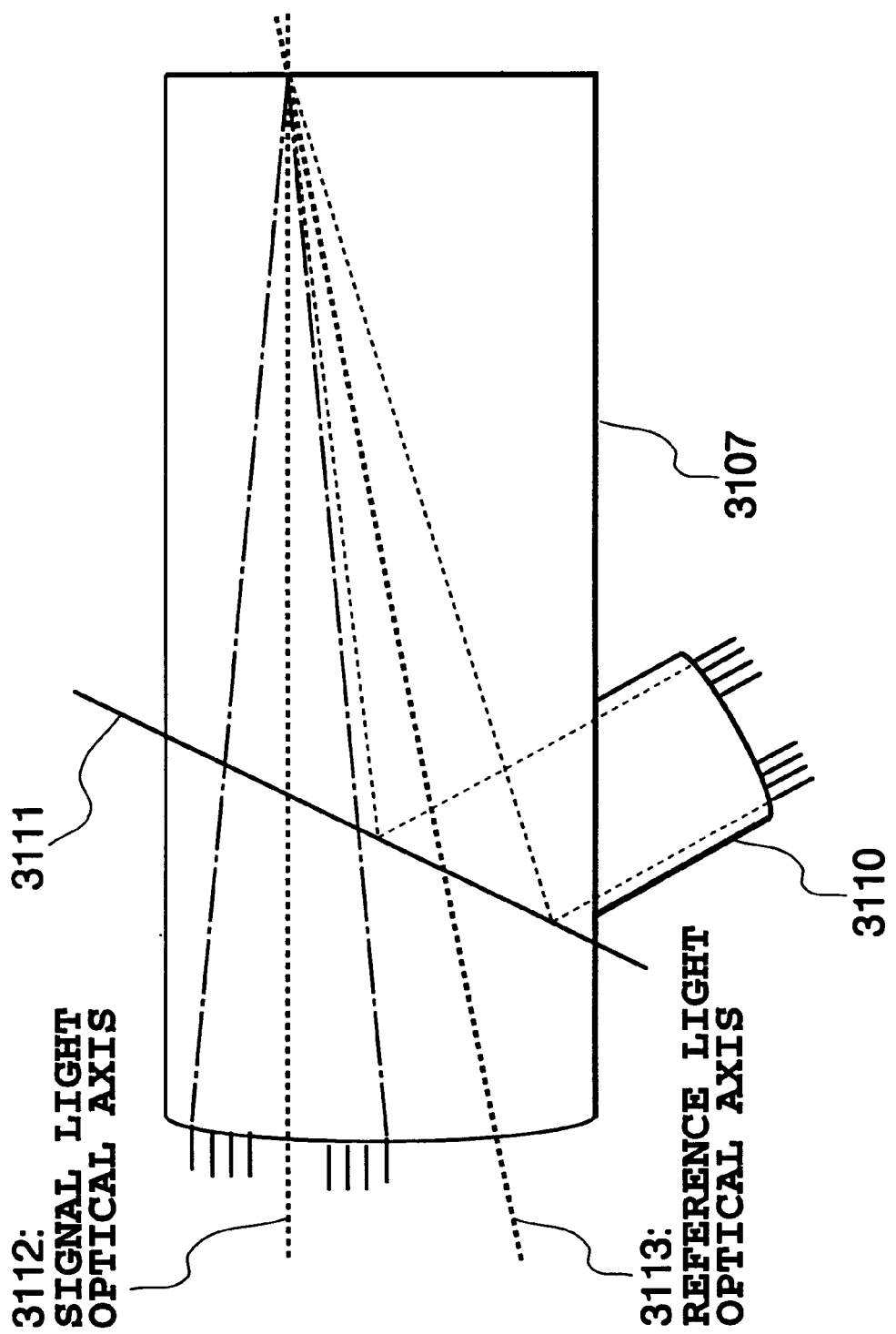
FIG. 73C is a schematic enlarged view showing the structure shown in FIG. 73B.

Yet further, as a construction having the same function, a construction shown in FIG. 73B is also possible. In FIG. 73B, 3110 is a second slab waveguide for reference light, and 3111 is a half mirror. The half mirror 3111 is introduced, after forming the waveguide, by forming a groove in the substrate by a dicing saw and inserting. The position of the half mirror is determined so that reference light incident to the slab waveguide 3110 is reflected at the half mirror 3111, and focused on the focal plane of the slab waveguide 3107. In this case, to achieve an off-axis hologram arrangement, the optical axis of the reference light is required to be set in an angle of 3 to 30 degrees with respect to the optical axis of signal light. Although the resolution is improved when the angle between the signal light and reference light is as small as possible, to separate the signal light from the reference light, as shown in FIG. 73C, it is necessary to set so that individual beams of the reference light and signal light are not overlapped with each other.

The waveguide in FIG. 73 is formed as an example as shown below. First, a lower clad layer and a core layer are stacked in this order by a flame hydrolysis decomposition method (FHD method) on a single crystal silicon substrate, heated to a high temperature in an annealing furnace to form a transparent glass film covering the silicon substrate. After that, patterning is made to the shape of waveguide, unnecessary core layer is removed by dry etching, an upper clad layer is again stacked using the FHD method, and heated to a high temperature to make the upper clad layer transparent. Although the above described method is used in the present embodiment 30, it is apparent that a semiconductor waveguide structure fabricated by epitaxial growing of semiconductor higher in refractive index than a clad of InGaAsP as a core layer of a semiconductor layer such as of InP, after patterning and etching, again growing InP as an upper clad layer has the same function. In this case, it is desirable that the materials are transparent in the operating wavelength region.

Figure 73D:
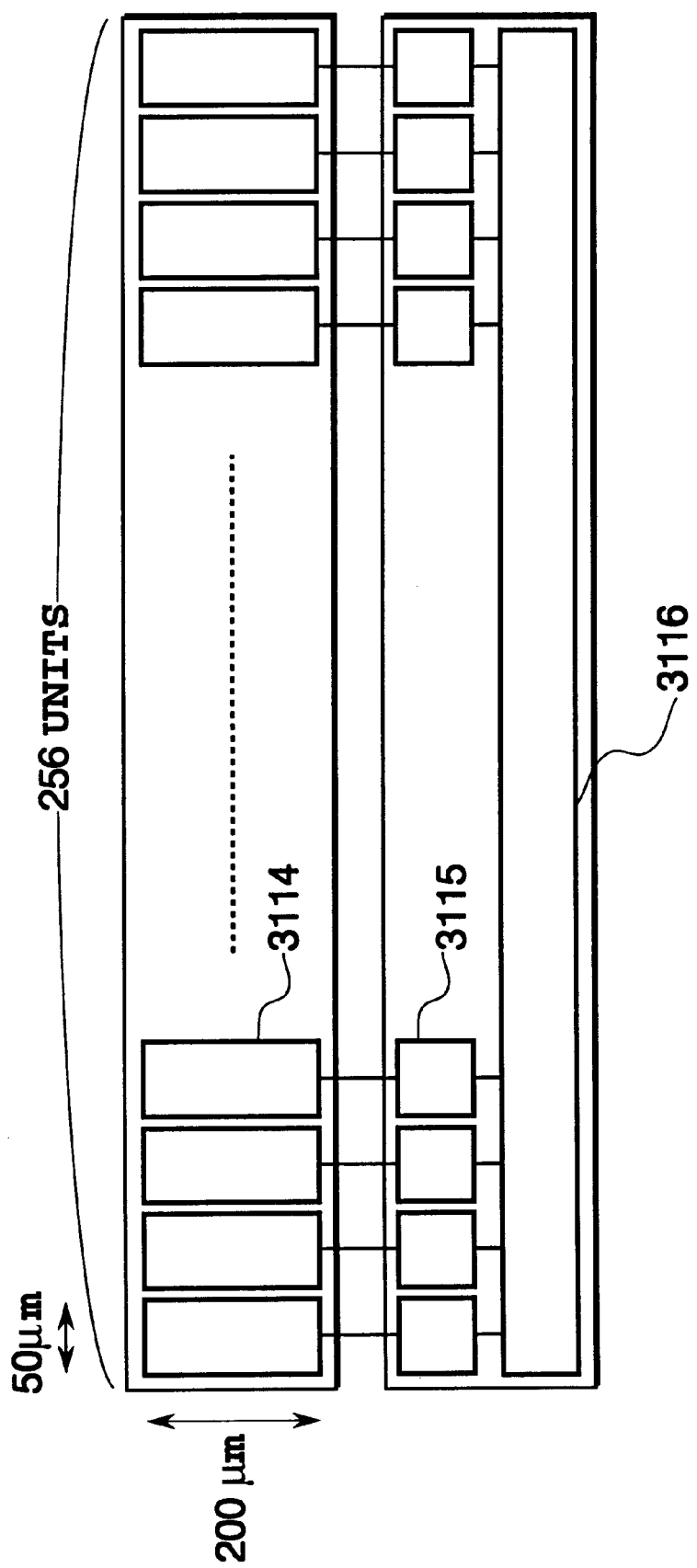
FIG. 73D is a schematic view showing the structure of photo diode array used in the optical signal processing apparatus according to the embodiment 30 of the present invention.

Further, a detailed view of the photo diode array used in the present embodiment is shown in FIG. 73D. The size of one piece of the photo diode in 256 units of single dimensional array is 200 μm in length and 30 μm in width, and individual pixels are arranged in a period of 50 μm. Electrical charge generated in each pixel is accumulated in the charge integrator 3114. The accumulated charge is read by sequentially operating the pixels by the CMOS shift register 3115.

Still further, the optical signal restoration circuit 3109 comprises a computer and hologram for making mathematical operation, which will be described later, on the distribution of hologram interference pattern detected by the photo diode array, and a display device for displaying the electrical field distribution of the restored original optical signal.

When signal light $s_1(t)$ to be observed is input in the waveguide 3101, and known reference light $r_1(t)$ is input in the waveguide 3104, at the output ends of the individual waveguides 3103 and 3106, when the coordinate axis is $x_1$, the signal light and the reference light are time—space converted individually into $s_2(x_1)$ and $r_2(x_1)$. These optical signals $s_2(x_1)$ and $r_2(x_1)$ are Fourier transformed by diffraction during transmitting the waveguide 3107, the signal light and reference light are converted individually into $S(\xi)$ and $R(\xi)$, wherein $\xi$ is a spatial frequency axis in the focal plane coordinates. Wherein $S(\xi)$ and $R(\xi)$ are Fourier transformation of $s_2(x_1)$ and $r_2(x_1)$. On the focal plane of the slab waveguide 3107, $S(\xi)$ and $R(\xi)$ interfere with each other to form a hologram. Electrical field strength distribution $G(\xi)$ can be represented as:

$$G(\xi)=|S(\xi)+R(\xi)|^2=|S(\xi)|^2+|R(\xi)|^2+S(\xi)\times R^*(\xi)+S^*(\xi)\times R(\xi) \quad (1)$$

In the formula (1), $S^*(\xi)$ and $R^*(\xi)$ individually represent complex conjugate of $S(\xi)$ and $R(\xi)$. By detecting the distribution of such hologram $G(\xi)$ and making mathematical operation, by multiplying $G(\xi)/|R(\xi)|^2$, $$G(\xi)\times R(\xi)/|R(\xi)|^2=(|S(\xi)|^2/|R(\xi)|^{2+1})\times R(\xi)+S(\xi)+S^*(\xi)\times\{R(\xi)\}^2/|R(\xi)|^2 \quad (2)$$

can be derived. Although not expressly shown in the formula (2), since, in the slab waveguide 3107, signal light $s_2(x_1)$ and reference light $r_2(x_1)$ are applied from different positions, this is a construction equivalent to off-axis method in the holography.

Therefore, individual terms appearing in the formula (2)
$(|S(\xi)|^2/|R(\xi)|^{2+1})\times R(\xi)$
$S(\xi)$
$S^*(\xi)\times (R(\xi))^2/|R(\xi)|^2$
individually correspond to 0'th-order, +1st order, and −1st order diffraction components, differing in diffraction direction. Therefore, it is possible to separate an electrical component to be observed on the mathematical formulae to be derived in the optical restoration circuit 3109.

Further, in practice, the focal plane of the second slab waveguide 3107 is an arc, however, in the present embodiment, it is cut on a straight line in the vicinity of the focal plane, the focal plane and the cut surface are not strictly in line with each other. That is, the time—spatially changed signal light is not a strict Fourier transformation image on the straight cut plane. Therefore, when the original signal waveform is reproduced from hologram interference pattern received by the photo diode array, an error occurs at the time of making inverse Fourier transformation.

In the present embodiment, as a method for solving the problem with such an error, a compensation is made by sticking a Fresnel lens for compensating dispersion due to a phase shift on the cut surface of the second slab waveguide 3107, however, when reproducing the waveform of the signal light by the calculation as described above, even without the Fresnel lens, it is also possible to make correction by compensating the dispersion due to the phase shift to make calculation of diffraction light, using more common diffraction formula, rather than Fourier transformation in the process of calculating the diffraction by the lens, that is, in the process of making inverse Fourier transformation.

In effect, using the optical system of FIG. 73, from the electrical field strength distribution when a set of 13 pulses of about 42 ps in pulse interval is input as a signal light from the signal light input waveguide 3101, and single optical pulse close to transform limit of 1 ps in pulse width is input as a reference light from the reference light input waveguide 3104, it has been confirmed that the electrical field distribution of the input signal optical pulse sequence can be mathematically restored.

Embodiment 31

Figure 74:
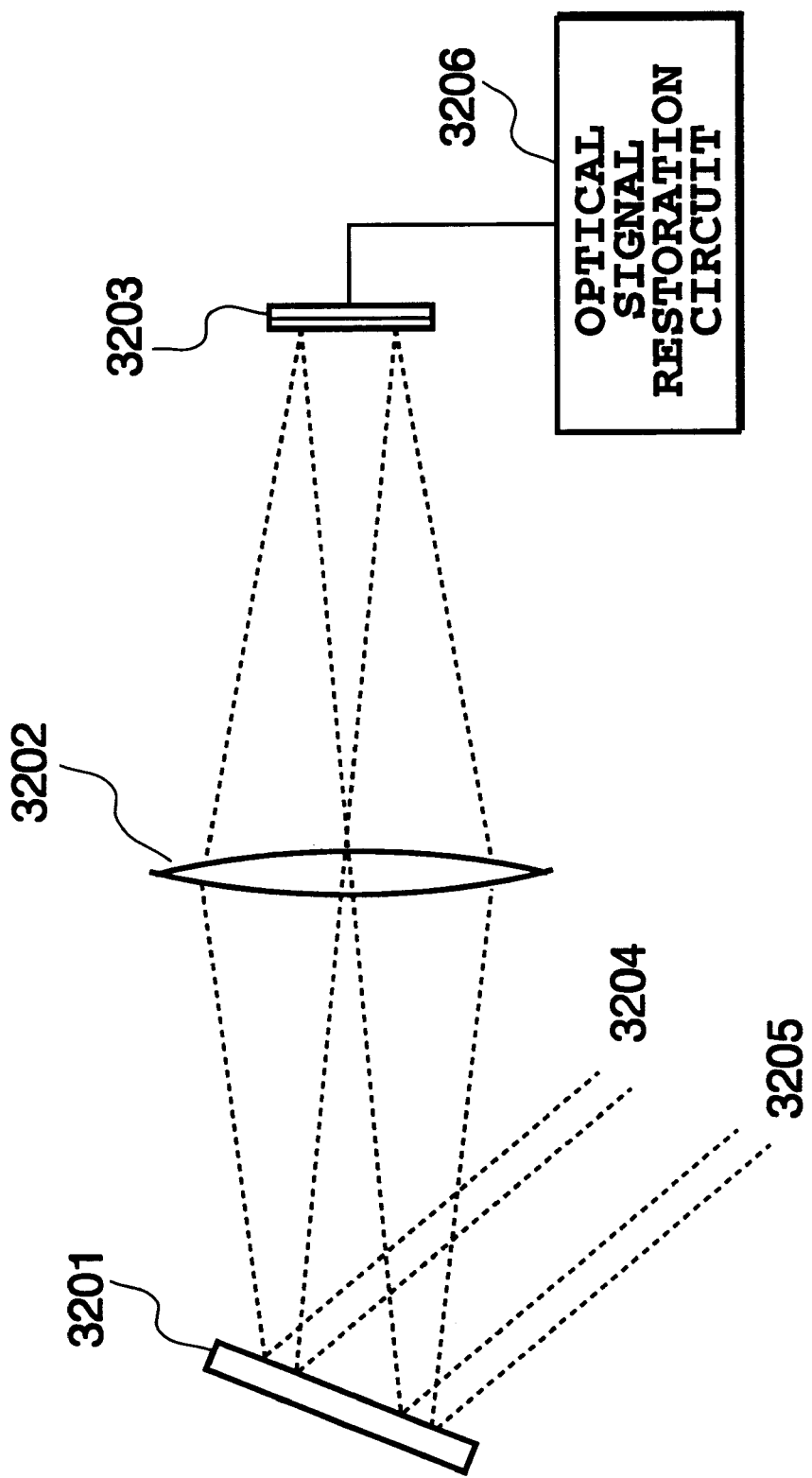
FIG. 74 is a schematic view showing the structure of the optical signal processing apparatus according to an embodiment 31 of the present invention.

FIG. 74 shows an embodiment 31 of the present invention, which relates to a waveform observable optical signal processing apparatus. In FIG. 74, 3201 is a diffraction grating, which has a function of time—space converting input signal light 3204 and input reference light 3205. 3202 is a lens, which has a function of Fourier transforming the signal light and reference light diffracted by the diffraction grating 3201. 3203 is an photo diode (PD) array disposed in the vicinity of the focal plane of the lens 3202, for detecting electrical field strength distribution of the Fourier transform hologram formed on the focal plane of the lens 3202 by interference of the Fourier-transform signal light and reference light. 3206 is an optical restoration circuit for restoring the input signal light from the electrical field strength distribution of the Fourier-transform hologram detected by the PD array 3203. Similarly to the embodiment 30, it is possible to derive the signal light by mathematical operation from the Fourier-transform hologram of the off-axis method.

It has been confirmed that electrical field distribution of input signal light can be restored from the electrical field strength distribution of the Fourier transform hologram when the optical system as shown in FIG. 74 is disposed, the optical system is input with a random signal obtained by appropriate modulation to a 100-unit pulse sequence of 0.3 ps in pulse width and about 8.3 ps in pulse interval, and a single pulse close to the transform limit of 0.1 ps in pulse width is input.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical signal apparatus comprising:

an optical waveguide;

first means for equally distributing an output of said optical waveguide;

an arrayed waveguide comprising an aggregate of optical waveguides changing in optical length by a constant interval for optically dividing the output light;

second means for focusing the optical output of said arrayed waveguide; and a mirror for receiving and reflecting incident light focused by said second means and for reflecting said incident light back to said second means.

2. An optical signal processing apparatus comprising:

an optical waveguide;

first means for equally distributing an output of said optical waveguide;

an arrayed waveguide comprising an aggregate of optical waveguides changing in optical length by a constant interval for optically dividing the output light;

second means for focusing the optical output of said arrayed waveguide; and a phase spatial modulation device for receiving incident light focused by said second means and distributing the incident light on a straight line and for modulating the incident light into a desired amplitude or phase according to the position on the straight line, said phase spatial modulation device also being configured to reflect said incident light back to said second means.

3. An optical signal processing apparatus as recited in claim 2, wherein the optical arrayed waveguide has a diffraction order m of at least 2.

4. An optical signal processing apparatus as recited in claim 2, wherein said phase spatial modulation device comprises a lens, a spatial filter, and a mirror, said mirror being configured to reflect the incident light back to the second means.

5. An optical signal processing apparatus comprising:

a substrate having an optical input side for receiving a signal light;

an optical fiber having an optical circulator disposed in the course of the optical fiber and having an input end and an output end, the input end being optically connected to the optical input side of the substrate;

an optical waveguide optically connected to the output end of the optical fiber;

a first slab waveguide disposed on the substrate and being optically connected to the optical waveguide, the first slab waveguide being configured to equally distribute the signal light from the optical waveguide;

an arrayed waveguide disposed on the substrate and being optically connected to the first slab waveguide, the arrayed waveguide being formed from a plurality of optical waveguides gradually increasing in waveguide length for generating phase difference by differing the optical length of the equally distributed light of the signal light passed from the first slab waveguide;

a second slab waveguide disposed on the substrate and being optically connected to the arrayed waveguide, the second slab waveguide having an optical output side; and a phase spatial modulation device optically connected to the optical output side of the second slab waveguide, the phase spatial modulation device comprising a lens, a spatial filter, and reflection means for returning the signal light back through the second slab waveguide to the optical circulator.

6. The optical signal processing apparatus as recited in claim 5, wherein the reflection means is a mirror and the lens is a Fresnel lens.

7. The optical signal processing apparatus as recited in claim 6, wherein a low reflection filer is attached to the Fresnel lens and the spatial filter.

8. The optical signal processing apparatus as recited in claim 6, wherein the Fresnel lens has an elliptical contour portion with a minor diameter, the curvature in the minor diameter direction being equal to the focal length of the second slab waveguide and the Fresnel lens being constructed from material that appears transparent to the signal light in an operative wavelength region.

9. The optical signal processing apparatus as recited in claim 5, wherein the phase spatial modulation device is disposed between a first quartz substrate and a second quartz substrate.

10. The optical signal processing apparatus as recited in claim 5, wherein an optical length difference of about 10 mm may be provided between a longest optical waveguide and a shortest optical waveguide selected from the plurality of optical waveguides in the arrayed waveguide on a 5 cm×5 cm substrate.

11. The optical signal processing apparatus as recited in claim 5, wherein the first slab waveguide, the arrayed waveguide, and the second slab waveguide are integrated on the substrate.

12. The optical signal processing apparatus as recited in claim 11, wherein the optical waveguides on the substrate are constructed of material selected from the group consisting of quartz, GaAs, Si, InP, $LiNbO_3$, and polyimide.

13. The optical signal processing apparatus as recited in claim 5, wherein the optical waveguides on the substrate are constructed of material selected from the group consisting of semiconductor material waveguides, dielectric material waveguides, organic material waveguides, and quartz material waveguides.

14. The optical signal processing apparatus as recited in claim 5, wherein the plurality of optical waveguides of the arrayed waveguide each differ in waveguide length by $\Delta L$ resulting in an optical path difference of $n\Delta L$, wherein n is a refractive index of each of the plurality of optical waveguides.

15. The optical signal processing apparatus as recited in claim 14, wherein the arrayed waveguide wave division function is the same as a diffraction grating.

16. A method of optical signal processing comprising the steps of:

passing an input signal light through an optical circulator;

applying the input signal light exiting the optical circulator to an optical waveguide;

equally distributing the input signal light exiting the optical waveguide to individual waveguides as part of an arrayed waveguide containing a plurality of individual waveguides via a first slab waveguide;

modifying the input signal light via the arrayed waveguide according to the optical length difference of each individual waveguide in the array;

transforming the modified input signal light exiting the arrayed waveguide via a second slab waveguide;

phase modulating the modified input signal light from the second slab waveguide via a spatial filter through a lens; and returning the modified input signal light by reflection off a mirror back through the spatial filter, the second slab waveguide, the arrayed waveguide, the first slab waveguide, the optical waveguide, and into the optical circulator, thereby generating an output signal light from the modified input signal light; and retrieving the output signal light from the optical circulator.

* * * * *

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Title page,
Item [75], Inventors, change "Machida" to -- Tokyo --; change "Mito" to -- Ibaraki --; change "Kokubunji" to -- Tokyo -- and change "Isehara" to -- Karagawa --
Item [30], Foreign Application Priority Data, change "Feb. 22, 1979" to
-- Feb. 27, 1997 --
Item [57], ABSTRACT,
Lines 10 and 16, change "a arrayed" to -- an arrayed --

Column 1,
Line 47, change "Programable" to -- Programmable --
Line 48, change "J" to -- Journal --
Line 49, change "Qutun" to -- of Quantum --
Line 57, change "pulses of femtosecond" to -- pulses within the femtosecond --
Line 58, change "are application" to -- are of the application --

Column 2,
Line 6, change "practicable at" to -- practicable at the --
Line 9, change "is in principle possible" to -- is, in principle, possible --
Line 16, change "requires large" to -- requires a large --
Line 17, change "large sized" to -- large-sized --
Line 21, change "large sized" to -- large-sized --
Line 42, change "thereof." to -- thereof is emitted. --

Column 3,
Line 11, change "high refection" to -- high reflection --
Line 37, change "lasers are" to -- lasers have --
Line 38, change "difficult to simultaneously meet these requirements." to -- difficulty meeting these requirements simultaneously. --
Line 46, change "temperature, on material" to -- temperature, material, --
Line 63, change "of transmission" to -- of the transmission --

Column 4,
Line 3, change "reverse to" to -- opposite to --
Line 10, change "problems" to -- problems: --
Line 20, change "of optical" to -- of the optical --
Line 22, change "as other" to -- as in other --
Line 23, change "and multiple-connected" to -- and a multiple-connected --
Line 24, change "following problems" to -- following problems: --
Line 43, change "power. Since" to -- power, since --
Line 44, change "waveform, however" to -- waveform. However --
Line 60, change "line a chirped" to -- line: a chirped --

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Column 5,
Lines 27 and 37, change "waveguide, a" to -- waveguide, an --
Line 66, change "filter, a" to -- filter, an --

Column 6,
Line 9, change "filter, a" to -- filter, an --
Line 19, change "having a" to -- having an --
Line 32, change "having a" to -- having an --

Column 8,
Line 42, change "mans for" to -- means for --

Column 9,
Line 24, change "Similarly, phase" to -- Similarly, the phase --
Line 31, change "in direction" to -- in a direction --

Column 11,
Line 22, change "that frequency" to -- that the frequency --

Column 13,
Line 43, change "comprises first" to -- comprises: (paragraph break) first --
Line 44, change "converting time" to -- converting the time -
Line 46, change "converting time" to -- converting the time --
Line 48, change "output from" to -- outputted from --

Column 14,
Line 33, change "of absolute" to -- of the absolute --
Line 46, change "showing optical spectrum of input" to -- showing an optical spectrum of the input --
Line 48, change "and, optical spectrum of output" to -- and, an optical spectrum of the output --

Column 15,
Line 23, change "showing pulse" to -- showing the pulse --
Line 27, change "showing pulse" to -- showing the pulse --
Line 31, change "showing pulse" to -- showing the pulse --
Line 37, change "treated optical" to -- a treated optical --

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Column 15,
Line 55, change optical spectrum" to -- the optical spectrum --
Line 56, change "phase filter, and optical" to -- the phase filter, and the optical --

Column 16,
Line 13, change "spatial filter" to -- the spatial filter --
Line 27, change "according to at" to -- according to the --
Line 33, 38, 41, 46 and 50, change "of spatial" to -- of the spatial --

Column 17,
Line 5, change "of Fresnel" to -- of the Fresnel --
Line 7, change "showing spatial" to -- showing the spatial --
Line 11, change "spatial filter" to -- the spatial filter --
Lines 14, 17 and 21, change "showing Fresnel" to -- showing the Fresnel --
Line 26, change "in spatial" to -- in the spatial --
Lines 27 and 30, change "Fresnel lens" to -- the Fresnel lens --
Line 47, change "of modulator" to -- of the modulator --
Line 52, change "characteristic of spatial" to -- characteristics of the spatial --
Line 58, change "characteristic of spatial" to -- characteristics of the spatial --
Line 63, change "characteristic of amplitude" to -- characteristics of the amplitude --

Column 18,
Line 1, change "characteristic of phase" to -- characteristics of the phase --
Line 3, change "apparatus of according" to -- apparatus according --
Line 5, change "characteristic of phase" to -- characteristics of the phase -
Line 7, change "apparatus of according" to -- apparatus according --
Line 9, change "showing frequency" to -- showing the frequency --
Line 10, change "of amplitude" to -- of the amplitude --
Line 12, change "showing frequency" to -- showing the frequency --
Line 13, change "of angular" to -- of the angular --
Line 19, change "on filter" to -- on a filter --
Line 21, change "of modulation" to -- of the modulation --
Line 57, change "of phase" to -- of the phase --
Line 58, change "in resonator" to -- in a resonator --

Column 19,
Line 21, change "of high" to -- of the high --
Line 25, change "of high" to -- of the high --

UNITED STATES PATENT AND TRADEMARK OFFICE
CERTIFICATE OF CORRECTION

| | |
|---|---|
| PATENT NO. | : 6,122,419 |
| DATED | : September 19, 2000 |
| INVENTOR(S) | : Takashi Kurokawa et al. |

It is certified that error appears in the above-identified patent and that said Letters Patent is hereby corrected as shown below:

Column 19 cont'd,
Line 30, change "of high" to -- of the high --
Line 43, change "photo diode" to -- a photo diode --
Line 66, change "since adjacent" to -- since the adjacent --

Column 20,,
Line 8, change "a arrayed" to -- an arrayed --
Line 48, change "is approximately has a" to -- approximately has --

Column 21,
Line 5, change "are as necessary" to -- are, as necessary, --
Line 35, change "of optical" to -- of an optical --
Lines 52 and 61, change "a arrayed" to -- an arrayed --

Column 22,
Lines 2, 4 and 25, change "a arrayed" to -- an arrayed --
Line 27, change "59, spatially" to -- 59 which spatially --
Line 63, change "through a" to -- through an --

Column 23,
Line 8, change "light, power" to -- light, the power --
Line 26, change "using a" to -- using an --
Line 33, change "art arrangement," to -- art arrangement --
Line 34, change "of optical" to -- of the optical --
Line 37, change "as follows." to -- as follows: --

Column 24,
Line 52, change "reflection filer" to -- reflection filter --
Line 55, change "is formed so" to -- formed so --

Column 25,
Line 3, change "interval 50" to -- interval of 50 --
Line 18, change "function same" to -- function the same --
Line 42, change "of electron" to -- of the electron --

Column 26,
Line 35, change "time, x" to -- time, and x --

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Column 27,
Line 4, change "serving as" to -- serves as --
Line 8, change "which has slightly" to -- which is slightly --
Line 18, change "or dielectric" to -- or a dielectric --
Line 20, change "particular, semiconductor" to -- particular, with semiconductor --
Line 21, change "are possible to construct even further" to -- it is possible to construct even more --
Line 31, change "and f" to -- and the f --
Line 34, change "is homogeneous" to -- is a homogeneous --
Line 38, change "electrodes and" to -- electrodes, --
Line 40, change "of crystal" to -- of the crystal --

Column 28,
Line 17, change "comprise" to -- comprises --
Line 51, change "in other" to -- in an other --
Line 52, change "general, refractive" to -- general, the refractive --
Line 54, change "waveguide, that" to -- the waveguide that --
Line 57, change "that input" to -- that the input --
Line 58, change "is Fourier" to -- has a Fourier --
Line 61, change "function as" to -- all function as --
Line 65, change "embodiment, same as" to -- embodiment, as --
Line 66, change "and flexible" to -- and a flexible --

Column 29,
Line 11, change "thermoplastic can" to -- thermoplastic, can --
Line 20, change "of signal" to -- of the signal --
Line 22, change "recording high" to -- recording a high --
Line 31, change "701, optical" to -- 701, the optical --
Line 36, change "light can" to -- lights can --
Line 46, change "904, temporal" to -- 904, a temporal --
Line 63, change "of phase" to -- of the phase --

Column 30,
Line 31, change "121" to -- 102 --
Line 39, change "function same" to -- function that is the same --
Line 50, change "Focal plane" to -- The focal plane --

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Column 31,
Line 13, change "substrate 11" to -- substrate 111 --
Line 14, change "in x" to -- in the x --
Line 15, change "Ry, elliptical" to -- Ry, the elliptical --
Line 16, change "formula (1)." to -- formula (1): --
Line 50, change "formula (3)." to -- formula (3): --
Line 57, change "dispersion, input/output" to -- dispersion, the input/output --
Line 58, change "and (5)." to -- and (5): --
Line 60, change "$U_{out}(\omega))=$" to -- $U_{out}(\omega)=$ --
Line 66, change "frequency, $\omega o$" to -- frequency, $\omega_o$ --

Column 32,
Line 9, change "(3), waveform" to -- (3), the waveform --
Line 34, change "assumed that" to -- assumed that the --
Line 38, change "compensating up to" to -- compensating up to a --
Line 39, change "correspond positive and negative of" to --correspond to the positive and negative --
Line 57, change "Fig. 35, and" to -- Fig. 35, and a --
Line 63, change "Fig. 25A). f" to -- Fig. 25A). The f --

Column 33,
Line 2, change "changed, and" to -- changed, as is the --
Line 12, change "and above-shown" to -- and the above shown- -
Line 24, change "a filter same" to -- the same filter --
Line 42, change "and optical" to -- an optical --
Line 64, change "scramble by phase" to -- scrambling by the phase --
Line 67, change "line in the" to -- line. In the --

Column 34,
Line 2, change "degradation of" to -- degradation of the --
Line 6, change "tertiary or" to -- a tertiary or --
Line 7, change "changes is used" to -- change is used --
Line 9, change "of phase" to -- of the phase --
Line 10, change "(using tertiary" to -- (using a tertiary --
Line 17, change "phase filter" to -- the phase filter --
Line 18, change "as $h_1(\omega)$" to -- as $h_1(\omega$ --
Line 19, change "as $H_1(t))$" to -- as $H_1(t)$ --
Line 23, change "convolution." to -- convolution: --

UNITED STATES PATENT AND TRADEMARK OFFICE
CERTIFICATE OF CORRECTION

PATENT NO.     : 6,122,419
DATED          : September 19, 2000
INVENTOR(S)    : Takashi Kurokawa et al.

It is certified that error appears in the above-identified patent and that said Letters Patent is hereby corrected as shown below:

Column 34 cont'd,
Line 27, change "apparatus 506" to -- apparatus 1006 --
Line 35, change "can optical" to -- can use an optical --
Line 37, change "apparatus 504" to -- apparatus 1004 --
Line 35, change "low s/N" to --a low S/N--
Line 36, change "filter for compensat- " to -- filter compensates --
Line 37, change "ing dispersion" to -- dispersion --
Line 53, change "of phase" to -- of the phase --
Line 55, change "configuration. Configuration" to -- configuration. A configuration --

Column 35,
Line 7, change "set as" to -- set as: --
Line 31, change "of optical" to -- of the optical --
Line 57, change "plane focused" to -- plane, they are focused --

Column 36,
Line 14, change "is used." to -- are used. --
Line 54, change "modulator 1011" to -- modulator 2011 --

Column 37,
Line 8, change "circuit 1014" to -- circuit 2014 --
Line 9, change "medium 1013" to -- medium 2013 --
Line 10, change "and an pumping" to -- and a pumping --
Line 14, change "to quartz" to -- to a quartz --
Line 48, change "mirror 2017" to -- mirror 2019 --
Line 61, change "wherein Left" to -- wherein $L_{eff}$ --

Column 38,
Line 1, change "The prior" to -- Setting the frequency of each mode has been difficult in the prior --
Line 1, change "laser has been difficult to" to -- laser. --
Line 2, change "set the frequency of each mode. However" to -- However --
Line 3, change "since frequency" to -- since the frequency --
Line 5, change "grating 2015" to -- grating 2-15, the --
Line 10, change "further, the" to -- further, setting the pulse width has been difficult in the --

UNITED STATES PATENT AND TRADEMARK OFFICE
CERTIFICATE OF CORRECTION

PATENT NO.     : 6,122,419
DATED          : September 19, 2000
INVENTOR(S)    : Takashi Kurokawa et al.

It is certified that error appears in the above-identified patent and that said Letters Patent is hereby corrected as shown below:

Column 38 cont'd,
Line 10, change "laser has been" to -- laser. --
Line 11, change "difficult to set the pulse width. However" to -- However --
Line 13, change "grating 15" to -- grating 2015 --
Line 25, change "grating 2018" to -- grating 2015 --

Column 39,
Line 3, change "stacked. End" to -- stacked. The end --
Line 10, change "transparent electrode" to -- transparent electrodes --
Line 13, change "limit to" to -- limited to --
Line 29, change "enlarge view" to -- enlarged view --
Line 46, change "enlarge view" to -- enlarged view --

Column 40,
Line 5, change "Figure, end" to -- Figure, the end --
Line 36, change "20, thereby" to -- 20, occurs thereby --

Column 41,
Line 2, change "compensation" to -- compensation. --
Line 13, change "2040. End" to -- 2040. The end --
Line 14, change "provide with" to -- provided with --
Line 15, change "and end" to -- and the end --
Line 17, change "reduced, optical" to -- reduced, and optical --
Line 21, change "70, 2011" to -- 70, 2101 --
Line 39, change "y-direction" to -- the y-direction --
Line 45, change "y-direction" to -- the y-direction --
Line 50, change "central frequency" to -- the central frequency --
Line 51, change "and oscillation" to -- and the oscillation --
Line 53, change "changed, mode" to -- changed, the mode --
Line 53, change "is, repetition" to -- is, the repetition --

Column 42,
Line 2, change "real-time" to -- the real-time --
Line 2, change "of optical" to -- of an optical --
Line 20, change "of Fourier" to -- of a Fourier --
Line 43, change "107 to make" to -- 3107 to make --
Line 65, change "set so" to -- set them so --

UNITED STATES PATENT AND TRADEMARK OFFICE
CERTIFICATE OF CORRECTION

PATENT NO. : 6,122,419
DATED : September 19, 2000
INVENTOR(S) : Takashi Kurokawa et al.

It is certified that error appears in the above-identified patent and that said Letters Patent is hereby corrected as shown below:

Column 43,
Line 13, change "semiconductor higher" to -- a semiconductor higher -
Line 56, change "complex conjugate" to -- the complex conjugate --
Line 59, change "operation. by multiplying" to -- operation by multiplying by --
Line 66, change "method in the" to -- method --

Column 44,
Line 18, change "from hologram" to -- from a hologram --
Line 29, change "using more" to -- using a more --
Line 36, change "and single" to -- and a single --
Line 37, change "to transform" to -- to the transform --
Line 47, change "of time-space converting" to -- of converting time -space --
Line 60, change "Similarly to" to -- Similar to --

Column 46,
Line 22, change "reflection filer" to -- reflection filter --

Signed and Sealed this

Twenty-fourth Day of June, 2003

JAMES E. ROGAN
*Director of the United States Patent and Trademark Office*